United States Patent
Kubota et al.

(10) Patent No.: US 10,520,768 B2
(45) Date of Patent: Dec. 31, 2019

(54) DISPLAY PANEL, INPUT/OUTPUT PANEL, AND DATA PROCESSING DEVICE

(71) Applicant: SEMICONDUCTOR ENERGY LABORATORY CO., LTD., Atsugi-shi, Kanagawa-ken (JP)

(72) Inventors: Daisuke Kubota, Kanagawa (JP); Masaru Nakano, Kanagawa (JP); Hiroyuki Miyake, Aichi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 75 days.

(21) Appl. No.: 15/469,759

(22) Filed: Mar. 27, 2017

(65) Prior Publication Data

US 2017/0285404 A1    Oct. 5, 2017

(30) Foreign Application Priority Data

Mar. 30, 2016  (JP) ................................ 2016-067704

(51) Int. Cl.
G02F 1/1335    (2006.01)

(52) U.S. Cl.
CPC .. *G02F 1/133555* (2013.01); *G02F 1/133553* (2013.01); *G02F 2201/44* (2013.01)

(58) Field of Classification Search
CPC ......... G02F 1/133555; G02F 1/133553; G02F 2201/44; G02F 2201/38
See application file for complete search history.

(56) References Cited

U.S. PATENT DOCUMENTS

| 6,714,268 B2 | 3/2004 | Wang et al. |
| 7,038,641 B2 | 5/2006 | Hirota et al. |

(Continued)

FOREIGN PATENT DOCUMENTS

| JP | 2001-066593 A | 3/2001 |
| JP | 2002-196702 A | 7/2002 |

(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

(Continued)

*Primary Examiner* — Paisley L Arendt
*Assistant Examiner* — Mariam Qureshi
(74) *Attorney, Agent, or Firm* — Nixon Peabody LLP; Jeffrey L. Costellia

(57) ABSTRACT

A novel display panel that is highly convenient or reliable is provided. A novel input/output panel that is highly convenient or reliable is provided. A novel data processing device that is highly convenient or reliable is provided. The display panel includes a layer containing a liquid crystal material, a first pixel, a second pixel, and an anti-reflection structure. The layer containing a liquid crystal material includes a first region, a second region, and a third region. The first pixel includes the first region. The second pixel includes the second region. The anti-reflection structure includes a region overlapping with the third region. The anti-reflection structure has a function of reducing reflectance of visible light which enters through the layer containing a liquid crystal material.

6 Claims, 25 Drawing Sheets

(56) References Cited

U.S. PATENT DOCUMENTS

| | | | |
|---|---|---|---|
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,385,654 B2 | 6/2008 | Mitsui et al. | |
| 8,164,245 B2 | 4/2012 | Nishida et al. | |
| 8,830,424 B2 | 9/2014 | Hirakata et al. | |
| 8,957,442 B2 | 2/2015 | Seo et al. | |
| 9,083,000 B2 | 7/2015 | Ohsawa et al. | |
| 9,153,627 B2 | 10/2015 | Ohsawa et al. | |
| 9,461,092 B2 | 10/2016 | Seo et al. | |
| 9,559,325 B2 | 1/2017 | Ohsawa et al. | |
| 9,911,757 B2 | 3/2018 | Miyake et al. | |
| 2003/0201960 A1 | 10/2003 | Fujieda | |
| 2006/0072047 A1 | 4/2006 | Sekiguchi | |
| 2007/0196576 A1* | 8/2007 | Kim | C23C 16/24 427/255.28 |
| 2008/0180618 A1 | 7/2008 | Fujieda | |
| 2008/0259459 A1* | 10/2008 | Wang | G02B 5/26 359/588 |
| 2010/0171905 A1 | 7/2010 | Huang et al. | |
| 2011/0205468 A1 | 8/2011 | Hirakata et al. | |
| 2012/0205686 A1 | 8/2012 | Seo et al. | |
| 2015/0123083 A1* | 5/2015 | Xi | H01L 27/322 257/40 |
| 2016/0027849 A1 | 1/2016 | Ohsawa et al. | |
| 2016/0202817 A1* | 7/2016 | Choi | G02F 1/13338 345/174 |
| 2016/0246115 A1* | 8/2016 | Fan | G02F 1/133553 |
| 2016/0274699 A1 | 9/2016 | Shishido et al. | |
| 2016/0283028 A1 | 9/2016 | Yamazaki et al. | |
| 2016/0299387 A1 | 10/2016 | Yamazaki et al. | |
| 2016/0314736 A1* | 10/2016 | Sang | G09G 3/3607 |
| 2016/0358986 A1 | 12/2016 | Yamazaki et al. | |
| 2017/0031192 A1 | 2/2017 | Yamazaki et al. | |
| 2017/0031471 A1 | 2/2017 | Yamazaki et al. | |
| 2017/0033172 A1 | 2/2017 | Yamazaki et al. | |
| 2017/0040402 A1 | 2/2017 | Yasumoto et al. | |
| 2017/0084670 A1 | 3/2017 | Seo et al. | |
| 2017/0133621 A1 | 5/2017 | Ohsawa et al. | |
| 2017/0186778 A1 | 6/2017 | Miyake et al. | |
| 2017/0261658 A1* | 9/2017 | Kim | G02B 5/0247 |
| 2018/0224678 A1* | 8/2018 | Jung | G02F 1/137 |

FOREIGN PATENT DOCUMENTS

| | | |
|---|---|---|
| JP | 2002-328630 A | 11/2002 |
| JP | 2003-076302 A | 3/2003 |
| JP | 2003-157020 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 4161574 | 10/2008 |
| JP | 2011-191750 A | 9/2011 |
| JP | 2013-221965 A | 10/2013 |
| WO | WO-2004/053819 | 6/2004 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

* cited by examiner

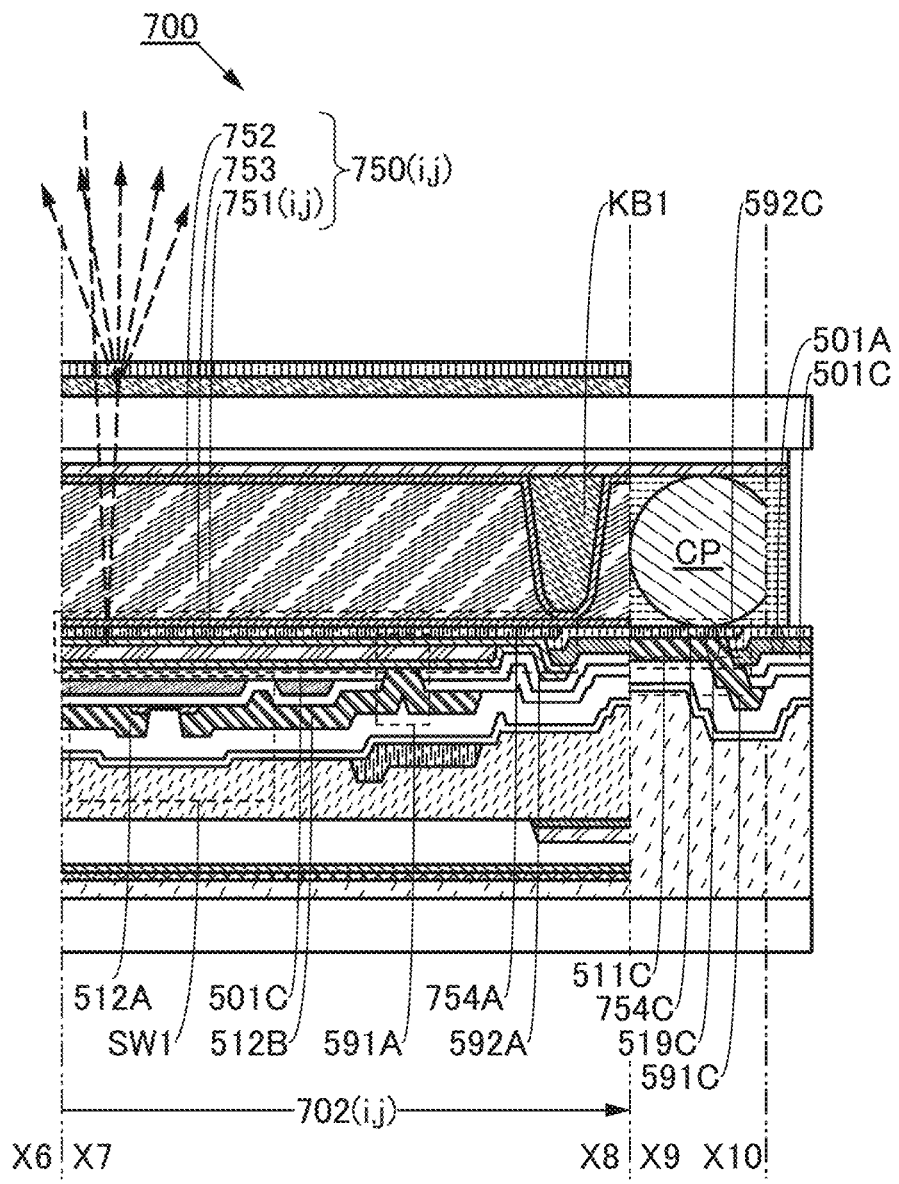
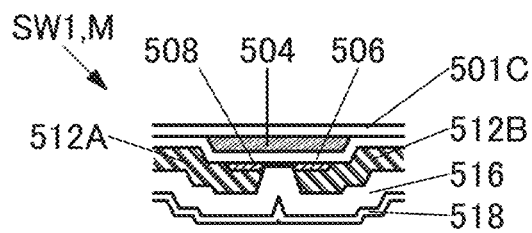
FIG. 4A
FIG. 4B

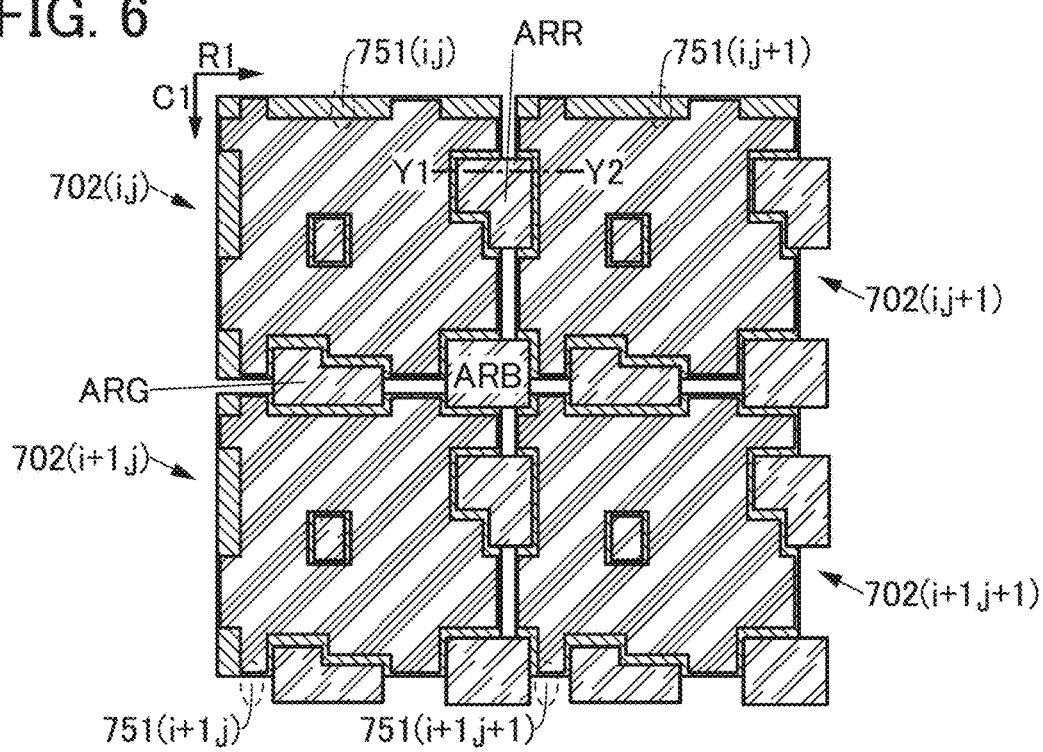

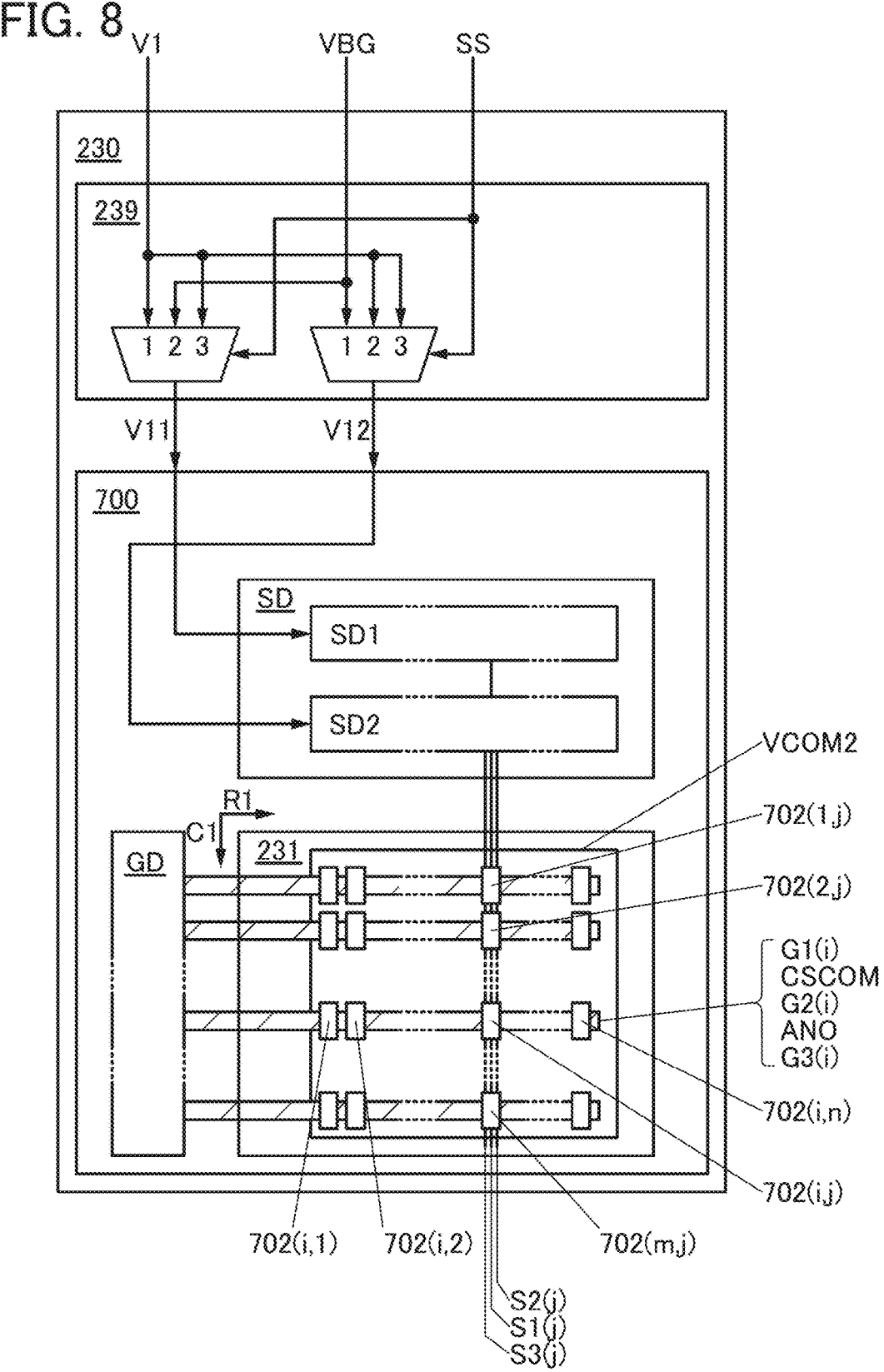

FIG. 9A
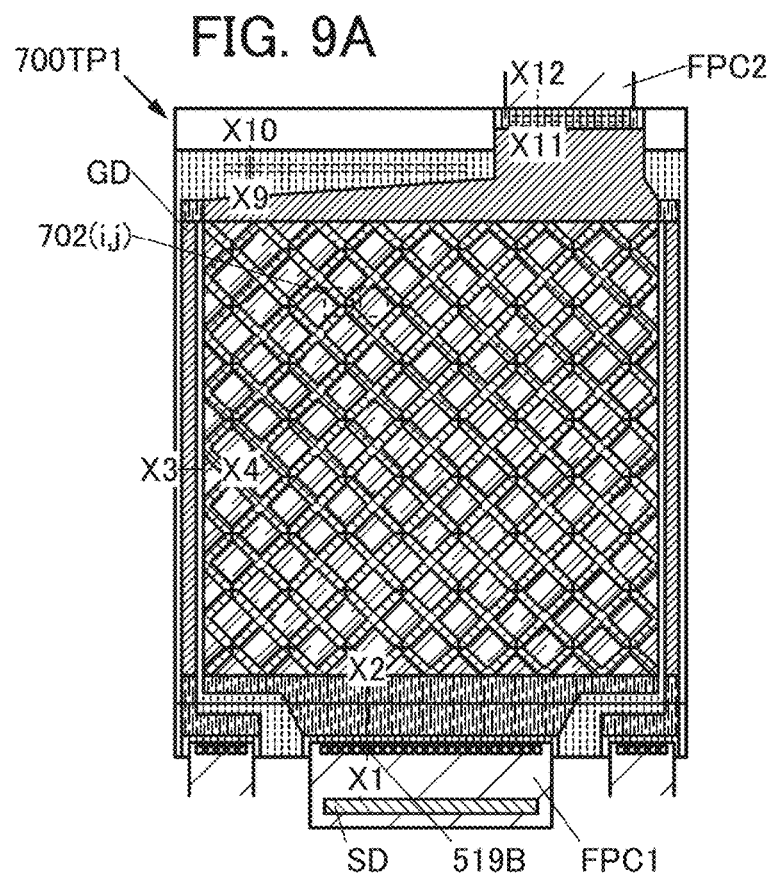
FIG. 9B-1
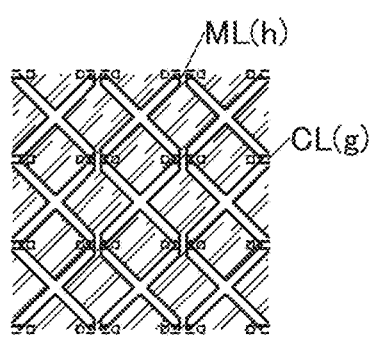
FIG. 9B-2

1400

DISPLAY PANEL, INPUT/OUTPUT PANEL, AND DATA PROCESSING DEVICE

TECHNICAL FIELD

One embodiment of the present invention relates to a display panel, an input/output panel, or a data processing device.

Note that one embodiment of the present invention is not limited to the above technical field. The technical field of one embodiment of the present invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

A liquid crystal display device in which a light-condensing means and a pixel electrode are provided on the same surface side of a substrate and a region transmitting visible light in the pixel electrode is provided to overlap with an optical axis of the light-condensing means, and a liquid crystal display device which includes an anisotropic light-condensing means having a condensing direction X and a non-condensing direction Y that is along a longitudinal direction of a region transmitting visible light in the pixel electrode are known (Patent Document 1).

REFERENCE

Patent Document

[Patent Document 1] Japanese Published Patent Application No. 2011-191750

SUMMARY OF THE INVENTION

An object of one embodiment of the present invention is to provide a novel display panel that is highly convenient or reliable. Another object of one embodiment of the present invention is to provide a novel input/output panel that is highly convenient or reliable. Another object is to provide a novel data processing device that is highly convenient or reliable. Another object is to provide a novel display panel, a novel input/output panel, a novel data processing device, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a display panel including a layer containing a liquid crystal material, a first pixel, a second pixel, and an anti-reflection structure.

The layer containing a liquid crystal material includes a first region, a second region, and a third region. The third region includes a region positioned between the first region and the second region.

The first pixel includes the first region. The second pixel includes the second region.

The anti-reflection structure includes a region overlapping with the third region. The anti-reflection structure has a function of reducing reflectance of visible light which enters through the layer containing a liquid crystal material.

(2) One embodiment of the present invention is a display panel in which the anti-reflection structure includes a transflective film, a reflective film, and an optical adjustment film.

The reflective film includes a region overlapping with the transflective film.

The optical adjustment film includes a region positioned between the transflective film and the reflective film.

The transflective film has a function of transmitting part of visible light and a function of reflecting another part of visible light The reflective film has a function of reflecting the part of visible light.

The optical adjustment film has a function of transmitting part of visible light. The optical adjustment film has a thickness which allows the phase of the part of visible light reflected by the reflective film to be adjusted so that the another part of visible light reflected by the transflective film is canceled out.

In the display panel of one embodiment of the present invention, reflectance of visible light which enters through the layer containing a liquid crystal material can be reduced. Thus, a novel display panel that is highly convenient or reliable can be provided.

(3) One embodiment of the present invention is the display panel including a coloring film.

The coloring film includes a region positioned between the anti-reflection structure and the third region. Furthermore, the coloring film includes a region provided so that the third region is positioned between the coloring film and the anti-reflection structure. The coloring film has a function of absorbing the another part of visible light.

The display panel of one embodiment of the present invention can reduce reflectance of visible light which enters through the layer containing a liquid crystal material. Furthermore, the visible light can be absorbed. Thus, a novel display panel that is highly convenient or reliable can be provided.

(4) An embodiment of the present invention is a display panel in which the first pixel includes the first of first display elements.

The second pixel includes the second of the first display elements.

The first of the first display elements includes the first of first electrodes and a second electrode.

The second of the first display elements includes the second of the first electrodes and the second electrode.

Note that the first of the first electrodes is provided so that an electric field for controlling an alignment of a liquid crystal material contained in the first region is generated between the first of the first electrodes and the second electrode.

Note that the second of the first electrodes is provided so that an electric field for controlling an alignment of a liquid crystal material contained in the second region is generated between the second of the first electrodes and the second electrode.

(5) Another embodiment of the present invention is a display panel in which the second electrode includes a region provided so that the first region is positioned between the second electrode and the first of the first electrodes.

The second electrode includes a region provided so that the second region is positioned between the second electrode and the second of the first electrodes.

In the display panel of one embodiment of the present invention, reflectance of visible light which enters through the third region of the layer containing a liquid crystal material, for example, the reflectance of a region in which the alignment of the liquid crystal is easily disordered and is difficult to control, can be reduced. Thus, a novel display panel that is highly convenient or reliable can be provided.

(6) An embodiment of the present invention is the display panel in which the first pixel includes a second display element.

The second display element includes a third electrode, a fourth electrode, and a layer containing a light-emitting material.

The third electrode includes a transflective film.

The fourth electrode includes a reflective film.

The optical adjustment film includes the layer containing a light-emitting material.

In the display panel of one embodiment of the present invention, reflectance of visible light which enters through the third region of the layer containing a liquid crystal material, for example, the reflectance of a region in which the alignment of the liquid crystal is easily disordered and is difficult to control, can be reduced with use of the second display element. This region can be effectively used. Thus, a novel display panel that is highly convenient or reliable can be provided.

(7) Another embodiment of the present invention is the display panel in which the second display element is provided so that display using the second display element can be seen from part of a region from which display using the first of the first display elements can be seen.

In the display panel of one embodiment of the present invention, the first of the first display elements or the second display element can be selected and used in accordance with the illuminance of a use environment, for example. Alternatively, both the first of the first display elements and the second display element can be used. Thus, a novel display panel that is highly convenient or reliable can be provided.

(8) An embodiment of the present invention is the display panel in which the second display element has a function of displaying a color different from a color displayed by the first of the first display elements.

(9) One embodiment of the present invention is a display panel in which the first pixel includes a third display element, a fourth display element, and a fifth display element.

The third display element is provided so that display using the third display element can be seen from part of a region from which display using the first of the first display elements can be seen.

The fourth display element is provided so that display using the fourth display element can be seen from part of a region from which display using the first of the first display elements can be seen.

The fifth display element is provided so that display using the fifth display element can be seen from part of a region from which display using the first of the first display elements can be seen.

The third display element has a function of displaying a color different from both a color displayed by the first of the first display elements and a color displayed by the second display element.

The fourth display element has a function of displaying a color different from a color displayed by the first of the first display elements, a color displayed by the second display element, and a color displayed by the third display element.

The fifth display element has a function of displaying a color different from a color displayed by the first of the first display elements, a color displayed the second display element, a color displayed by the third display element, and a color displayed by the fourth display element.

The first of the first display elements has a function of displaying white.

The second display element has a function of displaying blue, green, red, or white.

The third display element has a function of displaying blue, green, red, or white.

The fourth display element has a function of displaying blue, green, red, or white.

The fifth display element has a function of displaying blue, green, red, or white.

The display panel of one embodiment of the present invention can display image data with use of the first of the first display elements. Furthermore, the first of the first display elements or the second display element can be selected and used in accordance with the kind of the image data to be displayed. Furthermore, multicolor or full-color display can be performed using the second display element, the third display element, the fourth display element, and the fifth display element. Thus, a novel display panel that is highly convenient or reliable can be provided.

(10) One embodiment of the present invention is the display panel including a first conductive film, a second conductive film, a second insulating film, and a pixel circuit.

The first conductive film is electrically connected to the first of the first electrodes.

The second conductive film includes a region overlapping with the first conductive film.

The second insulating film includes a region positioned between the first conductive film and the second conductive film and has an opening.

The second conductive film is electrically connected to the first conductive film in the opening.

The pixel circuit is electrically connected to the second conductive film.

The third electrode is electrically connected to the pixel circuit.

The second display element has a function of emitting light toward the second insulating film.

The display panel of one embodiment of the present invention can drive the first of first display elements and the second display element which perform display using different methods from each other, for example, with the same pixel circuit. Furthermore, using the second insulating film, impurity diffusion between the first display element and the second display element can be suppressed. Thus, a novel display panel that is highly convenient or reliable can be provided.

(11) One embodiment of the present invention is the display panel including one group of pixels, another group of pixels, a scan line, and a signal line.

The one group of pixels include the first pixel and are arranged in a row direction.

The another group of pixels include the first pixel and are provided in a column direction that intersects the row direction.

The scan line is electrically connected to the one group of pixels.

The signal line is electrically connected to the another group of pixels.

(12) Another embodiment of the present invention is an input/output device including the display panel and an input portion.

The input portion has a function of sensing an object that approaches a region overlapping with the display panel.

(13) One embodiment of the present invention is an input/output panel in which the input portion includes a region overlapping with the display panel.

The input portion includes a control line, a sensing signal line, and a sensing element.

The sensing element is electrically connected to the control line and the sensing signal line.

The control line has a function of supplying a control signal.

The sensing element receives the control signal and has a function of supplying a sensing signal which changes in accordance with the control signal and a distance between the sensing element and an object approaching the region overlapping with the display panel.

The sensing signal line has a function of receiving the sensing signal.

The sensing element has a light-transmitting property and includes a first electrode and a second electrode.

The first electrode is electrically connected to the control line.

The second electrode is electrically connected to the sensing signal line and is provided so that an electric field part of which is blocked by the object approaching the region overlapping with the display panel is generated between the second electrode and the first electrode.

The display panel of one embodiment of the present invention can sense an object that approaches a region overlapping with the display panel. As a result, a novel input/output panel that is highly convenient or reliable can be provided.

(14) An embodiment of the present invention is a data processing device which includes at least one of a keyboard, a hardware button, a pointing device, a touch sensor, an illuminance sensor, an imaging device, an audio input device, a viewpoint input device, and an attitude determination device, and the above-described display panel.

In the data processing device of one embodiment of the present invention, power consumption can be reduced and excellent visibility can be ensured even in a bright place. As a result, a novel data processing device with high convenience or high reliability can be provided.

Note that in this specification, the display panel or the input/output panel can be provided with a flexible printed circuit, a tape carrier package, or an integrated circuit which is attached by a chip on glass (COG) method or a chip on film (COF) method.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, the term "source" of a transistor means a source region that is part of a semiconductor film functioning as an active layer or a source electrode connected to the semiconductor film. Similarly, the term "drain" of a transistor means a drain region that is part of the semiconductor film or a drain electrode connected to the semiconductor film. The term "gate" means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, voltage, or a potential can be supplied or transmitted.

In this specification, even when a circuit diagram illustrates independent components that are connected to each other, there is a case where one conductive film has functions of a plurality of components, such as the case where part of a wiring functions as an electrode. In this specification, the term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel display panel that is highly convenient or reliable can be provided. Alternatively, a novel input/output panel that is highly convenient or reliable can be provided. Alternatively, a novel data processing device that is highly convenient or reliable can be provided. Alternatively, a novel display panel, a novel input/output panel, a novel data processing device, or a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 4A and 4B are cross-sectional views illustrating a structure of a display panel of one embodiment.

FIG. 6 is a bottom view illustrating an arrangement of pixels in a display panel of one embodiment.

FIG. 8 is a block diagram illustrating a structure of a display panel of one embodiment.

FIGS. 9A, 9B1, and 9B2 illustrate the structure of an input/output panel of one embodiment.

BEST MODE FOR CARRYING OUT THE INVENTION

Figure 1A:
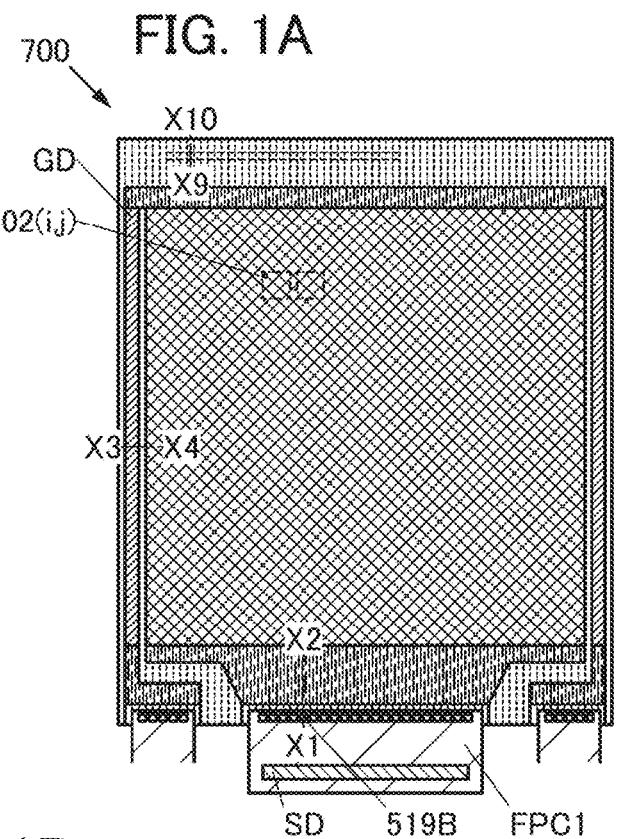
FIGS. 1A and 1B illustrate a structure of a display panel of one embodiment.

The display panel of one embodiment of the present invention includes a layer containing a liquid crystal material, a first pixel, a second pixel, and an anti-reflection structure. The layer containing a liquid crystal material includes a first region, a second region, and a third region. The first pixel includes the first region. The second pixel includes the second region. The anti-reflection structure has a region overlapping with the third region. The anti-reflection structure has a function of reducing reflectance of visible light which enters through the layer containing a liquid crystal material.

Thus, reflectance of visible light which enters through the layer containing a liquid crystal material can be reduced. Thus, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, the structure of a display panel of one embodiment of the present invention will be described with reference to FIGS. 1A and 1B, FIGS. 2A and 2B, FIGS. 3A and 3B, FIGS. 4A and 4B, FIGS. 5A, 5B1, 5B2, 5B3, and 5C, FIG. 6, FIG. 7, and FIG. 8.

Figure 1B:
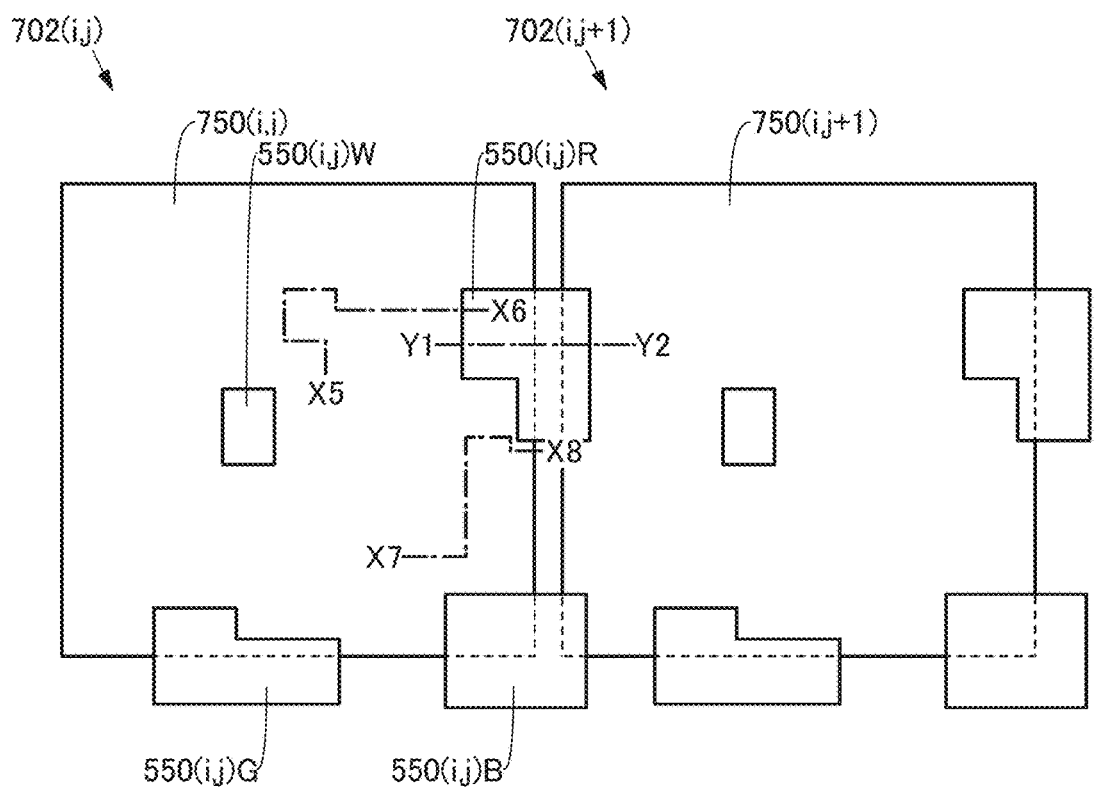

FIGS. 1A and 1B illustrate the structure of the display panel of one embodiment of the present invention. FIG. 1A is a top view of the display panel. FIG. 1B is a bottom view illustrating a structure of pixels included in the display panel.

Figure 2A:
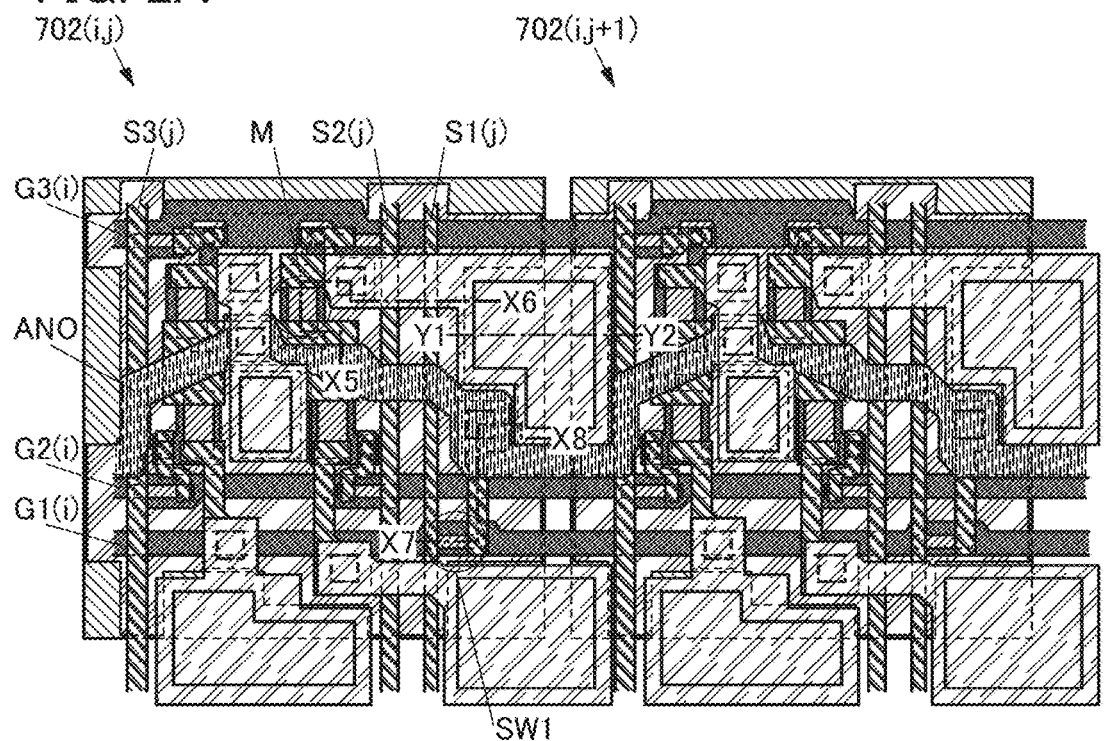
FIGS. 2A and 2B are bottom views illustrating structure of pixels in a display panel of one embodiment.
Figure 2B:
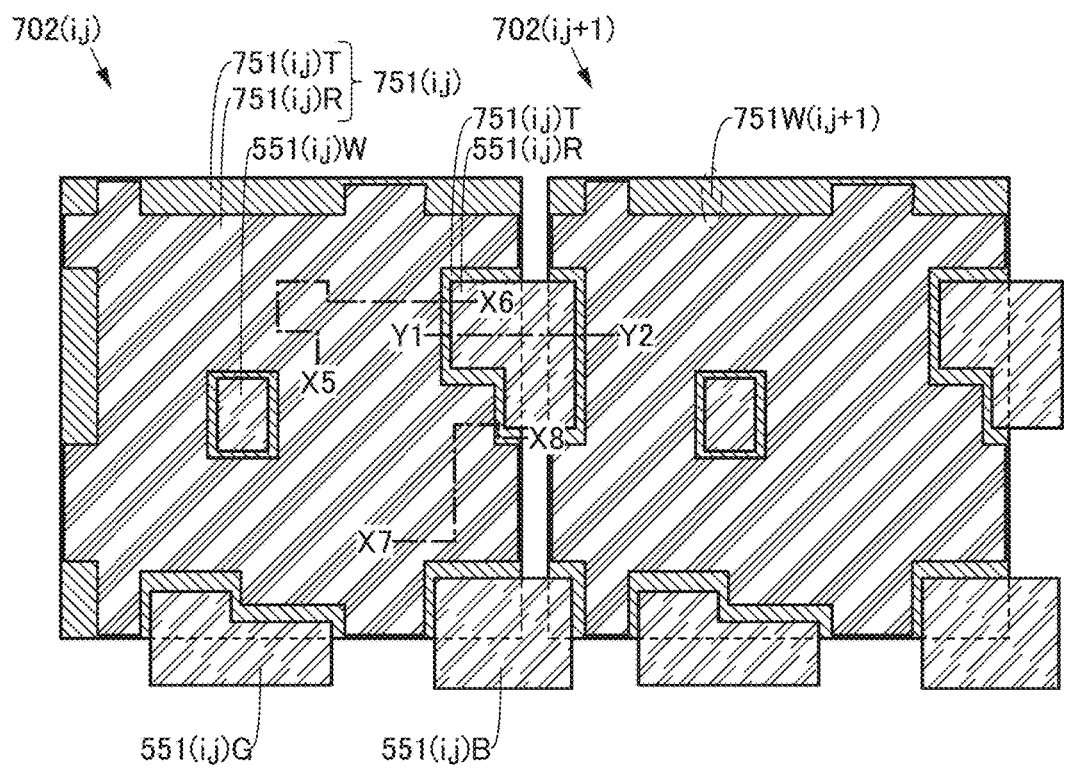

FIGS. 2A and 2B are bottom views illustrating the structure of pixels in the display panel of one embodiment of the present invention. FIG. 2A is a bottom view illustrating the structure of the pixels. FIG. 2B illustrates part of FIG. 2A.

Figure 3A:
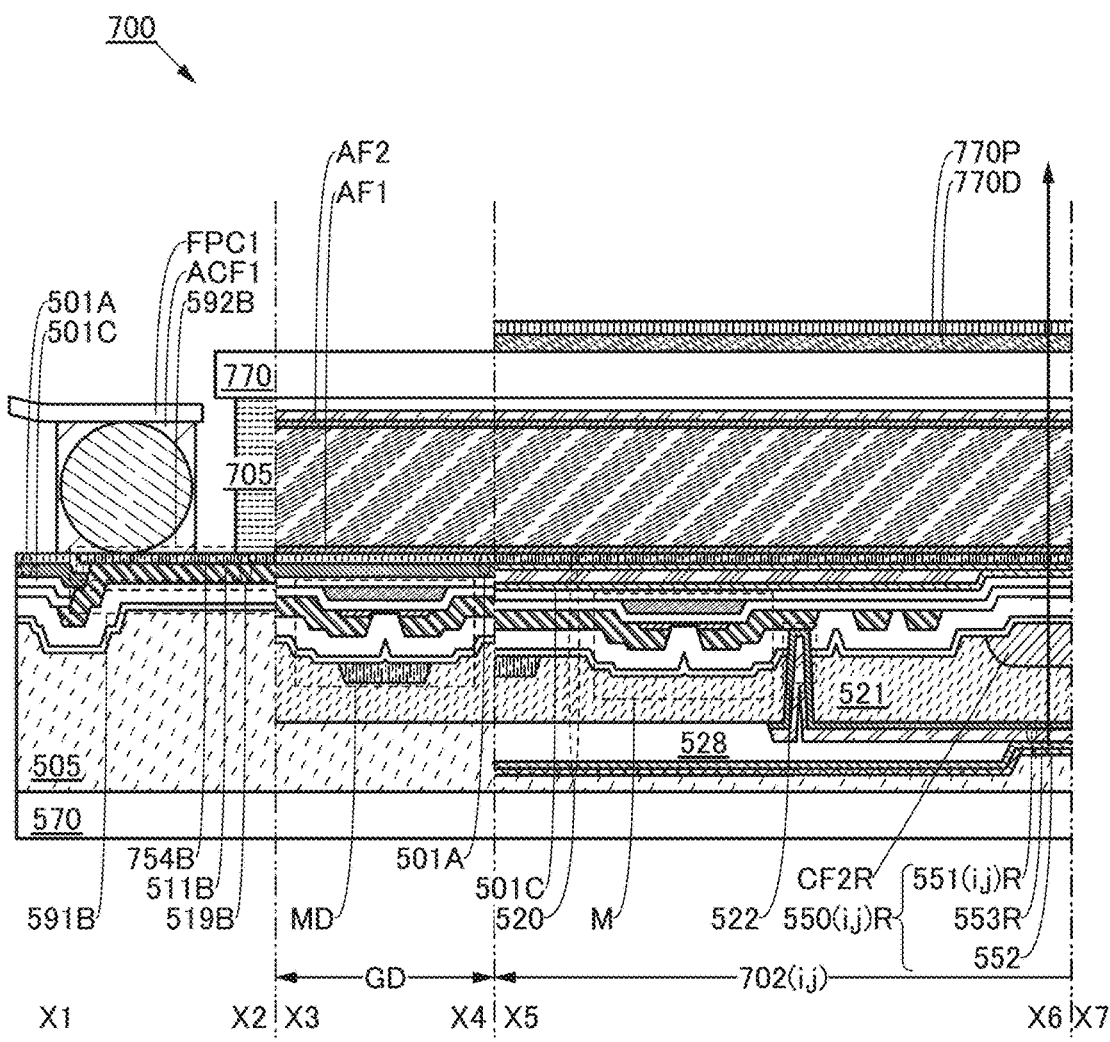
FIGS. 3A and 3B are cross-sectional views illustrating a structure of a display panel of one embodiment.
Figure 3B:
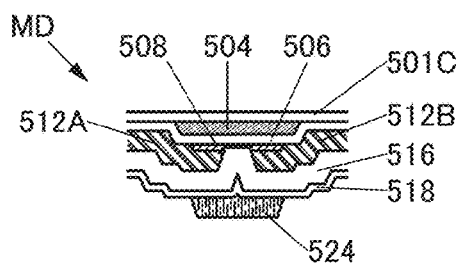

FIGS. 3A and 3B illustrate the structure of the display panel of one embodiment of the present invention. FIG. 3A is a cross-sectional view taken along the cutting plane lines X1-X2, X3-X4, and X5-X6 in FIGS. 1A and 1B. FIG. 3B illustrates part of FIG. 3A.

FIGS. 4A and 4B illustrate the structure of a display panel of one embodiment of the present invention. FIG. 4A is a cross-sectional view taken along the cutting plane lines X7-X8 and X9-X10 in FIGS. 1A and 1B. FIG. 4B illustrates part of FIG. 4A.

Figure 5A:
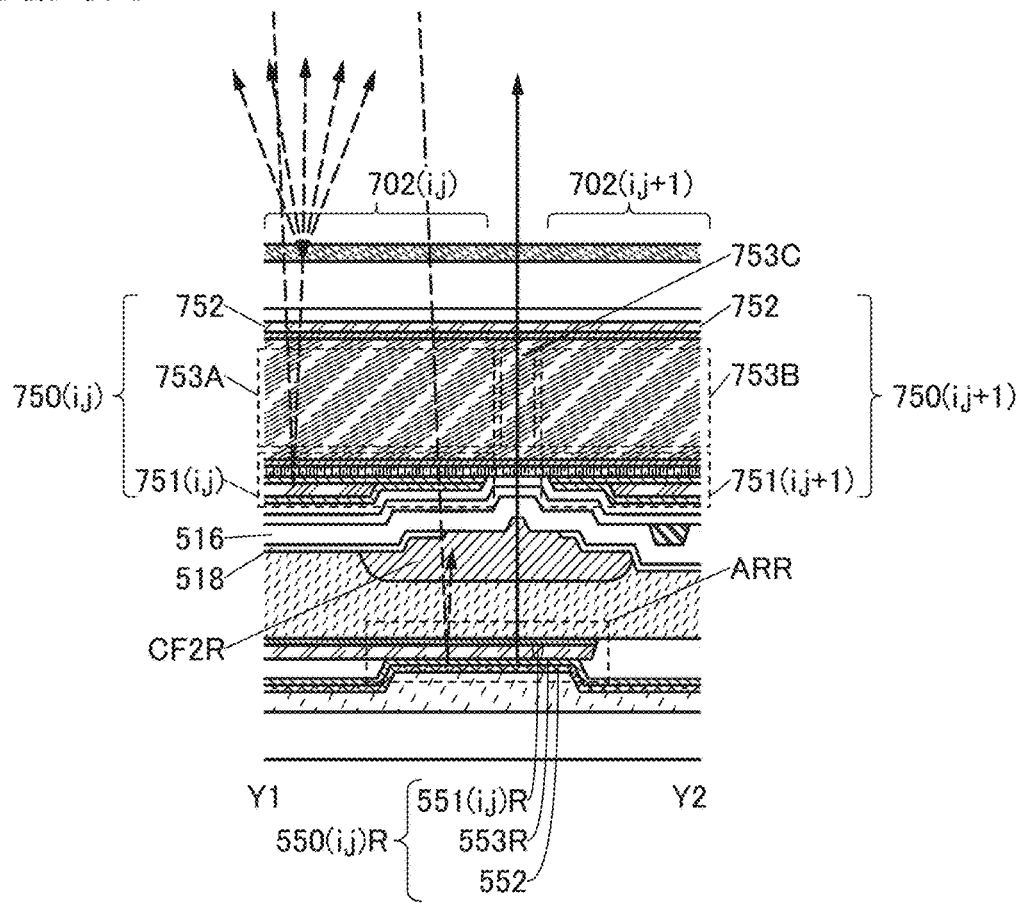
FIGS. 5A, 5B1, 5B2, 5B3, and 5C are cross-sectional views illustrating structures of a pixel in a display panel of one embodiment.
Figures 1, 5B:
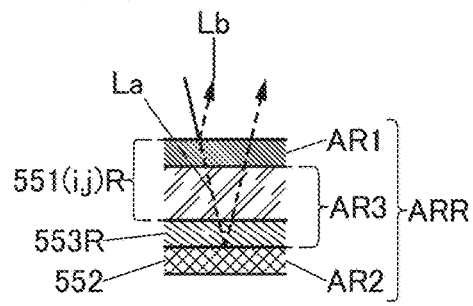
Figures 2, 5B:
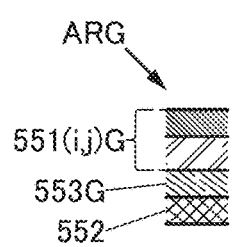
Figures 3, 5B:
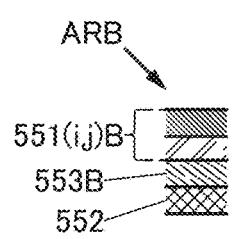
Figure 5C:
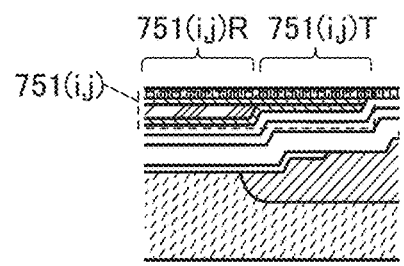

FIGS. 5A, 5B1, 5B2, 5B3, and 5C illustrate the structure of pixels in the display panel of one embodiment of the present invention. FIG. 5A is a cross-sectional view of a display panel of one embodiment of the present invention taken along a cutting plane line Y1-Y2 in FIG. 2A. FIG. 5B1 is a cross-sectional view illustrating part of FIG. 5A. FIGS. 5B2 and 5B3 are cross-sectional views illustrating modification examples of FIG. 5B1. FIG. 5C is a cross-sectional view illustrating another part of FIG. 5A.

FIG. 6 is a bottom view illustrating the arrangement of adjacent pixels in the display panel of one embodiment of the present invention.

Figure 7:
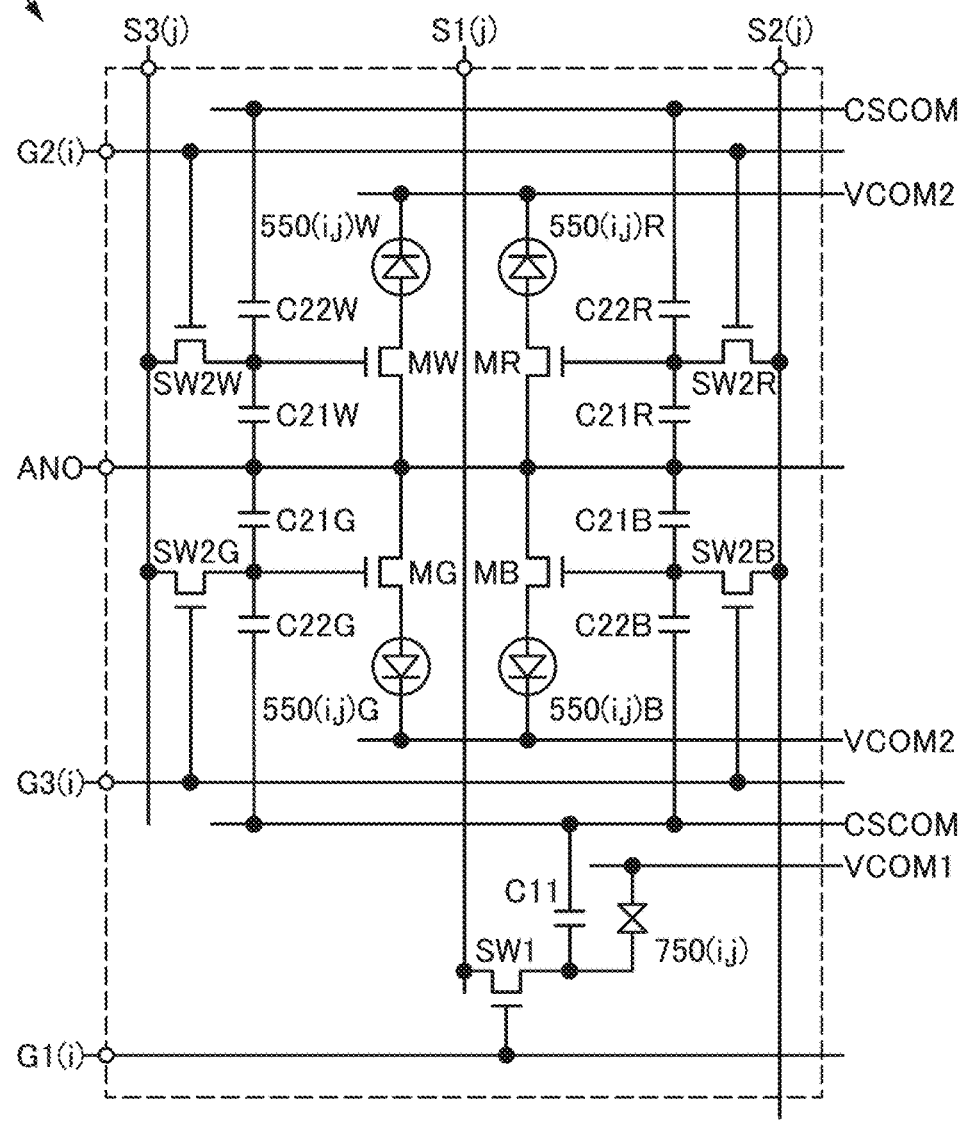
FIG. 7 is a circuit diagram illustrating a structure of a pixel in a display panel of one embodiment.

FIG. 7 is a circuit diagram illustrating a structure of a pixel circuit included in the display panel of an embodiment of the present invention.

FIG. 8 is a block diagram illustrating a structure of the display panel of one embodiment of the present invention.

Note that in this specification, an integral variable of 1 or larger may be used for reference numerals. For example, "(p)" where p is an integral value of 1 or more may be used for part of a reference numeral that specifies any one of components (p components in maximum). For another example, "(m, n)" where m and n are each an integral value of 1 or more may be used for part of a reference numeral that specifies any one of components (m×n components in maximum).

Structural Example 1 of Display Panel (1) The display panel 700 described in this embodiment includes a layer 753 containing a liquid crystal material, a first pixel 702(*i*, *j*), a second pixel 702(*i*, *j*+1), and an anti-reflection structure ARR (see FIG. 2A, FIG. 5A, and FIG. 6).

The layer 753 containing a liquid crystal material includes a first region 753A, a second region 753B, and a third region 753C (see FIG. 5A). The third region 753C includes a region positioned between the first region 753A and the second region 753B.

The first pixel 702(i, j) includes the first region 753A. The second pixel 702(i, j+1) includes the second region 753B.

The anti-reflection structure ARR includes a region overlapping with the third region 753C. The anti-reflection structure ARR has a function of reducing reflectance of visible light which enters through the layer 753 containing a liquid crystal material. For example, the reflectance of the region overlapping with the third region 753C can be reduced as compared to the case where the anti-reflection structure ARR is not provided.

(2) The anti-reflection structure ARR of the display panel 700 described in this embodiment includes a transflective film AR1, a reflective film AR2, and an optical adjustment film AR3 (see FIG. 5B1).

The reflective film AR2 includes a region overlapping with the transflective film AR1. The optical adjustment film AR3 includes a region positioned between the transflective film AR1 and the reflective film AR2.

The transflective film AR1 has a function of transmitting the part La of visible light and a function of reflecting another part Lb of visible light.

The reflective film AR2 has a function of reflecting the part La of visible light.

The optical adjustment film AR3 has a function of transmitting the part La of visible light. The optical adjustment film AR3 has a thickness with which phase of the part La of visible light reflected by the reflective film is adjusted so that the another part Lb of visible light reflected by the transflective film AR1 is canceled out.

For example, a length of a path through which light goes back and forth inside the optical adjustment film AR3 is adjusted so that optical length of the path be approximately (k+1/2) times the wavelength λ of incident visible light (note that the optical path length is the product of refractive index and distance, and k is an integer greater than or equal to 0). Thus, the another part Lb of visible light reflected by the transflective film AR1 can be canceled out with use of the part La of visible light. Alternatively, the another part Lb of visible light can be weakened with use of the part La of visible light. Note that a multi-layer film including a stack of a plurality of films having different refractive indexes can be used as the optical adjustment film AR3. In that case, the reflectance of lights with various wavelengths can be reduced.

In the display panel of one embodiment of the present invention, reflectance of visible light which enters through the layer containing a liquid crystal material can be reduced. Furthermore, reflection of visible light which enters through the layer containing a liquid crystal material can be reduced without providing a light-blocking film. Furthermore, reflection of visible light which enters through the layer containing a liquid crystal material can be reduced without a decrease in an aperture ratio of the pixel, for example. Thus, a novel display panel that is highly convenient or reliable can be provided.

The display panel 700 of one embodiment of the present invention includes an anti-reflection structure ARG and an anti-reflection structure ARB (see FIG. 6). The anti-reflection structure ARG includes the transflective film AR1, the reflective film AR2, and an optical adjustment film which is not illustrated. The anti-reflection structure ARB includes the transflective film AR1, the reflective film AR2, and the optical adjustment film which is not illustrated.

(3) The display panel 700 described in this embodiment includes a coloring film CF2R (see FIG. 5A). The coloring film CF2R includes a region positioned between the anti-reflection structure ARR and the third region 753C. The coloring film CF2R has a function of absorbing the another part Lb of visible light. Note that the coloring film CF2R may include a region provided so that the third region 753C is positioned between the coloring film CF2R and the anti-reflection structure ARR.

For example, a material which efficiently absorbs light with a shorter wavelength than light whose reflectance is reduced with the anti-reflection structure ARR as compared to light with a longer wavelength can be used for the coloring film CF2R. Specifically, in the case where the anti-reflection structure ARR has an effect of reducing reflectance of red light, a material which absorbs blue or green light can be used for the coloring film CF2R.

Alternatively, a material which efficiently absorbs light with a longer wavelength than light whose reflectance is reduced with the anti-reflection structure ARB as compared to light with a shorter wavelength can be used for the coloring film CF2R. Specifically, in the case where the anti-reflection structure ARB has an effect of reducing reflectance of blue light, a material which absorbs green or red light can be used for the coloring film CF2R.

In the display panel of one embodiment of the present invention, reflectance of visible light which enters through the layer containing a liquid crystal material can be reduced. Furthermore, the visible light can be absorbed. Thus, a novel display panel that is highly convenient or reliable can be provided.

The display panel 700 described in this embodiment includes a coloring film CF2G (not shown) and a coloring film CF2B (not shown).

The coloring film CF2G includes a region positioned between a second insulating film 501C and the anti-reflection structure ARG. The coloring film CF2G includes a region overlapping with a third display element 550(i, j)G.

The coloring film CF2B includes a region positioned between the second insulating film 501C and the anti-reflection structure ARB. The coloring film CF2G includes a region overlapping with the fourth display element 550(i, j)B.

(4) The first pixel 702(i, j) of the display panel 700 described in this embodiment includes a first display element 750(i, j). The second pixel 702(i, j+1) includes a first display element 750(i, j+1) (see FIG. 5A).

The first display element 750(i j) includes a first electrode 751(i, j) and a second electrode 752.

The first display element 750(i, j+1) includes a first electrode 751(i, j+1) and the second electrode 752.

Note that the first electrode 751(i, j) is provided so that an electric field for controlling an alignment of a liquid crystal material contained in the first region 753A is generated between the first electrode 751(i, j) and the second electrode 752.

Note that the first electrode 751(i, j+1) is provided so that an electric field for controlling an alignment of the liquid crystal material contained in the second region 753B is generated between the first electrode 751(i, j+1) and the second electrode 752.

The potential of the first electrode 751(i, j+1) can be different from that of the first electrode 751(i, j), for example. Thus, an electric field is applied to the third region 753C to change an alignment of the liquid crystal material contained in the third region 753C in some cases. Note that in this specification, the first display element 750(*i*, *j*) can be referred to as the first of the first display elements, and the first display element 750(*i*, *j*+1) can be referred to as the second of the first display elements. In addition, the first electrode 751(*i*, *j*) can be referred to as the first of the first electrodes, and the first electrode 751(*i*, *j*+1) can be referred to as the second of the first electrodes.

(5) The second electrode 752 of the display panel 700 described in this embodiment includes a region provided so that the first region 753A is positioned between the second electrode 752 and the first electrode 751(*i*, *j*). The second electrode 752 includes a region provided so that the second region 753B is positioned between the second electrode 752 and the first electrode 751(*i*, *j*+1).

In the display panel of one embodiment of the present invention, reflectance of visible light which enters through the third region of the layer containing a liquid crystal material, for example, the reflectance of a region in which the alignment of the liquid crystal is easily disordered and is difficult to control, can be reduced. Thus, a novel display panel that is highly convenient or reliable can be provided.

(6) The first pixel 702(*i*, *j*) of the display panel 700 described in this embodiment includes the second display element 550(*i*, *j*)R (see FIG. 5A).

Furthermore, the second display element 550(*i*, *j*)R includes a third electrode 551(*i*, *j*)R, a fourth electrode 552, and a layer 553R containing a light-emitting material. The third electrode 551(*i*, *j*)R includes the transflective film AR1. The fourth electrode 552 includes the reflective film AR2. The optical adjustment film AR3 includes a layer 553R containing a light-emitting material (see FIGS. 5A and 5B1).

In the display panel of one embodiment of the present invention, reflectance of visible light which enters through the third region of the layer containing a liquid crystal material, for example, the reflectance of a region in which the alignment of the liquid crystal is easily disordered and is difficult to control, can be reduced with use of the second display element. This region can be effectively used. Thus, a novel display panel that is highly convenient or reliable can be provided.

The first pixel 702(*i*, *j*) of the display panel 700 of this embodiment includes the third display element 550(*i*, *j*)G, the fourth display element 550(*i*, *j*)B, and a fifth display element 550(*i*, *j*)W (see FIG. 1B). Note that the third display element 550(*i*, *j*)G includes a third electrode 551(*i*, *j*)G, the fourth display element 550(*i*, *j*)B includes a third electrode 551(*i*, *j*)B, and the fifth display element 550(*i*, *j*)W includes a third electrode 551(*i*,*j*)W.

The third display element 550(*i*, *j*)G includes a third electrode 551(*i*, *j*)G, the fourth electrode 552, and a layer 553G containing a light-emitting material (see FIG. 2B and FIG. 5B2).

The fourth display element 550(*i*, *j*)B includes the third electrode 551(*i*, *j*)B, the fourth electrode 552, and a layer 553B containing a light-emitting material (see FIG. 2B and FIG. 5B3).

The fifth display element 550(*i*, *j*)W includes the third electrode 551(*i*, *j*)W, the fourth electrode 552, and a layer 553W containing a light-emitting material.

The fourth electrode 552 includes a region overlapping with the third electrode 551(*i*, *j*)R (see FIG. 3A and FIG. 5B1). Alternatively, the fourth electrode 552 includes a region overlapping with the third electrode 551(*i*, *j*)G, a region overlapping with the third electrode 551(*i*, *j*)B or the third electrode 551(*i*,*j*)W.

The layer 553R containing a light-emitting material includes a region positioned between the third electrode 551(*i*, *j*)R and the fourth electrode 552.

The layer 553G containing a light-emitting material includes a region positioned between the third electrode 551(*i*, *j*)G and the fourth electrode 552.

The layer 553B containing a light-emitting material includes a region positioned between the third electrode 551(*i*, *j*)B and the fourth electrode 552.

The layer 553W containing a light-emitting material includes a region positioned between the third electrode 551(*i*, *j*)W and the fourth electrode 552.

(7) The second display element 550(*i*, *j*)R of the display panel 700 described in this embodiment is provided so that the display using the second display element 550(*i*, *j*)R can be seen from part of a region from which the display using the first display element 750(*i*, *j*) can be seen (see FIG. 5A). For example, dashed arrows shown in FIG. 4A denote the directions in which external light is incident on and reflected by the first display element 750(*i*, *j*) that performs display by controlling the intensity of external light reflection. In addition, a solid arrow shown in FIG. 3A denotes the direction in which the second display element 550(*i*, *j*)R emits light to the part of the region from which the display using the first display element 750(*i*, *j*) can be seen.

In the display panel of one embodiment of the present invention, the first of the first display elements or the second display element can be selected and used in accordance with the illuminance of a use environment, for example. Alternatively, both the first of the first display elements and the second display element can be used. Thus, a novel display panel that is highly convenient or reliable can be provided.

(8) The second display element 550(*i*, *j*)R of the display panel 700 described in this embodiment has a function of displaying a color different from that displayed by the first display element 750(*i*, *j*). For example, a display element which can display white or black is used as the first display element 750(*i*, *j*). A display element which can display red can be used as the second display element 550(*i*, *j*)R.

(9) The first pixel 702(*i*, *j*) of the display panel 700 of this embodiment includes the third display element 550(*i*, *j*)G, the fourth display element 550(*i*, *j*)B, and the fifth display element 550(*i*, *j*)W (see FIG. 1B and FIG. 7).

(7) The third display element 550(1, *j*)G is provided so that display using the third display element 550(*i*, *j*)G can be seen from part of a region from which display using the first display element 750(*i*, *j*) can be seen.

The fourth display element 550(*i*, *j*)B is provided so that display using the fourth display element 550(*i*, *j*)B can be seen from part of a region from which display using the first display element 750(*i*, *j*) can be seen.

The fifth display element 550(*i*, *j*)W is provided so that display using the fifth display element 550(*i*, *j*)W can be seen from part of a region from which display using the first display element 750(*i*, *j*) can be seen.

The third display element 550(*i*, *j*)G has a function of displaying a color different from both a color displayed by the first display element 750(*i*, *j*) and a color displayed by the second display element 550(*i*, *j*)R.

The fourth display element 550(*i*, *j*)B has a function of displaying a color different from a color displayed by the first display element 750(*i*, *j*), a color displayed by the second display element 550(*i*, *j*)R, and a color displayed by the third display element 550(*i*, *j*)G.

The fifth display element 550(*i*, *j*)W has a function of displaying a color different from a color displayed by the first display element 750(*i*, *j*), a color displayed by the second display element 550(*i, j*)R, a color displayed by the third display element 550(*i, j*)G, and a color displayed by the fourth display element 550(*i, j*)B.

The first display element 750(*i, j*) has a function of displaying white.

The second display element 550(*i, j*)R has a function of displaying blue, green, red, or white.

The third display element 550(*i, j*)G has a function of displaying blue, green, red, or white.

The fourth display element 550(*i, j*)B has a function of displaying blue, green, red, or white.

The fifth display element 550(*i, j*)W has a function of displaying blue, green, red, or white.

The display panel of one embodiment of the present invention can display image data with use of the first of the first display elements. Furthermore, the first of the first display elements or the second display element can be selected and used in accordance with the kind of the image data to be displayed. Furthermore, multicolor or full-color display can be performed using the second display element, the third display element, the fourth display element, and the fifth display element. Thus, a novel display panel that is highly convenient or reliable can be provided.

(10) The display panel 700 of one embodiment of the present invention includes a first conductive film, a second conductive film, the second insulating film 501C, and a pixel circuit 530(*i, j*) (see FIGS. 3A and 3B, FIGS. 4A and 4B, and FIG. 7).

The first conductive film is electrically connected to the first electrode 751(*i, j*). For example, the first electrode 751(*i, j*) can be used as the first conductive film.

The second conductive film includes a region overlapping with the first conductive film. For example, a conductive film 512B serving as a source electrode or a drain electrode of a transistor used as a switch SW1 of the pixel circuit 530(*i, j*) can be used as the second conductive film (see FIG. 4A and FIG. 7).

The second insulating film 501C includes a region positioned between the first conductive film and the second conductive film and has an opening 591A. Furthermore, the second insulating film 501C includes a region positioned between a first insulating film 501A and a conductive film 511B. Moreover, the second insulating film 501C has an opening 591B in the region positioned between the first insulating film 501A and the conductive film 511B. The second insulating film 501C has an opening 591C in a region positioned between the first insulating film 501A and a conductive film 511C (see FIGS. 3A and 3B and FIGS. 4A and 4B).

The second conductive film is electrically connected to the first conductive film through the opening 591A. For example, the conductive film 512B is electrically connected to the first electrode 751(*i, j*). The first conductive film electrically connected to the second conductive film through the opening 591A provided in the second insulating film 501C can be referred to as a through electrode.

The pixel circuit 530(*i, j*) is electrically connected to the second conductive film, and the third electrode 551(*i, j*)R is electrically connected to the pixel circuit 530(*i, j*).

The second display element 550(*i, j*)R has a function of emitting light toward the second insulating film 501C.

The third display element 550(*i, j*)G is electrically connected to the pixel circuit 530(*i, j*) and has a function of emitting light toward the second insulating film 501C (see FIG. 7).

The fourth display element 550(*i, j*)B is electrically connected to the pixel circuit 530(*i, j*) and has a function of emitting light toward the second insulating film 501C.

The fifth display element 550(*i, j*)W is electrically connected to the pixel circuit 530(*i, j*) and has a function of emitting light toward the second insulating film 501C.

The display panel of one embodiment of the present invention can drive the first of first display elements and the second display element which perform display using different methods from each other, for example, with the same pixel circuit. Furthermore, impurity diffusion between the first display element and the second display element can be suppressed using the second insulating film. Thus, a novel display panel that is highly convenient or reliable can be provided.

(11) The display panel 700 described in this embodiment includes one group of pixels 702(*i*, 1) to 702(*i, n*), another group of pixels 702(1, *j*) to 702(*m, j*), scan lines G1(*i*) to G3(*i*), and signal lines S1(*j*) to S3(*j*) (see FIG. 7 and FIG. 8). Note that i is an integer greater than or equal to 1 and less than or equal to m, j is an integer greater than or equal to 1 and less than or equal to n, and each of m and n is an integer greater than or equal to 1.

The one group of pixels 702(*i*, 1) to 702(*i, n*) include the first pixel 702(*i, j*) and are arranged in a row direction (indicated by the arrow R1 in the drawing).

The another group of pixels 702(1, *j*) to 702(*m, j*) include the first pixel 702(*i, j*) and are arranged in the column direction (the direction indicated by the arrow C1 in the drawing) that intersects the row direction.

The scan lines G1(*i*) to G3(*i*) are electrically connected to the one group of pixels 702(*i*, 1) to 702(*i, n*).

The signal lines S1(*j*) to S3(*j*) are electrically connected to the another group of pixels 702(1, *j*) to 702(*m, j*).

The display panel 700 described in this embodiment includes the first insulating film 501A (see FIGS. 3A and 3B or FIGS. 4A and 4B).

The first insulating film 501A has a first opening 592A, a second opening 592B, and an opening 592C.

The first opening 592A includes a region overlapping with a first intermediate film 754A and the first electrode 751(*i, j*) or a region overlapping with the first intermediate film 754A and the second insulating film 501C.

The second opening 592B includes a region overlapping with the second intermediate film 754B and the third conductive film 511B. Furthermore, the opening 592C includes a region overlapping with an intermediate film 754C and the conductive film 511C.

The first insulating film 501A includes a region that is along an outer edge of the first opening 592A and is between the first intermediate film 754A and the second insulating film 501C. The first insulating film 501A also includes a region that is along an outer edge of the second opening 592B and is between the second intermediate film 754B and the third conductive film 511B.

The display panel 700 described in this embodiment includes the scan lines G1(*i*) to G3(*i*), the signal lines S1(*j*) to S3(*j*), a wiring VCOM1, a wiring CSCOM, a wiring VCOM2, and a wiring ANO (see FIG. 7 and FIG. 8).

The first electrode 751(*i, j*) includes regions 751(*i, j*)T and 751(*i, j*)R (see FIG. 2B or FIG. 5C). The region 751(*i, j*)T has conductivity and a property of transmitting visible light. The region 751(*i, j*)R has conductivity and a property of reflecting visible light.

For example, a stack including a plurality of conductive films having a light-transmitting property can be used for the region 751(*i, j*)T. Furthermore, a stack in which a reflective film is provided between light-transmitting conductive films can be used for the region 751(i, j)R.

The region 751(i, j)T includes a region overlapping with the second display element 550(i, j)R (see FIGS. 2A and 2B, and FIG. 5A). Alternatively, the region 751(i, j)T includes a region overlapping with the third display element 550(i, j)G, the fourth display element 550(i, j)B, or the fifth display element 550(i, j)W.

The third electrode 551(i, j)R is electrically connected to the pixel circuit 530(i, j) at a connection portion 522 (see FIG. 3A). The third electrode 551(i, j)G is electrically connected to the pixel circuit 530(i, j) at a connection portion, which is not shown. The third electrode 551(i, j)B is electrically connected to the pixel circuit 530(i, j) at a connection portion, which is not shown. The third electrode 551(i, j)W is electrically connected to the pixel circuit 530(i, j) at a connection portion, which is not shown.

The first display element 750(i, j) of the display panel 700 described in this embodiment includes the layer 753 containing a liquid crystal material, the first electrode 751(i, j), and the second electrode 752. The second electrode 752 is positioned such that an electric field which controls the alignment of the liquid crystal material is generated between the second electrode 752 and the first electrode 751(i, j) (see FIG. 3A and FIG. 4A).

Furthermore, the display panel 700 described in this embodiment includes the alignment film AF1 and the alignment film AF2. The alignment film AF2 includes a region provided so that the layer 753 containing a liquid crystal material is positioned between the alignment film AF2 and the alignment film AF1.

The display panel 700 described in this embodiment includes the first intermediate film 754A and the second intermediate film 754B.

The first intermediate film 754A includes a region which overlaps with the second insulating film 501C with the first conductive film interposed therebetween, and the first intermediate film 754A includes a region in contact with the first electrode 751(i, j). The second intermediate film 754B includes a region in contact with the third conductive film 511B. The intermediate film 754C includes a region in contact with the conductive film 511C.

The display panel 700 described in this embodiment includes a functional film 770P and a functional film 770D.

The functional film 770P includes a region overlapping with the first display element 750(i, j).

The functional film 770D includes a region overlapping with the first display element 750(i, j). The functional film 770D includes a region provided so that a substrate 770 is positioned between the functional film 770D and the first display element 750(i, j). This can diffuse light reflected by the first display element 750(i, j), for example.

The display panel 700 described in this embodiment includes a substrate 570, the substrate 770, and a functional layer 520.

The substrate 770 includes a region overlapping with the substrate 570.

The functional layer 520 includes a region positioned between the substrate 570 and the substrate 770 (see FIG. 3A). The functional layer 520 includes the pixel circuit 530(i, j), the second display element 550(i, j)R, an insulating film 521, and an insulating film 528. The functional layer 520 includes an insulating film 518 and an insulating film 516 (see FIGS. 3A and 3B). Furthermore, the functional layer 520 includes the second display elements 550(i, j)G, 550(i, j)B, and 550(i, j)W, which are not shown.

The insulating film 521 includes a region positioned between the pixel circuit 530(i, j) and the second display element 550(i, j)B.

The insulating film 528 includes a region positioned between the insulating film 521 and the substrate 570. The insulating film 528 has openings in a region overlapping with the second display element 550(i, j)R, a region overlapping with the second display element 550(i, j)G, a region overlapping with the second display element 550(i, j)B, and a region overlapping with the second display element 550(i, j)W.

The insulating film 528 formed along the periphery of the third electrode 551(i, j)R can prevent a short circuit between the third electrode 551(i, j)R and the fourth electrode 552.

The insulating film 528 formed along the periphery of the third electrode 551(i, j)G can prevent a short circuit between the third electrode 551(i, j)G and the fourth electrode 552.

The insulating film 528 formed along the edges of the third electrode 551(i, j)B can prevent a short circuit between the third electrode 551(i, j)B and the fourth electrode 552.

The insulating film 528 formed along the edges of the third electrode 551(i, j)W can prevent a short circuit between the third electrode 551(i, j)W and the fourth electrode 552.

The insulating film 518 includes a region positioned between the insulating film 521 and the pixel circuit 530(i, j). The insulating film 516 includes a region positioned between the insulating film 518 and the pixel circuit 530(i, j).

Moreover, the display panel 700 described in this embodiment includes a bonding layer 505, a sealant 705, and a structure body KB1.

The bonding layer 505 includes a region positioned between the functional layer 520 and the substrate 570, and has a function of bonding the functional layer 520 and the substrate 570 together The sealing material 705 includes a region positioned between the functional layer 520 and the substrate 770, and has a function of bonding the functional layer 520 and the substrate 770 together.

The structure body KB1 includes a region positioned between the functional layer 520 and the substrate 770 and has a function of providing a certain space between the functional layer 520 and the substrate 770.

The display panel described in this embodiment includes a terminal 519B and a terminal 519C. The terminal 519B is electrically connected to the signal line S1(j), for example. The conductive film 511C is electrically connected to the wiring VCOM1, for example.

The terminal 519B includes the conductive film 511B and the intermediate film 754B, and the intermediate film 754B includes a region in contact with the conductive film 511B. The terminal 519C includes the conductive film 511C and the intermediate film 754C, and the intermediate film 754C includes a region in contact with the conductive film 511C.

A conductive material CP is positioned between the terminal 519C and the second electrode 752, and electrically connects the terminal 519C and the second electrode 752. For example, a conductive particle can be used as the conductive material CP.

The display panel described in this embodiment also includes a driver circuit GD and a driver circuit SD (see FIGS. 1A and 1B and FIG. 8).

The driver circuit GD is electrically connected to the scan lines G1(i) to G3(i). The driver circuit GD includes a transistor MD, for example. Specifically, a transistor including a semiconductor film that can be formed in the same step as the transistor included in the pixel circuit 530(*i, j*) can be used as the transistor MD (see FIGS. 3A and 3B).

The driver circuit SD is electrically connected to the signal lines 1(*j*) to S3(*j*). The driver circuit SD is electrically connected to, for example, the terminal 519B.

Individual components included in the display panel will be described below. Note that these components cannot be clearly distinguished and one component may also serve as another component or include part of another component.

For example, the first conductive film can be used as the first electrode 751(*i, j*). The first conductive film can be used as a reflective film.

In addition, the second conductive film can be used as the conductive film 512B serving as a source electrode or a drain electrode of a transistor.

The third electrode 551(*i, j*)R can be used as the transflective film AR1.

The fourth electrode 552 can be used as the reflective film AR2.

The layer 553R containing a light-emitting material can be used as the optical adjustment film AR3.

<<Structure Example>>

The display panel of one embodiment of the present invention includes the substrate 570, the substrate 770, the structure body KB1, the sealant 705, or the bonding layer 505.

In addition, the display panel of one embodiment of the present invention includes the functional layer 520, the insulating film 521, the insulating film 528, the insulating film 516, or the insulating film 518.

The display panel of one embodiment of the present invention includes the first insulating film 501A, the second insulating film 501C, the intermediate film 754A, the intermediate film 754B, or the intermediate film 754C.

In addition, the display panel of one embodiment of the present invention includes the signal line S1(*j*), the signal line S2(*j*), the signal line S3(*j*), the scan line G1(*i*), the scan line G2(*i*), the scan line G3(*i*), the wiring VCOM1, the wiring VCOM2, the wiring CSCOM, or the wiring ANO.

The display panel of one embodiment of the present invention also includes the terminal 519B, the terminal 519C, the conductive film 511B, or the conductive film 511C.

The display panel of one embodiment of the present invention also includes the first conductive film or the second conductive film.

The display panel of one embodiment of the present invention includes the pixel 702(*i, j*), the pixel circuit 530(*i, j*), the conductive film 512B, or the switch SW1.

The display panel of one embodiment of the present invention also includes the first display element 750(*i, j*), the first electrode 751(*i, j*), the reflective film, the layer 753 containing a liquid crystal material, or the second electrode 752.

In addition, the display panel of one embodiment of the present invention includes the alignment film AF1, the alignment film AF2, the coloring film CF2B, the coloring film CF2G, the coloring film CF2R, the functional film 770P, or the functional film 770D.

In addition, the display panel of one embodiment of the present invention includes the second display element 550(*i, j*)R, the third electrode 551(*i, j*)R, the fourth electrode 552, or the layer 553R containing a light-emitting material.

The display panel of one embodiment of the present invention includes the anti-reflection structure ARR, the transflective film AR1, the reflective film AR2, or the optical adjustment film AR3.

In addition, the display panel of one embodiment of the present invention includes a selection circuit 239, the driver circuit GD, or the driver circuit SD.

<<Substrate 570>>

The substrate 570 or the like can be formed using a material having heat resistance high enough to withstand heat treatment in the manufacturing process. For example, a material with a thickness greater than or equal to 0.1 mm and less than or equal to 0.7 mm can be used for the substrate 570. Specifically, a material polished to a thickness of approximately 0.1 mm can be used.

For example, a large-sized glass substrate having any of the following sizes can be used as the substrate 570 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570 or the like, an organic material, an inorganic material, a composite material of an organic material and an inorganic material, or the like can be used. For example, an inorganic material such as glass, ceramic, or metal can be used for the substrate 570 or the like.

Specifically, non-alkali glass, soda-lime glass, potash glass, crystal glass, aluminosilicate glass, tempered glass, chemically tempered glass, quartz, sapphire, or the like can be used for the substrate 570 or the like. Specifically, an inorganic oxide film, an inorganic nitride film, an inorganic oxynitride film, or the like can be used for the substrate 570 or the like. For example, a silicon oxide film, a silicon nitride film, a silicon oxynitride film, an aluminum oxide film, or the like can be used for the substrate 570 or the like. Stainless steel, aluminum, or the like can be used for the substrate 570 or the like.

For example, a single crystal semiconductor substrate or a polycrystalline semiconductor substrate of silicon or silicon carbide, a compound semiconductor substrate of silicon germanium or the like, an SOI substrate, or the like can be used as the substrate 570 or the like. Thus, a semiconductor element can be provided over the substrate 570 or the like.

For example, an organic material such as a resin, a resin film, or plastic can be used for the substrate 570 or the like. Specifically, a resin film or a resin plate of polyester, polyolefin, polyamide, polyimide, polycarbonate, an acrylic resin, or the like can be used for the substrate 570 or the like.

For example, a composite material formed by attaching a metal plate, a thin glass plate, or a film of an inorganic material to a resin film or the like can be used for the substrate 570 or the like. For example, a composite material formed by dispersing a fibrous or particulate metal, glass, an inorganic material, or the like into a resin film can be used for the substrate 570 or the like. For example, a composite material formed by dispersing a fibrous or particulate resin, an organic material, or the like into an inorganic material can be used for the substrate 570 or the like.

Furthermore, a single-layer material or a layered material in which a plurality of layers are stacked can be used for the substrate 570 or the like. For example, a layered material in which a base, an insulating film that prevents diffusion of impurities contained in the base, and the like are stacked can be used for the substrate 570 or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the substrate 570 or the like. Alternatively, a layered material in which a resin and a film for preventing diffusion of impurities that penetrate the resin, such as a silicon oxide film, a silicon nitride film, or a silicon oxynitride film, are stacked can be used for the substrate 570 or the like.

Specifically, a resin film, a resin plate, a layered material, or the like of polyester, polyolefin, polyamide, polyimide, polycarbonate, an acrylic resin, or the like can be used for the substrate 570 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570 or the like.

Specifically, polyethylene terephthalate (PET), polyethylene naphthalate (PEN), polyethersulfone (PES), acrylic, or the like can be used for the substrate 570 or the like. Alternatively, a cyclo olefin polymer (COP), a cyclo olefin copolymer (COC), or the like can be used.

Alternatively, paper, wood, or the like can be used for the substrate 570 or the like.

For example, a flexible substrate can be used as the substrate 570 or the like.

Note that a transistor, a capacitor, or the like can be directly formed on the substrate. Alternatively, a transistor, a capacitor, or the like formed on a substrate for use in manufacturing processes which can withstand heat applied in the manufacturing process can be transferred to the substrate 570 or the like. Thus, a transistor, a capacitor, or the like can be formed over a flexible substrate, for example.

<<Substrate 770>>

For example, a light-transmitting material can be used for the substrate 770. Specifically, any of the materials that can be used for the substrate 570 can be used for the substrate 770.

For example, aluminosilicate glass, tempered glass, chemically tempered glass, sapphire, or the like can be favorably used for the substrate 770 that is on a side closer to a user of the display panel. This can prevent breakage or damage of the display panel caused by the use.

A material with a thickness greater than or equal to 0.1 mm and less than or equal to 0.7 mm can be also used for the substrate 770, for example. Specifically, a substrate polished for reducing the thickness can be used. In that case, the functional film 770D can be close to the first display element 750($i, j$). As a result, image blur can be reduced and an image can be displayed clearly.

<<Structure Body KB1>>

The structure body KB1 or the like can be formed using an organic material, an inorganic material, or a composite material of an organic material and an inorganic material. Accordingly, a predetermined space can be provided between components between which the structure body KB1 and the like are provided.

Specifically, for the structure body KB1, polyester, polyolefin, polyamide, polyimide, polycarbonate, polysiloxane, an acrylic resin, or the like, or a composite material of a plurality of resins selected from these can be used. Alternatively, a photosensitive material may be used.

<<Sealing Material 705>>

For the sealing material 705 or the like, an inorganic material, an organic material, a composite material of an inorganic material and an organic material, or the like can be used.

For example, an organic material such as a thermally fusible resin or a curable resin can be used for the sealing material 705 or the like.

For example, an organic material such as a reactive curable adhesive, a light curable adhesive, a thermosetting adhesive, and/or an anaerobic adhesive can be used for the sealing material 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used for the sealing material 705 or the like.

<<Bonding Layer 505>>

For example, any of the materials that can be used for the sealing material 705 can be used for the bonding layer 505.

<<Functional Layer 520>>

For example, the pixel circuit 530($i, j$), the second display element 550($i, j$)R, the insulating film 521, or the insulating film 528 can be used as the functional layer 520

<<Insulating Film 521>>

For example, an insulating inorganic material, an insulating organic material, or an insulating composite material containing an inorganic material and an organic material can be used for the insulating film 521 or the like.

Specifically, for example, an inorganic oxide film, an inorganic nitride film, an inorganic oxynitride film, or a material obtained by stacking any of these films and the like can be used as the insulating film 521 or the like. For example, a silicon oxide film, a silicon nitride film, a silicon oxynitride film, an aluminum oxide film, or a film including a stack of any of these films and the like can be used as the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<<Insulating Film 528>>

For example, any of the materials that can be used for the insulating film 521 can be used for the insulating film 528 or the like. Specifically, a 1-μm-thick polyimide-containing film can be used as the insulating film 528.

<<Insulating Film 516 and Insulating Film 518>>

For example, a material which can be used for the insulating film 521 can be used for the insulating film 516 or the insulating film 518. Specifically, a silicon oxide film can be used as the insulating film 516. Alternatively, a silicon nitride film can be used as the insulating film 518.

<<First Insulating Film 501A>>

For example, any of the materials that can be used for the insulating film 521 can be used for the first insulating film 501A. For example, a material having a function of supplying hydrogen can be used for the first insulating film 501A.

Specifically, a material obtained by stacking a material containing silicon and oxygen and a material containing silicon and nitrogen can be used for the first insulating film 501A. For example, a material having a function of releasing hydrogen by heating or the like to supply the hydrogen to another component can be used for the first insulating film 501A. Specifically, a material having a function of releasing hydrogen taken in the manufacturing process, by heating or the like, to supply the hydrogen to another component can be used for the first insulating film 501A.

For example, a film containing silicon and oxygen that is formed by a chemical vapor deposition method using silane or the like as a source gas can be used as the first insulating film 501A.

Specifically, a material in which a 200- to 600-nm-thick material containing silicon and oxygen and a material containing silicon and nitrogen with a thickness of approximately 200 nm are stacked can be used for the first insulating film 501A.

<<Second Insulating Film 501C>>

For example, the material that can be used for the insulating film 521 can be used for the second insulating film 501C. Specifically, a material containing silicon and oxygen can be used for the second insulating film 501C. Thus, diffusion of impurities into the pixel circuit, the second display element, or the like can be inhibited.

For example, a 200-nm-thick film containing silicon, oxygen, and nitrogen can be used as the second insulating film 501C.

<<Intermediate Film 754A, Intermediate Film 754B, Intermediate Film 754C>>

A film with a thickness greater than or equal to 10 nm and less than or equal to 500 nm, preferably greater than or equal to 10 nm and less than or equal to 100 nm, can be used for the intermediate film 754A, the intermediate film 754B, or the intermediate film 754C, for example. Note that in this this specification, the intermediate film 754A, the intermediate film 754B, or the intermediate film 754C is referred to as an intermediate film.

For example, a material having a function of allowing hydrogen passage and supplying hydrogen can be used for the intermediate film.

For example, a conductive material can be used for the intermediate film.

For example, a light-transmitting material can be used for the intermediate film.

Specifically, a material containing indium and oxygen, a material containing indium, gallium, zinc, and oxygen, a material containing indium, tin, and oxygen, or the like can be used for the intermediate film. Note that these materials have a function of allowing the passage of hydrogen.

Specifically, a 50- or 100-nm-thick film containing indium, gallium, zinc, and oxygen can be used as the intermediate film.

Note that a material obtained by stacking films serving as an etching stopper can be used as the intermediate film. Specifically, a layered material obtained by stacking a 50-nm-thick film containing indium, gallium, zinc, and oxygen and a 20-nm-thick film containing indium, tin, and oxygen, in this order, can be used for the intermediate film.

<<Wiring, Terminal, and Conductive Film>>

A conductive material can be used for the wiring or the like. Specifically, the conductive material can be used for the signal line S1(j), the signal line S2(j), the signal line S3(j), the scan line G1(i), the scan line G2(i), the scan line G3(i), the wiring CSCOM, the wiring ANO, the terminal 519B, the terminal 519C, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecular compound can be used for the wiring or the like.

Note that the terminal 519B can be electrically connected to a flexible printed circuit FPC1 using a conductive material ACF1, for example.

<<First Conductive Film and Second Conductive Film>>

For example, any of the materials that can be used for the wiring or the like can be used for the first conductive film or the second conductive film.

Alternatively, the first electrode 751(i, j), the wiring, or the like can be used for the first conductive film.

The conductive film 512B functioning as the source electrode or the drain electrode of the transistor that can be used for the switch SW1, the wiring, or the like can be used for the second conductive film.

<<Pixel 702(i, j)>>

The pixel circuit 530(i, j), the first display element 750(i, j), the second display element 550(i, j)R, the third display element 550(i, j)G, the fourth display element 550(i, j)B, or the fifth display element 550(i, j)W can be used for the pixel 702(i, j), for example.

<<Pixel Circuit 530(i, j)>>

The pixel circuit 530(i, j) is electrically connected to the signal line S1(j), the signal line S2(j), the signal line S3(j), the scan line G1(i), the scan line G2(i), the scan line G3(i), the wiring CSCOM, and the wiring ANO (see FIG. 7).

The pixel circuit 530(i, j) includes the switch SW1 and a capacitor C11.

The pixel circuit 530(i, j) includes a switch SW2R, a transistor MR, a capacitor C21R, and a capacitor C22R.

The pixel circuit 530(i, j) includes a switch SW2G, a transistor MG, a capacitor C21G, and a capacitor C22G.

The pixel circuit 530(i, j) includes a switch SW2B, a transistor MB, a capacitor C21B, and a capacitor C22B.

The pixel circuit 530(i, j) includes a switch SW2W, a transistor MW, a capacitor C21W, and a capacitor C22W.

For example, a transistor including a gate electrode electrically connected to the scan line G1(i) and a first electrode electrically connected to the signal line S1(j) can be used for the switch SW1.

The capacitor C11 includes a first electrode electrically connected to a second electrode of the transistor used as the switch SW1 and a second electrode electrically connected to the wiring CSCOM.

The first electrode and the second electrode of the first display element 750(i, j) are electrically connected to the second electrode of the transistor used as the switch SW1 and the wiring VCOM1, respectively. This enables the first display element 750 to be driven.

For example, a transistor including a gate electrode electrically connected to the scan line G2(i) and a first electrode electrically connected to the signal line S2(j) can be used as the switch SW2R.

The transistor MR includes a gate electrode electrically connected to a second electrode of the transistor used as the switch SW2R and a first electrode electrically connected to the wiring ANO.

The capacitor C21R includes a first electrode electrically connected to a second electrode of the transistor used as the switch SW2R and a second electrode electrically connected to the wiring ANO.

The capacitor C22R includes a first electrode electrically connected to a second electrode of the transistor used as the switch SW2R and a second electrode electrically connected to the wiring CSCOM.

A transistor including a conductive film having a region that is provided so that a semiconductor film is provided between the region and a gate electrode can be used as the transistor MR. For example, as the conductive film, a conductive film electrically connected to a wiring that can supply the same potential as that of the gate electrode of the transistor MR can be used.

The first electrode and the second electrode of the second display element 550(i, j)R are electrically connected to the second electrode of the transistor MR and the fourth wiring VCOM2, respectively. This enables the second display element 550(i, j)R to be driven.

For example, a transistor including a gate electrode electrically connected to the scan line G2(i) and a first electrode electrically connected to the signal line S3(j) can be used as the switch SW2W.

The transistor MW includes a gate electrode electrically connected to the second electrode of the transistor used as the switch SW2W and includes a first electrode electrically connected to the wiring ANO.

The capacitor C21W includes a first electrode electrically connected to the second electrode of the transistor used as the switch SW2W and includes a second electrode electrically connected to the wiring ANO.

The capacitor C22W includes the first electrode electrically connected to the second electrode of the transistor used as the switch SW2W and the second electrode electrically connected to the wiring CSCOM.

Note that a transistor including a conductive film including a region provided so that a semiconductor film is positioned between the region and a gate electrode can be used as the transistor MW. For example, as the conductive film, a conductive film electrically connected to a wiring that can supply the same potential as that of the gate electrode of the transistor MW can be used.

Note that a first electrode of the second display element 550(i, j)W is electrically connected to a second electrode of the transistor MW, and a second electrode of the second display element 550(i, j)W is electrically connected to the fourth wiring VCOM2. This enables the third display element 550(i, j)W to be driven.

For example, a transistor including a gate electrode electrically connected to the scan line G3(i) and a first electrode electrically connected to the signal line S2(j) can be used as the switch SW2B.

The transistor MB includes a gate electrode electrically connected to the second electrode of the transistor used as the switch SW2B and includes a first electrode electrically connected to the wiring ANO.

The capacitor C21B includes a first electrode electrically connected to the second electrode of the transistor used as the switch SW2B and includes a second electrode electrically connected to the wiring ANO.

The capacitor C22B includes a first electrode electrically connected to the second electrode of the transistor used as the switch SW2B and a second electrode electrically connected to the wiring CSCOM.

A transistor including a conductive film having a region that is provided so that a semiconductor film is provided between the region and a gate electrode can be used as the transistor MB. For example, as the conductive film, a conductive film electrically connected to a wiring that can supply the same potential as that of the gate electrode of the transistor MB can be used.

Furthermore, the first electrode and the second electrode of the second display element 550(i, j)B are electrically connected to the second electrode of the transistor MB and the fourth wiring VCOM2, respectively. This enables the fourth display element 550(i, j)B to be driven.

For example, a transistor including a gate electrode electrically connected to the scan line G3(i) and a first electrode electrically connected to the signal line S3(j) can be used as the switch SW2G.

The transistor MG includes a gate electrode electrically connected to a second electrode of the transistor used as the switch SW2G and a first electrode electrically connected to the wiring ANO.

The capacitor C21G includes a first electrode electrically connected to a second electrode of the transistor used as the switch SW2G and a second electrode electrically connected to the wiring ANO.

The capacitor C22G includes a first electrode electrically connected to a second electrode of the transistor used as the switch SW2G and a second electrode electrically connected to the wiring CSCOM.

A transistor including a conductive film having a region that is provided so that a semiconductor film is provided between the region and a gate electrode can be used as the transistor MG. For example, as the conductive film, a conductive film electrically connected to a wiring that can supply the same potential as that of the gate electrode of the transistor MG can be used.

The first electrode and the second electrode of the second display element 550(i, j)G are electrically connected to the second electrode of the transistor MG and the fourth wiring VCOM2, respectively. This enables the fifth display element 550(i, j)G to be driven.

<<Switch and Transistor>>

For example, a bottom-gate or top-gate transistor, or the like can be used as the switch or the transistor. Specifically, the bottom-gate or top-gate transistor, or the like can be used as the switch SW1, the switch SW2R, the switch SW2G, the switch SW2B, the switch SW2W, the transistor MR, the transistor MG, the transistor MB, the transistor MW, the transistor MD, or the like.

For example, a transistor whose semiconductor film contains a semiconductor containing an element of Group 14 can be used. Specifically, a semiconductor containing silicon can be used for the semiconductor film. For example, single crystal silicon, polysilicon, microcrystalline silicon, or amorphous silicon can be used for the semiconductor film of the transistor.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a lower off-state leakage current than a transistor that uses amorphous silicon for a semiconductor film can be used as the switch, the transistor, or the like.

Specifically, a transistor including an oxide semiconductor in a semiconductor film 508 can be used as the switch SW1, the switch SW2R, the switch SW2G, the switch SW2B, the switch SW2W, the transistor MR, the transistor MG, the transistor MB, the transistor MW, the transistor MD or the like.

Thus, a pixel circuit can hold an image signal for a longer time than a pixel circuit including a transistor that uses amorphous silicon for a semiconductor film. Specifically, the selection signal can be supplied at a frequency of lower than 30 Hz, preferably lower than 1 Hz, further preferably less than once per minute while flickering is suppressed. Consequently, eyestrain on a user of the data processing device can be reduced, and power consumption for driving can be reduced.

The transistor that can be used as the switch SW1 includes the semiconductor film 508 and a conductive film 504 including a region overlapping with the semiconductor film 508 (see FIG. 4B). The transistor that can be used as the switch SW1 includes the conductive film 512A and the conductive film 512B, which are electrically connected to the semiconductor film 508.

Note that the conductive film 504 and the insulating film 506 serve as a gate electrode and a gate insulating film, respectively. The conductive film 512A has one of a function of a source electrode and a function of a drain electrode, and the conductive film 512B has the other.

A transistor including a conductive film 524 provided such that the semiconductor film 508 is positioned between the conductive film 504 and the conductive film 524 can be used as the transistor MD (see FIG. 3B).

A conductive film in which a 10-nm-thick film containing tantalum and nitrogen and a 300-nm-thick film containing copper are stacked in this order can be used as the conductive film 504, for example.

A material in which a 400-nm-thick film containing silicon and nitrogen and a 200-nm-thick film containing silicon, oxygen, and nitrogen are stacked can be used for the insulating film 506, for example.

A 25-nm-thick film containing indium, gallium, and zinc can be used as the semiconductor film 508, for example.

A conductive film in which a 50-nm-thick film containing tungsten, a 400-nm-thick film containing aluminum, and a 100-nm-thick film containing titanium are stacked in this order can be used as the conductive film 512A or the conductive film 512B, for example.

<<First Display Element 750(i, j)>>

For example, a display element having a function of controlling transmission or reflection of light can be used as the first display element 750(i, j) or the like. For example, a combined structure of a polarizing plate and a liquid crystal element or a MEMS shutter display element can be used. Specifically, a reflective liquid crystal display element can be used as the first display element 750(i, j). The use of a reflective display element leads to a reduction of power consumption of a display panel.

For example, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The first display element 750(i, j) includes a first electrode, a second electrode, and a liquid crystal layer. The liquid crystal layer contains a liquid crystal material whose orientation is controlled by a voltage applied between the first electrode and the second electrode. For example, the orientation of the liquid crystal material can be controlled by an electric field in the thickness direction (also referred to as the vertical direction), the direction that crosses the vertical direction (the horizontal direction, or the diagonal direction) of the liquid crystal layer.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. Furthermore, a liquid crystal material which exhibits a cholesteric phase, a smectic phase, a cubic phase, a chiral nematic phase, an isotropic phase, or the like can be used. Furthermore, a liquid crystal material which exhibits a blue phase can be used.

<<First Electrode 751(i, j)>>

For example, the material that is used for the wiring or the like can be used for the first electrode 751(i, j). Specifically, a reflective film or a light-transmitting conductive material can be used for the first electrode 751(i, j). For example, a material in which a light-transmitting conductive material and a reflective film including an opening are stacked can be used for the first electrode 751(i, j).

<Reflective Film>

For example, a material that reflects visible light can be used for the reflective film. Specifically, a material containing silver can be used for the reflective film. For example, a material containing silver, palladium, and the like or a material containing silver, copper, and the like can be used for the reflective film.

The reflective film reflects light that passes through the layer 753 containing a liquid crystal material, for example. Thus, the first display element 750(i, j) can be used as a reflective liquid crystal display element. Alternatively, for example, a material with unevenness on its surface can be used for the reflective film. In that case, incident light can be reflected in various directions so that a white image can be displayed.

Note that the first electrode 751(i, j) can be used as the reflective film.

Note that the first electrode 751(i, j) is not necessarily used for the reflective film. For example, the reflective film can be formed using a material that reflects visible light and includes a region. Note that the first electrode 751(i, j) including a light-transmitting conductive film is positioned between the material and the layer 753 containing a liquid crystal material. Alternatively, a material reflecting visible light including a region positioned between the layer 753 containing a liquid crystal material and the first electrode 751($i, j$) can be used for the reflective film.

<<Region 751($i, j$)T and Region 751($i, j$)R>>

A region in contact with an end portion of the region 751($i, j$)R or a region surrounded by the region 751($i, j$)R can be used as the region 751($i, j$)T, for example.

The region 751($i, j$)T or the region 751($i, j$)R can have a polygonal shape, a quadrangular shape, an elliptical shape, a circular shape, a cross-like shape, a stripe shape, a slit-like shape, a checkered pattern, or the like, for example.

<<Second Electrode 752>>

For example, a material having a visible-light-transmitting property and conductivity can be used for the second electrode 752.

For example, a conductive oxide, a metal film thin enough to transmit light, or a metal nanowire can be used for the second electrode 752.

Specifically, a conductive oxide containing indium can be used for the second electrode 752. Alternatively, a metal thin film with a thickness greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

The alignment films AF1 and AF2 can be formed using a material containing polyimide or the like, for example. Specifically, a material formed by rubbing treatment or an optical alignment technique so that a liquid crystal material has alignment in a predetermined direction can be used.

For example, a film containing soluble polyimide can be used as the alignment film AF1 or AF2. In this case, the temperature required in forming the alignment film AF1 can be low. Accordingly, damage to other components at the time of forming the alignment film AF1 can be suppressed.

<<Coloring Film CF2>>

A material transmitting light of a predetermined color can be used for the coloring film CF2. In that case, the coloring film CF2 can be used as a color filter, for example. For example, a material that transmits blue light, green light, or red light can be used for the coloring film CF2. Alternatively, a material that transmits yellow light, white light, or the like can be used for the coloring film CF2. Further alternatively, a material that transmits cyan light, magenta light, or the like can be used for the coloring film CF2.

Note that a material having a function of converting the emitted light to a predetermined color light can be used for the coloring film CF2. Specifically, quantum dots can be used for the coloring film CF2. Thus, display with high color purity can be achieved.

<<Functional Films 770P and 770D>>

An anti-reflection film, a polarizing film, a retardation film, a light diffusion film, a condensing film, or the like can be used for the functional film 770P or the functional film 770D, for example.

Specifically, a film containing a dichromatic pigment can be used as the functional film 770P or the functional film 770D. Furthermore, a material having a pillar-shaped structure with an axis in a direction that intersects a surface of the substrate can be used for the functional film 770P or the functional film 770D. This makes it easy to transmit light in a direction along the axis and to scatter light in the other directions.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used as the functional film 770P. Further, a light diffusion film can be used as the functional film 770D.

<<Second Display Element 550($i, j$)R, Third Display Element 550($i, j$)G, Fourth Display Element 550($i, j$)B, and Fifth Display Element 550($i, j$)W>>

For example, the second display element 550($i, j$)R, the third display element 550($i, j$)G, the fourth display element 550($i, j$)B, or the fifth display element 550($i, j$)W can be a light-emitting element. Specifically, an organic electroluminescence element, an inorganic electroluminescence element, a light-emitting diode, or the like can be used for the second display element 550($i, j$)R or the like.

A light-emitting organic compound can be used for the layer 553R or the like containing a light-emitting material, for example.

For example, quantum dots can be used for the layer 553R or the like containing a light-emitting material. Accordingly, the half width becomes narrow, and light of a bright color can be emitted.

For example, a stacked-layer material for emitting blue light can be used for the layer 553B containing a light-emitting material. A stacked-layer material for emitting green light can be used for the layer 553G containing a light-emitting material. Alternatively, a stacked-layer material for emitting red light can be used for the layer 553R containing a light-emitting material.

For example, a belt-like layered material that extends in the column direction along the signal line S2($j$) can be used for the layer 553R or the like containing a light-emitting material.

For example, a stacked-layer material for emitting white light can be used for the layer 553R or the like containing a light-emitting material. Specifically, a layered material in which a layer containing a light-emitting material including a fluorescent material that emits blue light, and a layer containing a material that is other than a fluorescent material and that emits green light and/or red light or a layer containing a material that is other than a fluorescent material and that emits yellow light are stacked can be used for the layer 553R or the like containing a light-emitting material.

For example, a material that can be used for the wiring or the like can be used for the third electrode 551($i, j$)R, the third electrode 551($i, j$)G, the third electrode 551($i, j$)B, the third electrode 551($i,j$)W, or the like.

For example, a material that transmits visible light among the materials that can be used for the wiring or the like can be used for the third electrode 551($i, j$)R or the like.

Specifically, conductive oxide, indium-containing conductive oxide, indium oxide, indium tin oxide, indium zinc oxide, zinc oxide, zinc oxide to which gallium is added, or the like can be used for the third electrode 551($i, j$)R or the like. Alternatively, a metal film that is thin enough to transmit light can be used as the third electrode 551($i, j$)R or the like.

Further alternatively, a metal film that transmits part of light and reflects another part of light can be used as the third electrode 551($i, j$)R or the like. In that case, the second display element 550($i, j$)R or the like can have a microcavity structure. As a result, light of a predetermined wavelength can be extracted more efficiently than light of other wavelengths.

For example, a material that can be used for the wiring or the like can be used for the fourth electrode 552. Specifically, a material that reflects visible light can be used for the fourth electrode 552.

<<Anti-Reflection Structure ARR, Anti-Reflection Structure ARG, and Anti-Reflection Structure ARB>>

For example, a material that transmits part of light and reflects another part of light can be used for the transflective film AR1. Specifically, a metal film which is thin enough to transmit light can be used as the transflective film AR1. For example, the third electrode 551($i, j$)R can be used for the transflective film AR1.

For example, a material that reflects part of visible light can be used for the reflective film AR2. Specifically, a metal film or the like can be used as the reflective film AR2. For example, the fourth electrode 552 can be used as the reflective film AR2.

A material that transmits part of visible light can be used for the optical adjustment film AR3, for example. Specifically, a light-transmitting organic material or a light-transmitting inorganic material can be used for the optical adjustment film AR3. A light-transmitting conductive material can be used for the optical adjustment film AR3. For example, a stacked layer material in which a light-transmitting conductive material, the layer 553R containing a light-emitting material, and the like are stacked can be used for the optical adjustment film AR3.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed in the same process as the semiconductor film of the transistor M or the transistor which can be used as the switch SW1 can be used.

As the transistor MD, a transistor having a different structure from the transistor that can be used as the switch SW1 can be used, for example. Specifically, a transistor including the conductive film 524 can be used as the transistor MD (see FIG. 3B).

The conductive film 524 is provided such that the semiconductor film 508 is positioned between the conductive films 504 and 524. The insulating film 516 is provided between the conductive film 524 and the semiconductor film 508. The insulating film 506 is provided between the semiconductor film 508 and the conductive film 504. For example, the conductive film 524 is electrically connected to a wiring that supplies the same potential as that supplied to the conductive film 504.

Note that the transistor MD can have the same structure as the transistor M.

<<Driver Circuit SD, Driver Circuit SD1, Driver Circuit SD2>>

The driver circuit SD1 has a function of supplying an image signal on the basis of the data V11. The driver circuit SD2 has a function of supplying an image signal on the basis of the data V12.

The driver circuit SD1 has a function of generating an image signal to be supplied to a pixel circuit electrically connected to the reflective display element, for example. Specifically, the driver circuit SD1 has a function of generating a signal whose polarity is inverted. Thus, for example, the reflective liquid crystal display element can be driven.

The driver circuit SD2 has a function of generating an image signal to be supplied to a pixel circuit electrically connected to the light-emitting element, for example.

For example, any of a variety of sequential circuits, such as a shift register, can be used as the driver circuit SD1 or SD2. Note that, instead of the driver circuits SD1 and SD2, a driver circuit SD in which the driver circuits SD1 and SD2 are integrated can be used. Specifically, an integrated circuit formed over a silicon substrate can be used as the driver circuit SD.

For example, the driver circuit SD can be mounted on the terminal 519B by a chip on glass (COG) method. Specifically, an anisotropic conductive film can be used to mount an integrated circuit on the terminal 519B. Alternatively, a chip on film (COF) may be used to mount an integrated circuit on the terminal 519B.

<<Selection Circuit 239>>

In the selection circuit 239, a first multiplexer and a second multiplexer can be used, for example (see FIG. 8). The first multiplexer and the second multiplexer have a function of operating on the basis of the control data SS.

The first multiplexer includes a first input portion and a third input portion to which the image data V1 is supplied and a second input portion to which the background data VBG is supplied, and receives the control data SS. The first multiplexer outputs the image data V1 when receiving a first-status or third-status control data SS and outputs the background data VBG when receiving a second-status control data SS. Note that the data output from the first multiplexer is referred to as the data V11.

The second multiplexer includes a first input portion to which the background data VBG is supplied and a second input portion and a third input portion to which the image data V1 is supplied, and receives the control data SS. The second multiplexer outputs the background data VBG when receiving the first-status control data SS and outputs the image data V1 when receiving the second-status or third-status control data SS. Note that the data output from the second multiplexer is referred to as the data V12.

Note that this embodiment can be combined with any of the other embodiments in this specification as appropriate.

Embodiment 2

In this embodiment, a structure of an input/output panel of one embodiment of the present invention is described with reference to FIGS. 9A, 9B1, and 9B2, FIGS. 10A and 10B, FIGS. 11A and 11B, and FIG. 12. Note that the input-output panel can also be referred to as a touch panel or a touch screen.

FIGS. 9A, 9B1, and 9B2 illustrate the structure of the input/output panel of one embodiment of the present invention. FIG. 9A is a top view of the input-output panel. FIG. 9B1 is a schematic diagram illustrating part of an input portion of the input/output panel of one embodiment of the present invention. FIG. 9B2 is a schematic diagram illustrating part of the structure in FIG. 9B1.

Figure 10A:
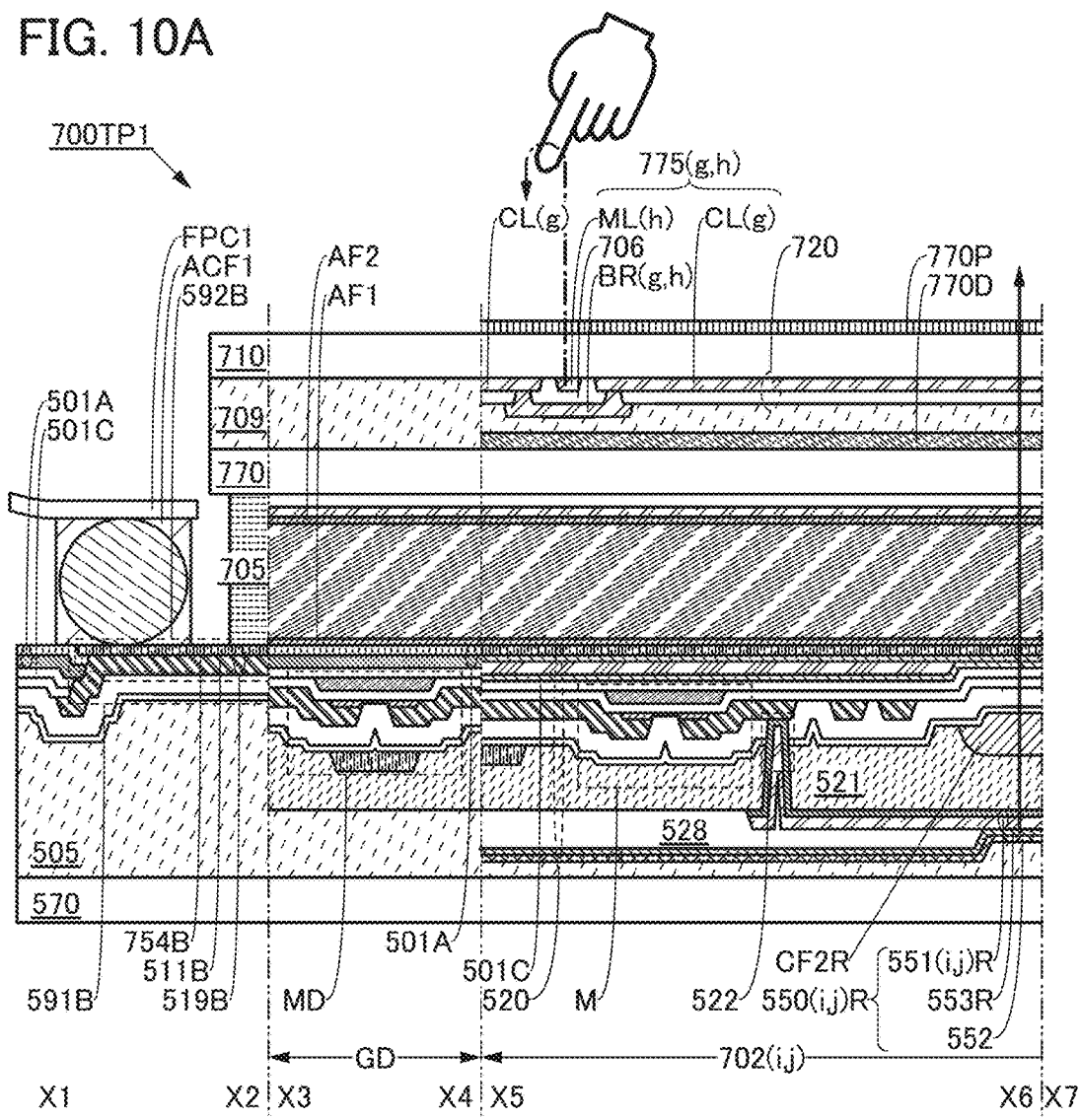
FIGS. 10A and 10B are cross-sectional views illustrating a structure of an input/output panel of one embodiment.
Figure 10B:
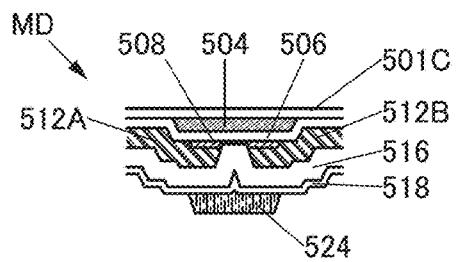

FIG. 10A is a cross-sectional view of the input/output panel of one embodiment of the present invention. FIG. 10B illustrates part of FIG. 10A.

Figure 11A:
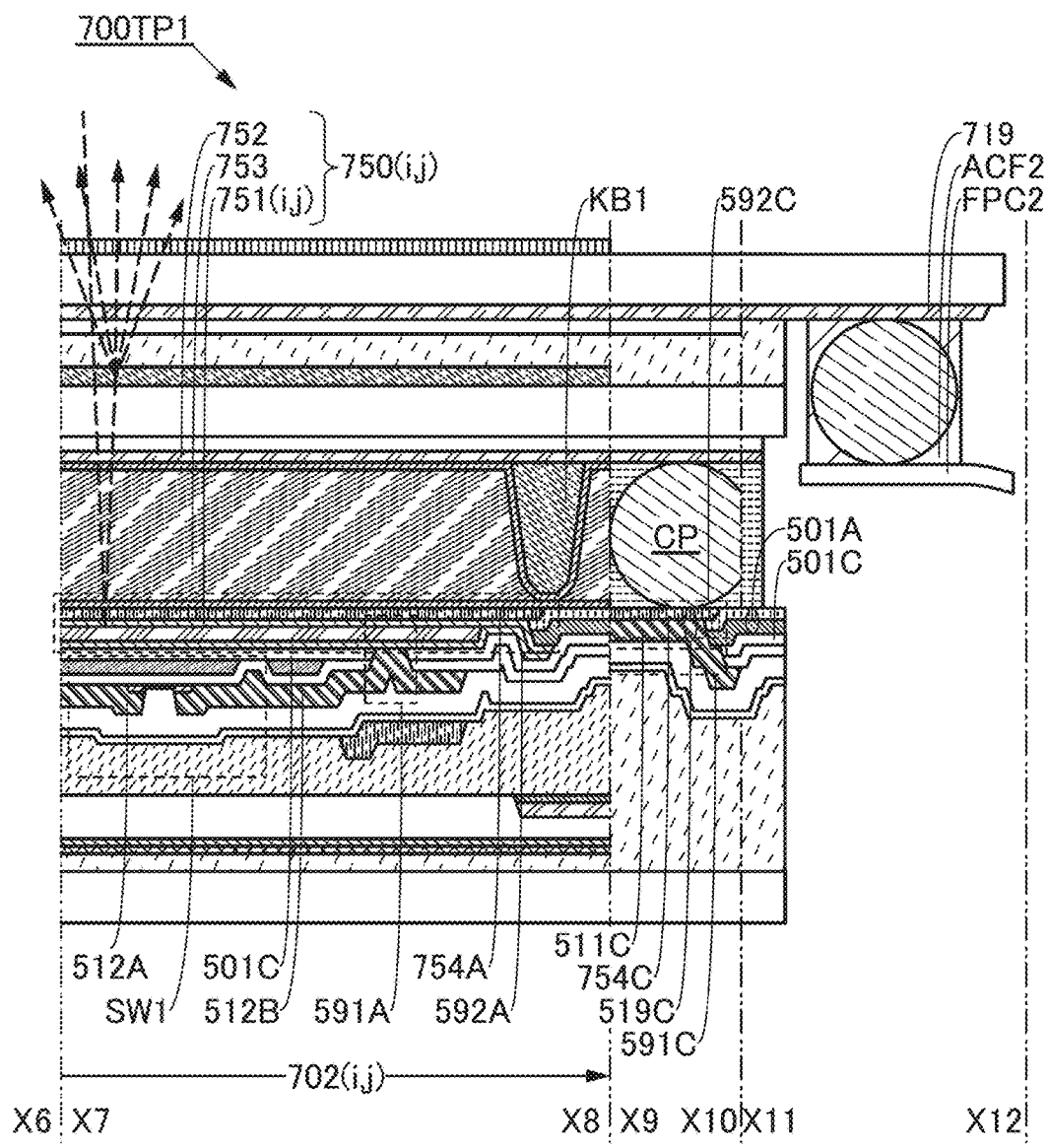
FIGS. 11A and 11B are cross-sectional views illustrating a structure of an input/output panel of one embodiment.
Figure 11B:
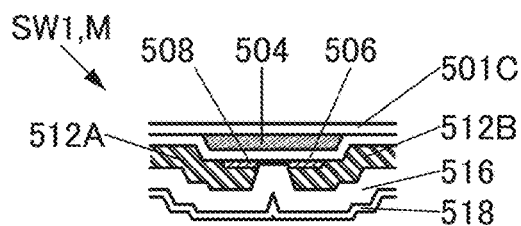

FIG. 11A is a cross-sectional view of the input/output panel of one embodiment of the present invention. FIG. 11B illustrates part of FIG. 11A.

Figure 12:
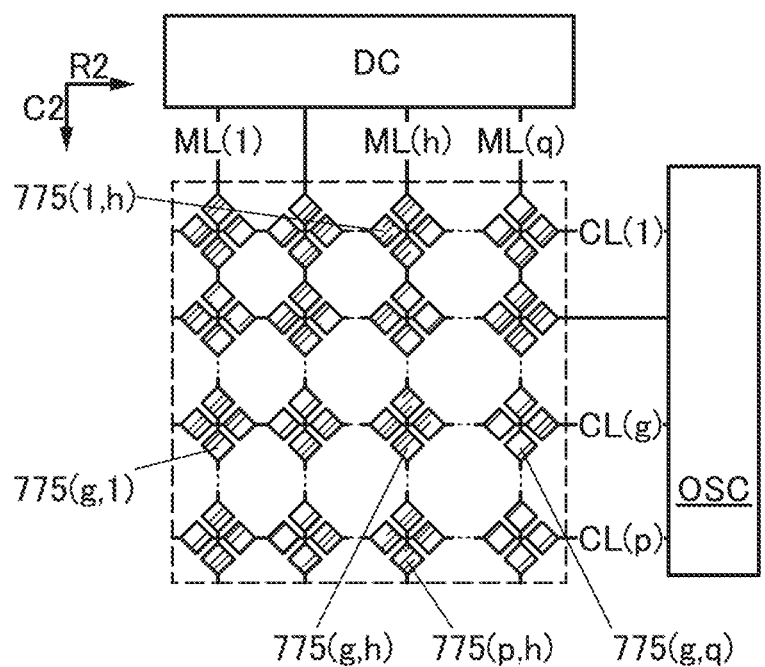
FIG. 12 is a block diagram illustrating a configuration of an input/output panel of an embodiment.

FIG. 12 is a block diagram illustrating the structure of the input portion of the input/output panel.

The input/output panel is different from the display panel described with reference to FIGS. 1A and 1B, FIGS. 2A and 2B, FIGS. 3A and 3B, FIGS. 4A and 4B, and FIGS. 5A, 5B1, 5B2, 5B3, and 5C, FIG. 6, FIG. 7, and FIG. 8 in including the input portion. Different structures will be described in detail below, and the above description is referred to for the other similar structures.

Structure Example 1 of Input/Output Panel

An input/output panel 700TP1 described in this embodiment includes the display panel described in Embodiment 1 and an input portion (see FIGS. 9A, 9B1, and 9B2, FIGS. 10A and 10B, and FIGS. 11A and 11B).

The input portion has a function of sensing an object that approaches the region overlapping with the display panel.

The input portion includes the region overlapping with the display panel and includes a control line CL(g), a sensing signal line ML(h), and a sensing element 775(g, h) (see FIG. 9B2).

The sensing element 775(g, h) is electrically connected to the control line CL(g) and the sensing signal line ML(h).

Note that the control line CL(g) has a function of supplying a control signal.

The sensing element 775(g, h) has a function of receiving the control signal and a function of supplying a sensing signal which changes in accordance with the control signal and a distance between the sensing element 775(g, h) and an object approaching a region overlapping with a display panel.

The sensing signal line ML(h) has a function of receiving the sensing signal.

The sensing element 775(g, h) has a light-transmitting property and includes an electrode C(g) and an electrode M(h).

The electrode C(g) is electrically connected to the control line CL(g).

The electrode M(h) is electrically connected to the sensing signal line ML(h) and is positioned so that an electric field part of which is blocked by an object approaching a region overlapping with a display panel is generated between the electrode M(h) and the electrode C(g) (see FIG. 10A).

As a result, a novel input/output panel that is highly convenient or reliable can be provided. The display panel of one embodiment of the present invention can sense an object that approaches a region overlapping with the display panel.

The input portion described in this embodiment includes a substrate 710 and a bonding layer 709 (see FIG. 10A and FIG. 11A).

The substrate 710 includes a region provided so that the sensing element 775(g, h) is positioned between the substrate 710 and the substrate 770.

The bonding layer 709 includes a region positioned between the substrate 770 and the sensing element 775(g, h) and has a function of bonding the substrate 770 and the sensing element 775(g, h) together.

The functional film 770P includes a region positioned so that the sensing element 775(g, h) is positioned between the functional film 770P and the first display element 750(i, j). Thus, the intensity of light reflected by the sensing element 775(g, h) can be reduced, for example.

The input portion described in this embodiment includes one group of sensing elements 775(g, 1) to 775(g, q) and another group of sensing elements 775(1, h) to 775(p, h) (see FIG. 12). Note that g is an integer greater than or equal to 1 and less than or equal to p, h is an integer greater than or equal to 1 and less than or equal to q, and each of p and q is an integer greater than or equal to 1.

The one group of the sensing elements 775(g, 1) to 775(g, q) include the sensing element 775(g, h) and are arranged in a row direction (indicated by the arrow R2 in the drawing). Note that the direction indicated by the arrow R2 in FIG. 12 may be the same as or different from the direction indicated by the arrow R1 in FIG. 8.

The another group of sensing elements 775(1, h) to 775(p, h) include the sensing element 775(g, h) and are provided in the column direction (the direction indicated by the arrow C2 in the drawing) that intersects the row direction.

The one group of sensing elements 775(g, 1) to 775(g, q) provided in the row direction include the electrode C(g) that is electrically connected to the control line CL(g).

The another group of sensing elements 775(1, h) to 775(p, h) provided in the column direction include the electrode M(h) that is electrically connected to the sensing signal line ML(h).

The control line CL(g) of the input/output device described in this embodiment includes a conductive film BR(g, h) (see FIG. 10A). The conductive film BR(g, h) includes a region overlapping with the sensing signal line ML(h).

An insulating film 706 includes a region positioned between the sensing signal line ML(h) and the conductive film BR(g, h). Thus, a short circuit between the sensing signal line ML(h) and the conductive film BR(g, h) can be prevented.

The input/output panel described in this embodiment includes an oscillator circuit OSC and a sensor circuit DC (see FIG. 12).

The oscillator circuit OSC is electrically connected to the control line CL(g) and has a function of supplying a control signal. For example, a rectangular wave, a sawtooth wave, a triangular wave, or the like can be used as the control signal.

The sensor circuit DC is electrically connected to the sensing signal line ML(h) and has a function of supplying a sensing signal on the basis of a change in the potential of the sensing signal line ML(h).

Components constituting the input/output panel will be described below. Note that these components cannot be clearly distinguished and one component may also serve as another component or include part of another component.

The sensing signal line ML(h) can be used as the electrode M(h), for example.

<<Structure Example>>

The input/output panel of one embodiment of the present invention includes the display panel or the input portion.

The input portion includes the substrate 710, a functional layer 720, the bonding layer 709, and a terminal 719 (see FIG. 10A and FIG. 11A).

The functional layer 720 includes a region positioned between the substrate 770 and the substrate 710. The functional layer 720 includes the sensing element 775(g, h) and the insulating film 706.

The bonding layer 709 includes a region positioned between the functional layer 720 and the substrate 770, and has a function of bonding the functional layer 720 to the substrate 770 together.

The terminal 719 is electrically connected to the sensing element 775(g, h).

<<Substrate 710>>

A light-transmitting material can be used for the substrate 710, for example. Specifically, a material selected from the materials that can be used for the substrate 570 can be used for the substrate 710.

For example, aluminosilicate glass, tempered glass, chemically tempered glass, sapphire, or the like can be favorably used for the substrate 710 that is provided on the user side of the display panel. This can prevent damage or a crack of the display panel caused by the use thereof.

<<Sensing Element 775(g, h)>>

As the sensing element 775(g, h), an element that senses electrostatic capacitance, illuminance, magnetic force, a radio wave, pressure, or the like and supplies data based on the sensed physical value can be used, for example.

Specifically, a capacitor, a photoelectric conversion element, a magnetic sensing element, a piezoelectric element, a resonator, or the like can be used as the sensing element 775(g, h).

When a finger or the like having a higher dielectric constant than that of the air approaches a conductive film in the air, for example, electrostatic capacitance between the finger or the like and the conductive film changes. This electrostatic capacitance change can be sensed, and the sensed data can be supplied. Specifically, a self-capacitive sensing element can be used.

The electrode C(g) and the electrode M(h) can be used for the sensing element, for example. Specifically, the electrode C(g) to which a control signal is supplied and the electrode M(h) that is positioned so that an electric field part of which is blocked by an approaching object is generated between the electrode M(h) and the electrode C(g) can be used. Thus, the electric field that is changed when blocked by the approaching object can be sensed using the potential of the sensing signal line ML(h), and a sensing signal can be supplied. As a result, the approaching object that blocks the electric field can be sensed. Specifically, a mutual capacitive sensing element can be used.

<<Control Line CL(g), Sensing Signal Line ML(h), Conductive Film BR(g, h)>>

For the control line CL(g), the sensing signal line ML(h), or the conductive film BR(g, h), a material having a visible-light-transmitting property and conductivity can be used, for example.

Specifically, a material used for the second electrode 752 can be used for the control line CL(g), the sensing signal line ML(h), or the conductive film BR(g, h).

<<Insulating Film 706>>

A material that can be used for the insulating film 521 can be used for the insulating film 706 or the like, for example. Specifically, a film containing silicon and oxygen can be used for the insulating film 706.

<<Terminal 719>>

A material that can be used for the wiring or the like can be used for the terminal 719, for example. Note that the terminal 719 can be electrically connected to a flexible printed circuit FPC2 using a conductive material ACF2, for example (see FIG. 11A).

Note that a control signal can be supplied to the control line CL(g) using the terminal 719. Alternatively, a sensing signal can be supplied from the sensing signal line ML(h).

<<Bonding Layer 709>>

A material that can be used for the sealing material 705 can be used for the bonding layer 709, for example.

Note that this embodiment can be combined with any of the other embodiments in this specification as appropriate.

Embodiment 3

In this embodiment, a structure of a transistor that can be used in the input/output device of one embodiment of the present invention will be described with reference to FIGS. 13A to 13C.

Figure 13A:
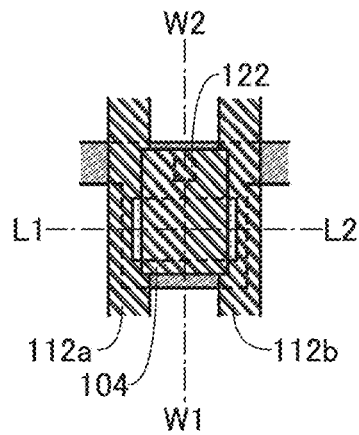
FIGS. 13A to 13C are a top view and cross-sectional views illustrating a structure of a transistor of an embodiment.
Figure 13B:
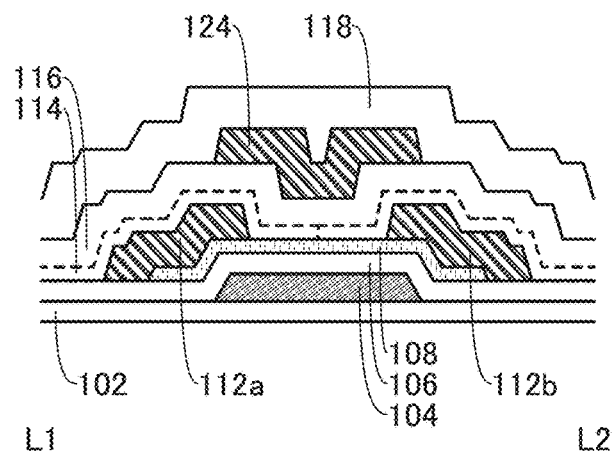
Figure 13C:
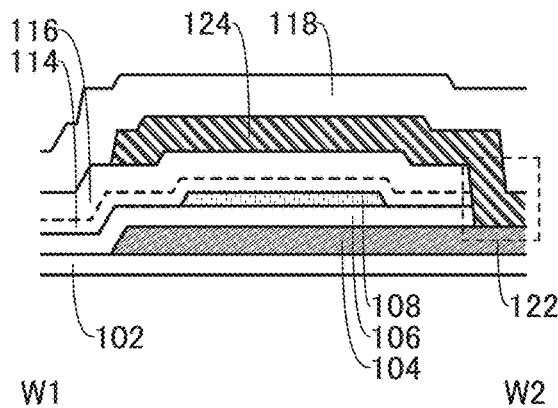

FIGS. 13A to 13C illustrate a structure of a transistor TR which can be used in the input/output device of one embodiment of the present invention. FIG. 13A is a top view illustrating a transistor which can be used as the transistor TR which can be used in the input/output device of one embodiment of the present invention. FIG. 13B is a cross-sectional view illustrating the transistor in a channel length (L) direction of FIG. 13A. FIG. 13C is a cross-sectional view including the transistor in a channel width (W) direction of FIG. 13A. In some cases, the direction of line L1-L2 is referred to as a channel length direction and the direction of line W1-W2 is referred to as a channel width direction.

Note that the transistor TR can be used in the input/output device or the like described in Embodiment 2.

For example, when the transistor TR is used as the switch SW1, an insulating film 102, a conductive film 104, an insulating film 106, a semiconductor film 108, a conductive film 112a, a conductive film 112b, a stacked film of an insulating film 114 and an insulating film 116, and an insulating film 118 can be referred to as the second insulating film 501C, the conductive film 504, the insulating film 506, the semiconductor film 508, the conductive film 512A, the conductive film 512B, the insulating film 516, and the insulating film 518, respectively.

Structure Example 1 of Transistor

The transistor which can be used in the input/output device of one embodiment of the present invention includes the conductive film 104 over the second insulating film 102, the insulating film 106 over the second insulating film 102 and the conductive film 104, the semiconductor film 108 over the insulating film 106, a conductive film 112b over the semiconductor film 108, the conductive film 112a over the semiconductor film 108, the insulating film 114 over the semiconductor film 108, the conductive film 112a, and the conductive film 112b, the insulating film 116 over the insulating film 114, and a conductive film 124 over the insulating film 116 (see FIG. 13B).

For example, the conductive film 104 serves as the first gate electrode, the conductive film 112b serves as the source electrode, the conductive film 112a serves as the drain electrode, and the conductive film 124 serves as the second gate electrode. In addition, the insulating film 106 serves as a first gate insulating film and the insulating films 114 and 116 serve as second gate insulating films.

For example, an oxide semiconductor can be used for the semiconductor film 108. Specifically, an oxide semiconductor film containing indium or an oxide semiconductor film containing indium, gallium, and zinc can be used for the semiconductor film 108.

In addition, the semiconductor film 108 includes In, M (M is Al, Ga, Y, or Sn), and Zn.

The semiconductor film 108 preferably includes a region in which the atomic proportion of In is larger than the atomic proportion of M, for example. Note that the semiconductor device of one embodiment of the present invention is not limited thereto: The semiconductor film 108 may include a region in which the atomic proportion of In is smaller than the atomic proportion of M or may include a region in which the atomic proportion of In is equal to the atomic proportion of M.

The semiconductor film 108 preferably includes a region in which the atomic proportion of In is larger than the atomic proportion of M. Thus, the field effect mobility of the transistor can be increased. Specifically, the field-effect mobility of the transistor can exceed 10 cm$^2$/Vs, preferably exceed 30 cm$^2$/Vs.

<<Effect of Two Gate Electrodes>>

The transistor which can be used in the input/output device of one embodiment of the present invention can include two gate electrodes.

The effect of two gate electrodes on the characteristics of the transistor is described with reference to FIG. 13C.

As shown in FIG. 13C, the conductive film 124 serving as the second gate electrode is electrically connected to the conductive film 104 serving as the first gate electrode in an opening 122. Accordingly, the conductive film 104 and the conductive film 124 are supplied with the same potential.

As shown in FIG. 13C, the semiconductor film 108 is positioned so as to face the conductive film 104 and the conductive film 124, and is sandwiched between the two conductive films serving as the gate electrodes.

The length in the channel width direction of each of the conductive film 104 and the conductive film 124 is longer than that of the semiconductor film 108. Furthermore, the entire semiconductor film 108 is covered with the conductive film 104 and the conductive film 124 with the insulating films 106, 114, and 116 provided therebetween.

In other words, the conductive film 104 and the conductive film 124 are connected in the opening 122 which is provided in the insulating films 106, 114, and 116 and each include a region located outward from the side end portion of the semiconductor film 108.

With such a structure, the semiconductor film 108 included in the transistor can be electrically surround by electric fields of the conductive film 104 and the conductive film 124. A device structure of a transistor in which electric fields of a first gate electrode and a second gate electrode electrically surround an oxide semiconductor film where a channel region is formed can be referred to as a surrounded channel (S-channel) structure.

Since the transistor has the S-channel structure, an electric field for inducing a channel can be effectively applied to the semiconductor film 108 by the conductive film 104 functioning as the first gate electrode; therefore, the current drive capability of the transistor can be improved and high on-state current characteristics can be obtained. Since the on-state current can be increased, the size of the transistor can be reduced. In addition, since the transistor has a structure in which the semiconductor film 108 is surrounded by the conductive film 104 serving as the first gate electrode and the conductive film 124 serving as the second gate electrode, the mechanical strength of the transistor can be increased.

Although the structure in which the first gate electrode is electrically connected to the second gate electrode is described above, one embodiment of the present invention is not limited thereto. For example, the conductive film 524 serving as the second gate electrode may be electrically connected to the conductive film 512B serving as the source electrode or the drain electrode of the transistor M.

Note that this embodiment can be combined with any of the other embodiments in this specification as appropriate.

Embodiment 4

In this embodiment, structures of a transistor that can be used in the data processing device of one embodiment of the present invention will be described with reference to FIGS. 14A and 14B and FIGS. 15A and 15B. Specifically, a structure of an oxide semiconductor film which can be used as a semiconductor film of a transistor will be described below.

The transistor described in this embodiment can be used as the switch SW1, the switch SW2, the transistor M, or the transistor MD, for example.

Figure 14A:
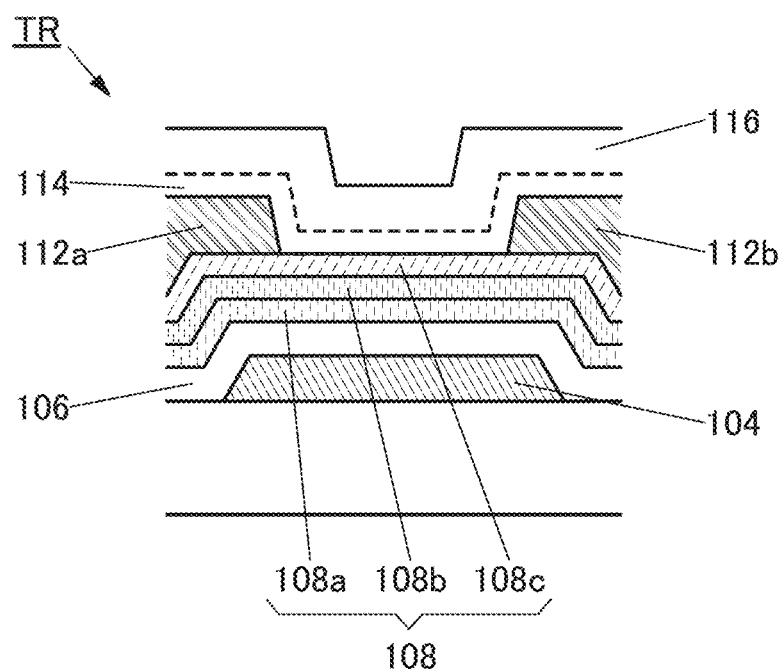
FIGS. 14A and 14B are cross-sectional views illustrating structures of a transistor of one embodiment.
Figure 14B:
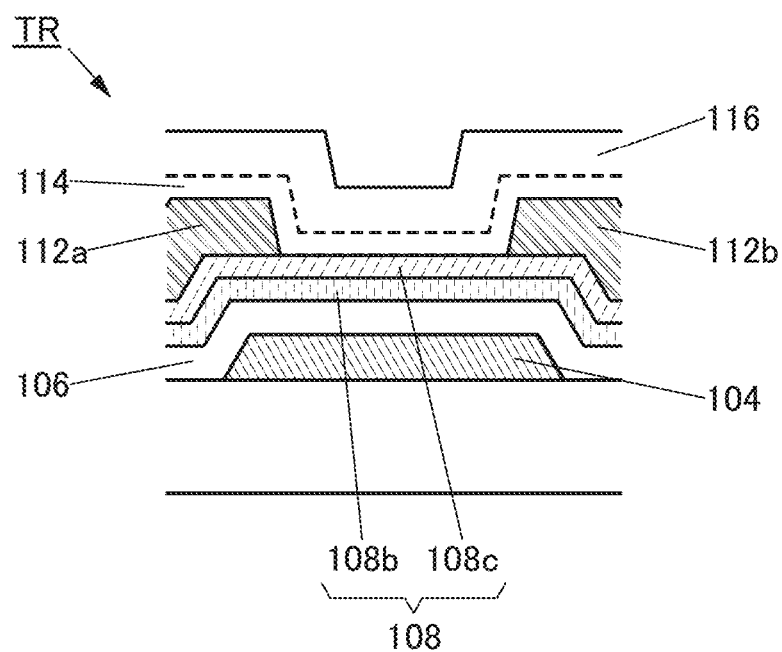

FIGS. 14A and 14B are each a cross-sectional view of a transistor in the channel length (L) direction. FIG. 14A is a cross-sectional view in the channel length (L) direction of a transistor including an oxide semiconductor film in which three films are stacked. FIG. 14B is a cross-sectional view in the channel length (L) direction of a transistor including an oxide semiconductor film in which two films are stacked.

Figure 15A:
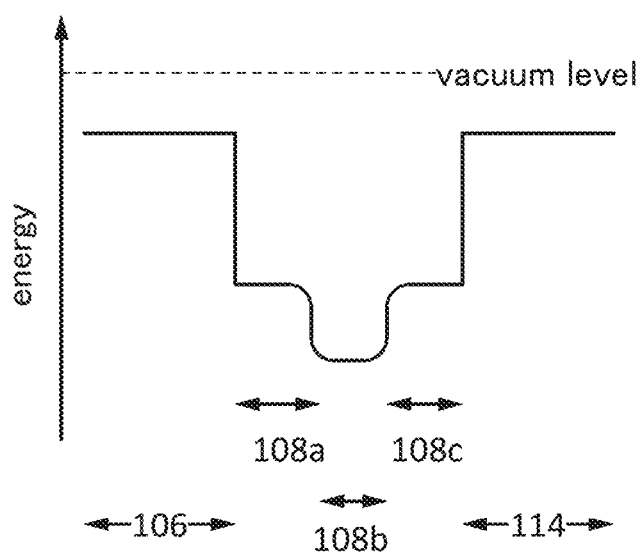
FIGS. 15A and 15B are schematic views each illustrating a band structure of a stacked layer film of a transistor of one embodiment.
Figure 15B:
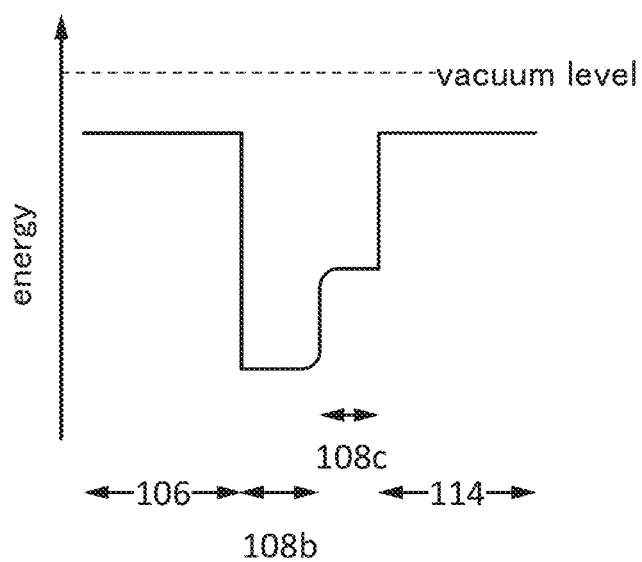

FIGS. 15A and 15B are schematic views each illustrating a band structure of stacked films. Stacked films include oxide semiconductor films and insulating films in contact with the oxide semiconductor film. For easy understanding, the band structure shows the energy level of the conduction band minimum ($E_c$) of each of the oxide semiconductor films and the insulating films included in the stacked-layer film.

FIG. 15A illustrates an example of a band structure in the thickness direction of a stack including the insulating film 106, the semiconductor films 108a, 108b, and 108c, and the insulating film 114.

FIG. 15B illustrates an example of a band structure in the thickness direction of a stack including the insulating film 106, the semiconductor films 108b and 108c, and the insulating film 114.

Structural Example 1 of Semiconductor Device

For example, a semiconductor film which includes three films and is positioned between two insulating films can be used for the transistor. Specifically, a semiconductor film which includes the semiconductor films 108a, 108b, and 108c and are positioned between the insulating film 106 and the insulating film 116 can be used (see FIG. 14A and FIG. 15A).

The semiconductor film 108c includes a region overlapping with the semiconductor film 108a and the semiconductor film 108b includes a region positioned between the semiconductor film 108a and the semiconductor film 108c.

The insulating film 116 includes a region overlapping with the insulating film 106.

The semiconductor film 108a includes a region in contact with the insulating film 106, the semiconductor film 108c includes a region in contact with the insulating film 116, and the regions overlap with each other.

FIG. 15A is a band diagram of a structure in which a silicon oxide film is used as each of the insulating films 106 and 114, an oxide semiconductor film formed using a metal oxide target having an atomic ratio of metal elements of In:Ga:Zn=1:3:2 is used as the semiconductor film 108a, an oxide semiconductor film formed using a metal oxide target having an atomic ratio of metal elements of In:Ga:Zn=4:2:4.1 is used as the semiconductor film 108b, and an oxide semiconductor film formed using a metal oxide target having an atomic ratio of metal elements of In:Ga:Zn=1:3:2 is used as the semiconductor film 108c.

Structural Example 2 of Semiconductor Device

For example, a semiconductor film which includes two films and is positioned between two insulating films can be used for the transistor. Specifically, an oxide semiconductor film which includes the semiconductor film 108b and the semiconductor film 108c and is positioned between the insulating film 106 and the insulating film 116 can be used for the transistor (see FIG. 14B and FIG. 15B).

The semiconductor film 108c includes a region overlapping with the semiconductor film 108b.

The insulating film 116 includes a region overlapping with the insulating film 106.

The semiconductor film 108b includes a region in contact with the insulating film 106 and the semiconductor film 108c includes a region in contact with the insulating film 116 and regions overlap with each other.

FIG. 15B is a band diagram of a stacked-layer structure in which a silicon oxide film is used as each of the insulating films 106 and 114, an oxide semiconductor film formed using a metal oxide target having an atomic ratio of metal elements of In:Ga:Zn=4:2:4.1 is used as the semiconductor film 108b, and a film formed using a metal oxide target having an atomic ratio of metal elements of In:Ga:Zn=1:3:2 is used as the semiconductor film 108c.

<Band Structure of Semiconductor Film>

As illustrated in FIGS. 15A and 15B, the energy level of the conduction band minimum gradually varies between the semiconductor film 108a and the semiconductor film 108b and between the semiconductor film 108b and the semiconductor film 108c. In other words, the energy level of the conduction band minimum is continuously varied or continuously connected. To obtain such a band structure, there exists no impurity, which forms a defect state such as a trap center or a recombination center, at the interface between the semiconductor film 108a and the semiconductor film 108b or at the interface between the semiconductor film 108b and the semiconductor film 108c.

To form a continuous junction between the semiconductor film 108a and the semiconductor film 108b and between the semiconductor film 108b and the semiconductor film 108c, the films are required to be formed successively without exposure to the air by using a multi-chamber deposition apparatus (sputtering apparatus) provided with a load lock chamber.

With the band structure of FIG. 15A or FIG. 15B, the semiconductor film 108b serves as a well, and a channel region is formed in the semiconductor film 108b in the transistor with the stacked-layer structure.

Note that by providing the semiconductor film 108a and/or the semiconductor film 108c, the semiconductor film 108b can be distanced away from trap states.

In addition, the trap states might be more distant from the vacuum level than the energy level of the conduction band minimum ($E_c$) of the semiconductor film 108b functioning as a channel region, so that electrons are likely to be accumulated in the trap states. When the electrons are accumulated in the trap states, the electrons become negative fixed electric charge, so that the threshold voltage of the transistor is shifted in the positive direction. Therefore, it is preferable that the trap states be closer to the vacuum level than the energy level of the conduction band minimum ($E_c$) of the semiconductor film 108b. Such a structure inhibits accumulation of electrons in the trap states. As a result, the on-state current and the field-effect mobility of the transistor can be increased.

The energy level of the conduction band minimum of each of the semiconductor films 108a and 108c is closer to the vacuum level than that of the semiconductor film 108b. Typically, a difference in energy level between the conduction band minimum of the semiconductor film 108b and the conduction band minimum of each of the semiconductor films 108a and 108c is 0.15 eV or more or 0.5 eV or more and 2 eV or less or 1 eV or less. That is, the difference between the electron affinity of each of the semiconductor films 108a and 108c and the electron affinity of the semiconductor film 108b is 0.15 eV or more or 0.5 eV or more and 2 eV or less or 1 eV or less.

In such a structure, the semiconductor film 108b serves as a main path of current and functions as a channel region. In addition, since the semiconductor films 108a and 108c each include one or more metal elements included in the semiconductor film 108b in which a channel region is formed, interface scattering is less likely to occur at the interface between the semiconductor film 108a and the semiconductor film 108b or at the interface between the semiconductor film 108b and the semiconductor film 108c. Thus, the transistor can have high field-effect mobility because the movement of carriers is not hindered at the interface.

To prevent each of the semiconductor films 108a and 108c from functioning as part of a channel region, a material having sufficiently low conductivity is used for the semiconductor films 108a and 108c. Alternatively, a material which has a smaller electron affinity (a difference in energy level between the vacuum level and the conduction band minimum) than the semiconductor film 108b and has a difference in energy level in the conduction band minimum from the semiconductor film 108b (band offset) is used for the semiconductor films 108a and 108c. Furthermore, to inhibit generation of a difference between threshold voltages due to the value of the drain voltage, it is preferable to form the semiconductor films 108a and 108c using a material whose energy level of the conduction band minimum is closer to the vacuum level than that of the semiconductor film 108b. For example, a difference in energy level between the conduction band minimum of the semiconductor film 108b and the conduction band minimum of the semiconductor films 108a and 108c is preferably 0.2 eV or more and further preferably 0.5 eV or more.

It is preferable that the semiconductor films 108a and 108c not have a spinel crystal structure. This is because if the semiconductor films 108a and 108c have a spinel crystal structure, constituent elements of the conductive films 112a and 112b might be diffused to the semiconductor film 108b at the interface between the spinel crystal structure and another region.

The thickness of each of the semiconductor films 108a and 108c is greater than or equal to a thickness that is capable of inhibiting diffusion of the constituent elements of the conductive films 112a and 112b to the semiconductor film 108b, and less than a thickness that inhibits supply of oxygen from the insulating film 114 to the semiconductor film 108b. For example, when the thickness of each of the semiconductor films 108a and 108c is greater than or equal to 10 nm, diffusion of the constituent elements of the conductive films 112a and 112b to the semiconductor film 108b can be inhibited. When the thickness of each of the semiconductor films 108a and 108c is less than or equal to 100 nm, oxygen can be effectively supplied from the insulating film 114 to the semiconductor film 108b.

When the semiconductor films 108a and 108c are each an In-M-Zn oxide in which the atomic proportion of M (M is Al, Ga, Y, or Sn) is higher than that of In, the energy gap of each of the semiconductor films 108a and 108c can be large and the electron affinity thereof can be small. Therefore, a difference in electron affinity between the oxide semiconductor film 108b and each of the oxide semiconductor films 108a and 108c may be controlled by the proportion of the element M. Furthermore, an oxygen vacancy is less likely to be generated in the oxide semiconductor film in which the atomic proportion of M is higher than that of In because M is a metal element that is strongly bonded to oxygen.

When an In-M-Zn oxide is used for the semiconductor films 108a and 108c, the proportions of In and M, not taking Zn and O into consideration, are preferably as follows: the atomic percentage of In is less than 50 atomic % and the atomic percentage of M is greater than 50 atomic %; and further preferably, the atomic percentage of In is less than 25 atomic % and the atomic percentage of M is greater than 75 atomic %. Alternatively, a gallium oxide film may be used as each of the semiconductor films 108a and 108c.

Furthermore, in the case where each of the semiconductor films 108a, 108b, and 108c is an In-M-Zn oxide, the proportion of M atoms in each of the semiconductor films 108a and 108c is higher than that in the semiconductor film 108b. Typically, the proportion of M atoms in each of the semiconductor films 108a and 108c is 1.5 or more times, preferably twice or more times, and further preferably three or more times as high as that in the oxide semiconductor film 108b.

Furthermore, in the case where the semiconductor films 108a, 108b, and 108c are each an In-M-Zn oxide, when the semiconductor film 108b has an atomic ratio of In:M:Zn=$x_1$:$y_1$:$z_1$ and the semiconductor films 108a and 108c each have an atomic ratio of In:M:Zn=$x_2$:$y_2$:$z_2$, $y_2/x_2$ is larger than $y_1/x_1$, preferably $y_2/x_2$ is 1.5 or more times as large as $y_1/x_1$, further preferably $y_2/x_2$ is two or more times as large as $y_1/x_1$, and still further preferably $y_2/x_2$ is three or more times or four or more times as large as $y_1/x_1$. At this time, $y_1$ is preferably greater than or equal to $x_1$ in the semiconductor film 108b, because stable electrical characteristics of a transistor including the semiconductor film 108b can be achieved. However, when $y_1$ is three or more times as large as $x_1$, the field-effect mobility of the transistor including the semiconductor film 108b is reduced. Accordingly, $y_1$ is preferably smaller than three times $x_1$.

In the case where the semiconductor film 108b is an In-M-Zn oxide and a target having the atomic ratio of metal elements of In:M:Zn=$x_1$:$y_1$:$z_1$ is used for depositing the semiconductor film 108b, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6.

In the case where the semiconductor films 108a and 108c are each an In-M-Zn oxide and a target having an atomic ratio of metal elements of In:M:Zn=$x_2$:$y_2$:$z_2$ is used for depositing the semiconductor films 108a and 108c, $x_2/y_2$ is preferably less than $x_1/y_1$, and $z_2/y_2$ is preferably greater than or equal to ⅓ and less than or equal to 6 and further preferably greater than or equal to 1 and less than or equal to 6. When the atomic ratio of M with respect to In is high, the energy gap of the semiconductor films 108a and 108c can be large and the electron affinity thereof can be small; therefore, $y_2/x_2$ is preferably higher than or equal to 3 or higher than or equal to 4. Typical examples of the atomic ratio of the metal elements of the target include In:M:Zn=1:3:2, In:M:Zn=1:3:4, In:M:Zn=1:3:5, In:M:Zn=1:3:6, In:M:Zn=1:4:2, In:M:Zn=1:4:4, In:M:Zn=1:4:5, and In:M:Zn=1:5:5.

Furthermore, in the case where the semiconductor films 108a and 108c are each an In-M oxide, when a divalent metal element (e.g., zinc) is not included as M, the semiconductor films 108a and 108c which do not include a spinel crystal structure can be formed. As the semiconductor films 108a and 108c, for example, an In—Ga oxide film can be used. The In—Ga oxide can be formed by a sputtering method using an In—Ga metal oxide target (In:Ga=7:93), for example. To deposit the semiconductor films 108a and 108c by a sputtering method using DC discharge, on the assumption that an atomic ratio of In:M is x:y, y/(x+y) is preferably less than or equal to 0.96 and further preferably less than or equal to 0.95, for example, 0.93.

In each of the semiconductor films 108a, 108b, and 108c, the proportions of the atoms in the above atomic ratio vary within a range of ±40% as an error.

This embodiment can be implemented in combination with any of the other embodiments in this specification as appropriate.

Embodiment 5

In this embodiment, a structure of a data processing device of one embodiment of the present invention will be described with reference to FIGS. 16A to 16C and FIGS. 17A and 17B.

Figure 16A:
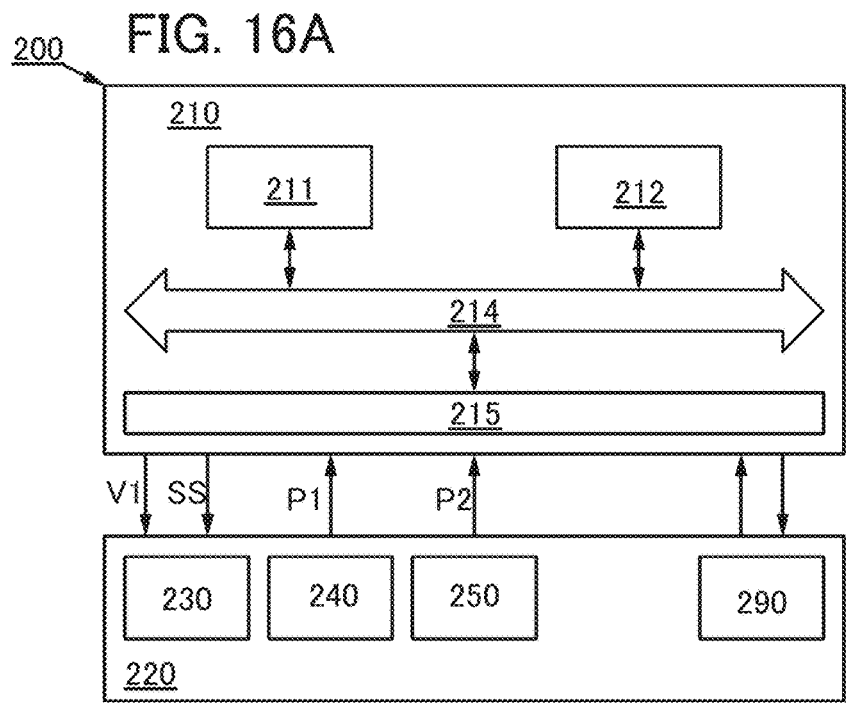
FIGS. 16A, 16B, and 16C illustrate a structure of a data processing device according to one embodiment.
Figure 16B:
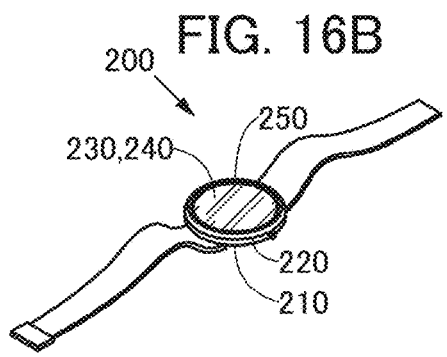
Figure 16C:
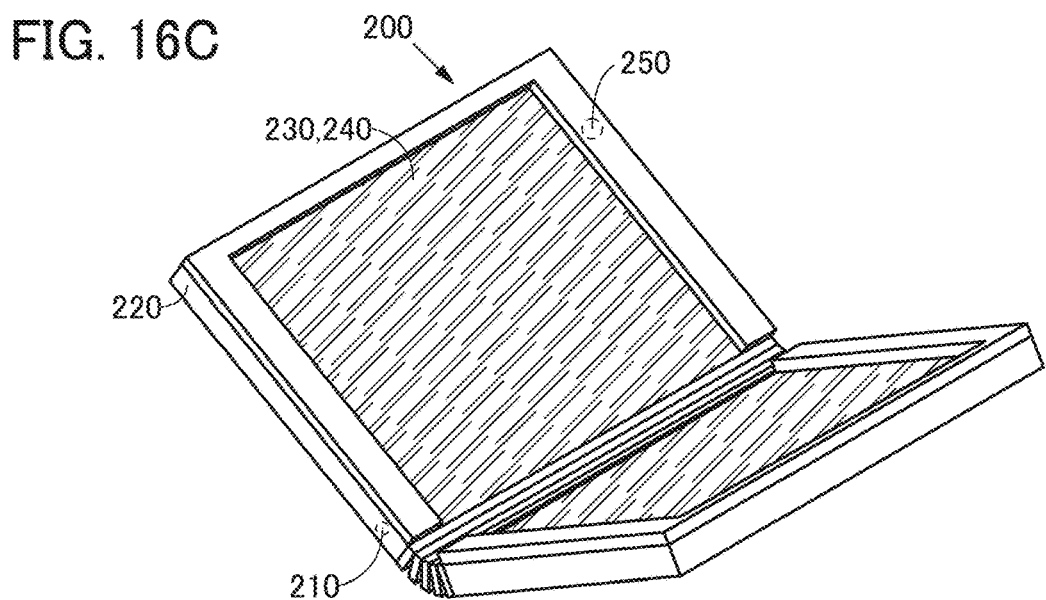

FIGS. 16A to 16C illustrate a structure of the data processing device of one embodiment of the present invention. FIG. 16A is a block diagram of a data processing device of one embodiment of the present invention. FIGS. 16B and 16C are each a projection view illustrating an example of an external view of the data processing device 200.

Figure 17A:
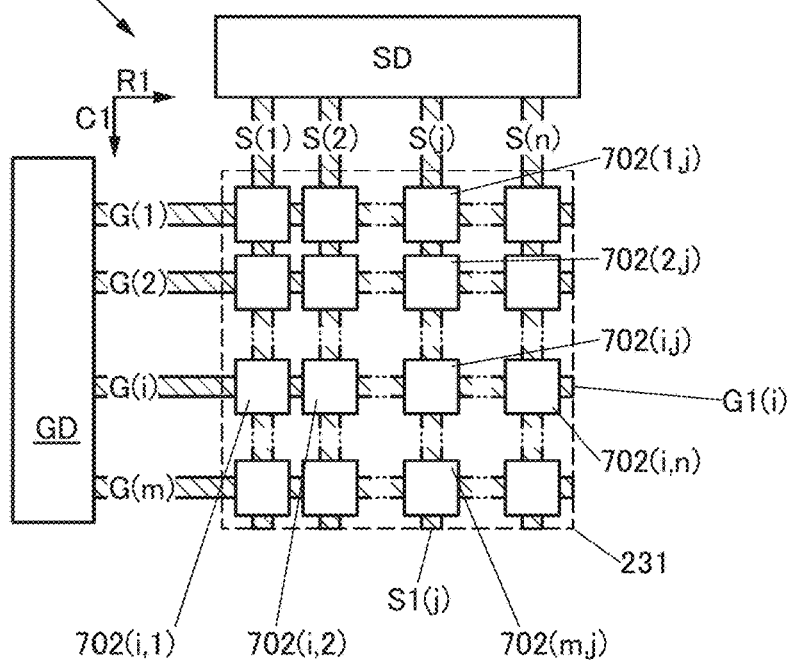
FIGS. 17A and 17B are block diagrams each illustrating a structure of a display device of one embodiment.
Figure 17B:
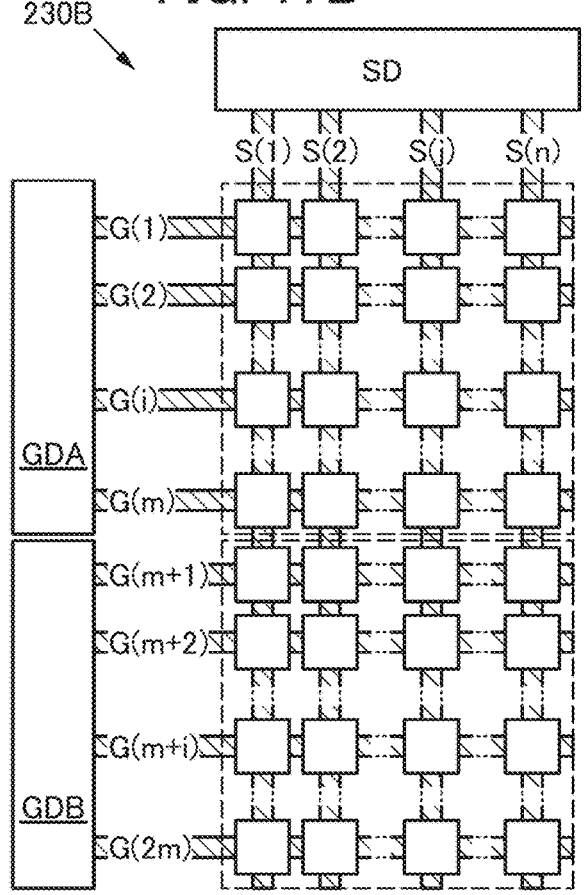

FIG. 17A is a block diagram illustrating the configuration of a display portion 230. FIG. 17B is a block diagram illustrating a configuration of a display portion 230B.

Figure 18A:
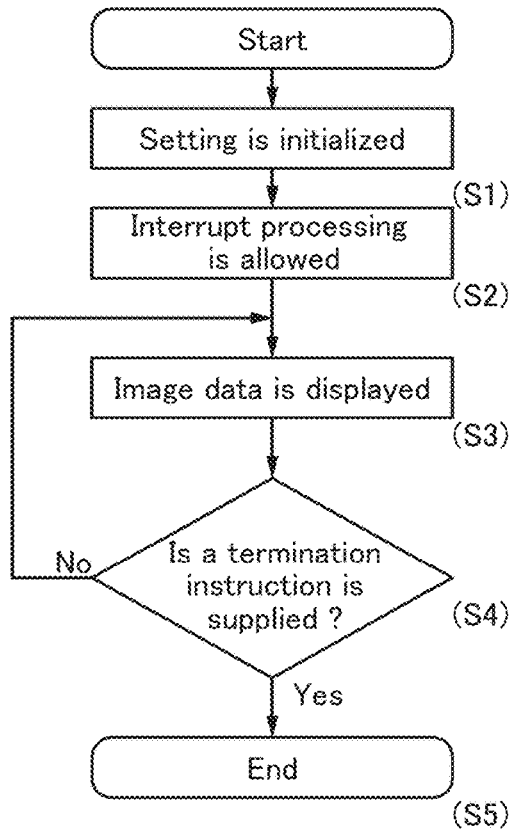
FIGS. 18A and 18B are flow charts illustrating a driving method of a data processing device of one embodiment.
Figure 18B:
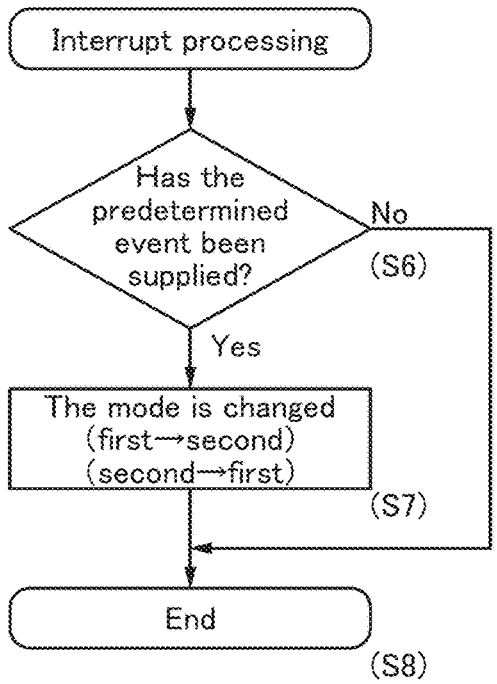

FIGS. 18A and 18B are flow charts showing the program of one embodiment of the present invention. FIG. 18A is a flow chart showing main processing of the program of one embodiment of the present invention. FIG. 18B is a flow chart showing interrupt processing.

Structure Example 1 of Data Processing Device

The data processing device described in this embodiment includes an input/output device 220 and an arithmetic device 210 (see FIG. 16A). For example, the input/output device described in Embodiment 1 can be used as the input/output device 220.

The input/output device 220 has a function of supplying positional data P1 on the basis of a sensing signal.

The arithmetic device 210 is electrically connected to the input/output device 220.

The arithmetic device 210 has a function of supplying the image data V1. The arithmetic device 210 includes an arithmetic portion 211 and a storage portion 212. The storage portion 212 has a function of storing a program to be executed by the arithmetic portion 211.

The program includes a step of identifying a predetermined event by the positional data P1 and a step of changing a mode when the predetermined event is supplied.

The arithmetic device 210 has a function of generating the image data V1 on the basis of the mode and a function of supplying the control data SS on the basis of the mode.

The input/output device 220 includes the driver circuit GD.

The driver circuit GD has a function of receiving control data.

The driver circuit GD has a function of supplying the selection signal so that the frequency of supplying the selection signal when the control data SS is supplied on the basis of a second mode is lower than that when the control data SS is supplied on the basis of a first mode. In other words, the driver circuit GD in the second mode has a function of supplying the selection signal at a frequency lower than that in the first mode.

Thus, the arithmetic device can generate the image data or the control data on the basis of the positional data which is supplied using the input/output device. In addition, with the generated image data or control data, the power consumption can be reduced. Moreover, display with high visibility can be performed. As a result, a novel data processing device that is highly convenient or reliable can be provided.

<Structure>

The data processing device of one embodiment of the present invention includes the arithmetic device 210 or the input/output device 220.

<<Arithmetic Device 210>>

The arithmetic device 210 includes the arithmetic portion 211, the storage portion 212, a transmission path 214, and an input/output interface 215 (see FIG. 16A).

<<Arithmetic Portion 211>>

The arithmetic portion 211 is configured to, for example, execute a program. For example, a CPU described in Embodiment 6 can be used. In that case, power consumption can be sufficiently reduced.

<<Storage Portion 212>>

The storage portion 212 is configured to, for example, store the program executed by the arithmetic portion 211, initial data, setting data, an image, or the like.

Specifically, a hard disk, a flash memory, a memory including a transistor including an oxide semiconductor, or the like can be used.

<<Input/Output Interface 215, Transmission Path 214>>

The input/output interface 215 includes a terminal or a wiring and is configured to supply and receive data. For example, the input/output interface 215 can be electrically connected to the transmission path 214 and the input/output device 220.

The transmission path 214 includes a wiring and is configured to supply and receive data. For example, the transmission path 214 can be electrically connected to the input/output interface 215. In addition, the transmission path 214 can be electrically connected to the arithmetic portion 211, the storage portion 212, or the input/output interface 215.

<<Input/Output Device 220>>

The input/output device 220 includes the display portion 230, the input portion 240, the sensor portion 250, or a communication portion 290. For example, the input/output device described in Embodiment 1 can be used. Accordingly, power consumption can be reduced.

<<Display Portion 230>>

The display portion 230 includes a display region 231, a driver circuit GD, and a driver circuit SD (see FIG. 17A). The display portion includes wirings G(1) to G(m) and wirings S(1) to S(n). For example, the wiring G(i) includes the wiring G1(i), and the wiring S(i) includes the signal line S1(j).

The display region 231 includes one group of pixels 702(i, 1) to 702(i, n), another group of pixels 702(1, j) to 702(m, j), and a scan line G1(i) (see FIG. 17A). Note that i is an integer greater than or equal to 1 and less than or equal to m, j is an integer greater than or equal to 1 and less than or equal to n, and m and n are each an integer greater than or equal to 1.

The one group of pixels 702(i, 1) to 702(i, n) include the pixel 702(i, j) and are provided in the row direction (the direction indicated by the arrow R1 in the drawing).

The another group of pixels 702(1, j) to 702(m, j) include the pixel 702(1, j) and are provided in the column direction (the direction indicated by the arrow C1 in the drawing) that intersects the row direction.

The scan line G1(i) is electrically connected to the one group of pixels 702(i, 1) to 702(i, n) provided in the row direction.

The another group of pixels 702(1, j) to 702(m, j) provided in the column direction are electrically connected to the signal line S1(j).

The display portion 230 can include a plurality of driver circuits. For example, the display portion 230B can include a driver circuit GDA and a driver circuit GDB (see FIG. 17B).

<<Driver Circuit GD>>

The driver circuit GD is configured to supply a selection signal in accordance with the control data.

For example, the driver circuit GD is configured to supply a selection signal to one scan line at a frequency of 30 Hz or higher, preferably 60 Hz or higher, in accordance with the control data. Accordingly, moving images can be smoothly displayed.

For example, the driver circuit GD is configured to supply a selection signal to one scan line at a frequency of lower than 30 Hz, preferably lower than 1 Hz, further preferably lower than once per minute, in accordance with the control data. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<<Driver Circuit SD>>

The driver circuit SD is configured to supply an image signal in accordance with the image data V1.

<<Pixel 702(i, j)>>

The pixel 702(1, j) includes the first display element 750(i, j) or the second display element 550(i, j). Furthermore, the pixel 702(i, j) includes a pixel circuit that drives the first display element 750(i, j) or the second display element 550(i, j). For example, the pixel structure that can be used for the display panel described in Embodiment 1 can be used for the pixel 702(i, j).

<<First Display Element 750(i, j)>>

For example, a display element having a function of controlling transmission or reflection of light can be used as the first display element 750(i, j). For example, a combined structure of a polarizing plate and a liquid crystal element or a MEMS shutter display element can be used. The use of a reflective display element can reduce power consumption of a display panel. Specifically, a reflective liquid crystal display element can be used as the first display element 750(i, j).

<<Second Display Element 550(i, j)>>

A display element having a function of emitting light can be used as the second display element 550(i, j), for example. Specifically, an organic EL element can be used.

<<Pixel Circuit>>

A pixel circuit including a circuit that is configured to drive the first display element 750(i, j) or the second display element 550(i, j) can be used.

A switch, a transistor, a diode, a resistor, an inductor, a capacitor, or the like can be used in the pixel circuit.

For example, one or a plurality of transistors can be used as a switch. Alternatively, a plurality of transistors connected in parallel, in series, or in combination of parallel connection and series connection can be used as a switch.

<<Transistor>>

For example, semiconductor films formed at the same step can be used for transistors in the driver circuit and the pixel circuit.

For example, bottom-gate transistors, top-gate transistors, or the like can be used.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 14 can be used. Specifically, a semiconductor containing silicon can be used for a semiconductor film. For example, single crystal silicon, polysilicon, microcrystalline silicon, amorphous silicon, or the like can be used for the semiconductor film of the transistor.

Note that the temperature for forming a transistor using polysilicon as a semiconductor is lower than the temperature for forming a transistor using single crystal silicon as a semiconductor.

In addition, the transistor using polysilicon as a semiconductor has higher field-effect mobility than the transistor using amorphous silicon as a semiconductor, and therefore a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon in a semiconductor film can be used. Specifically, a transistor that uses an oxide semiconductor in a semiconductor film can be used.

A pixel circuit including the transistor that uses an oxide semiconductor in the semiconductor film can hold an image signal for a longer time than a pixel circuit including the transistor that uses amorphous silicon in a semiconductor film. Specifically, the selection signal can be supplied at a frequency of lower than 30 Hz, preferably lower than 1 Hz, further preferably lower than once per minute while flickering is suppressed. Consequently, eyestrain on a user of the data processing device can be reduced, and power consumption for driving can be reduced.

Alternatively, for example, a transistor including a compound semiconductor can be used. Specifically, a semiconductor containing gallium arsenide can be used in a semiconductor film.

For example, a transistor including an organic semiconductor can be used. Specifically, an organic semiconductor containing any of polyacenes and graphene can be used in the semiconductor film.

<<Input Portion 240>>

A variety of human interfaces or the like can be used as the input portion 240 (see FIG. 16A).

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing a portion where image data is displayed by using a gesture of touching and moving his/her finger on the touch panel.

<<Sensor Portion 250>>

The sensor portion 250 is configured to supply sensing data P2, such as pressure data, by sensing its surroundings.

For example, a camera, an acceleration sensor, a direction sensor, a pressure sensor, a temperature sensor, a humidity sensor, an illuminance sensor, a global positioning system (GPS) signal receiving circuit, or the like can be used as the sensor portion 250.

For example, when the arithmetic device 210 determines that the ambient light level measured by an illuminance sensor of the sensor portion 250 is sufficiently higher than the predetermined illuminance, image data is displayed using the first display element 750(i, j). When the arithmetic device 210 determines that it is dim, image data is displayed using the first display element 750(i, j) and the fifth display element 550(i, j)W. When the arithmetic device 210 determines that it is dark, image data is displayed using the fifth display element 550(i, j)W.

Specifically, an image is displayed with a reflective liquid crystal element and an organic EL element in accordance with the ambient brightness.

Thus, image data can be displayed in such a manner that, for example, a reflective display element is used in an environment with strong external light and a self-luminous display element is used in a dim environment. As a result, a novel data processing device that has low power consumption and is highly convenient or reliable can be provided.

For example, a sensor that is configured to measure the chromaticity of ambient light can be used in the sensor portion 250. Specifically, a CCD camera or the like can be used. Owing to this, white balance can be adjusted in accordance with the chromaticity of ambient light sensed by the sensor portion 250.

Specifically, in the first step, imbalance disruption of white balance of ambient light is measured.

In the second step, the intensity of light of a color which is insufficient in an image to be displayed by the first display element 750(i, j) using reflection of ambient light is estimated.

In a third step, an image is displayed by ambient light reflected by the first display element 750(*i*, *j*) and light emitted from the second display element 550(*i*, *j*)R, the third display element 550(*i*, *j*)G, the fourth display element 550(*i*, *j*)B, and the fifth display element 550(*i*, *j*)W makes up an insufficient color.

Thus, deviation of white balance of light reflected by the first display element 750(*i*, *j*) can be corrected using light emitted from the second display element 550(*i*, *j*)R, the third display element 550(*i*, *j*)G, the fourth display element 550(*i*, *j*)B, and the fifth display element 550(*i*, *j*)W. As a result, an image with adjusted white balance can be displayed. For example, paper white can be expressed. Furthermore, power consumption can be reduced. Furthermore, a novel data processing device which is highly convenient or reliable can be provided.

In the case where there is deviation of color displayed by the first display element 750(*i*, *j*), an image in which deviation of white balance is corrected using the second display element 550(*i*, *j*)R, the third display element 550(*i*, *j*)G, the fourth display element 550(*i*, *j*)B, and the fifth display element 550(*i*, *j*)W can be displayed.

For example, in the case where the first display element 750(*i*, *j*) displays a yellowish color, the color is corrected by adding a blue color using the fourth display element 550(*i*, *j*)B.

For example, in the case where the first display element 750(*i*, *j*) displays a bluish color, the color is corrected using a yellow color displayed by the second display element 550(*i*, *j*)R and the third display element 550(*i*, *j*)G.

As a result, an image with adjusted white balance can be displayed. For example, paper white can be expressed. Alternatively, power consumption can be reduced. A novel data processing device which is highly convenient or reliable can be provided.

<<Communication Portion 290>>

The communication portion 290 is configured to supply and acquire data to/from a network.

<Program>

The program of one embodiment of the present invention is composed of the following steps (see FIG. 18A).

<<First Step>>

In the first step, setting is initialized (see S1 in FIG. 18A).

For example, predetermined image data that is to be displayed on starting and data for specifying a method of displaying the image data are acquired from the storage portion 212. Specifically, a still image can be used as the predetermined image data. A method of refreshing image data at a frequency lower than that in the case of using a moving image can be used as the method of displaying image data.

<<Second Step>>

In the second step, interrupt processing is allowed (see S2 in FIG. 18A). Note that an arithmetic device allowed to execute the interrupt processing can perform the interrupt processing in parallel with the main processing. The arithmetic device that has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

<<Third Step>>

In a third step, image data is displayed in a predetermined mode selected in the first step or the interrupt processing (see S3 in FIG. 18A). For example, two different methods for displaying the image data V1 are associated with the first mode and the second mode in advance. Thus, a display method can be selected on the basis of the mode.

<<First Mode>>

Specifically, a method of supplying selection signals to a scan line at a frequency of 30 Hz or more, preferably 60 Hz or more, and performing display in accordance with the selection signals can be associated with the first mode.

The supply of selection signals at a frequency of 30 Hz or more, preferably 60 Hz or more, can display a smooth moving image.

For example, when an image is refreshed at a frequency of 30 Hz or more, preferably 60 Hz or more, an image smoothly following the user's operation can be displayed on the data processing device 200 the user is operating.

<<Second Mode>>

Specifically, a method of supplying selection signals to a scan line at a frequency of less than 30 Hz, preferably less than 1 Hz, further preferably once a minute and performing display in accordance with the selection signals can be associated with the second mode.

The supply of selection signals at a frequency of less than 30 Hz, preferably less than 1 Hz, further preferably once a minute, can perform display with flickers reduced. Furthermore, power consumption can be reduced.

For example, when a light-emitting element is used as the second display element, the light-emitting element can be configured to emit light in a pulsed manner so as to display image data. Specifically, an organic EL element can be configured to emit light in a pulsed manner, and its afterglow can be used for display. The organic EL element has excellent frequency characteristics; thus, time for driving the light-emitting element can be shortened, and thus power consumption can be reduced in some cases. Alternatively, heat generation can be inhibited, and thus the deterioration of the light-emitting element can be suppressed in some cases.

For example, when the data processing device 200 is used for a clock or watch, the display can be refreshed at a frequency of once a second, once a minute, or the like.

<<Fourth Step>>

In the fourth step, the program moves to the fifth step when a termination instruction is supplied, and the program moves to the third step when the termination instruction is not supplied (see S4 in FIG. 18A).

For example, the termination instruction supplied in the interrupt processing can be used.

<<Fifth Step>>

In the fifth step, the program terminates (see S5 in FIG. 18A).

<<Interrupt Processing>>

The interrupt processing includes sixth to eighth steps described below (see FIG. 18B).

<<Sixth Step>>

In the sixth step, the processing proceeds to the seventh step when a predetermined event has been supplied, whereas the processing proceeds to the eighth step when the predetermined event has not been supplied (see S6 in FIG. 18B). For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than or equal to 0.5 seconds, still further preferably shorter than or equal to 0.1 seconds.

<<Seventh Step>>

In the seventh step, the mode is changed (see S7 in FIG. 18B). Specifically, the mode is changed to the second mode when the first mode has been selected, or the mode is changed to the first mode when the second mode has been selected.

<<Eighth Step>>

In the eighth step, the interrupt processing terminates (see S8 in FIG. 18B). Note that in a period in which the main processing is executed, the interrupt processing may be repeatedly executed.

<<Predetermined Event>>

For example, the following events can be used: events supplied using a pointing device such as a mouse (e.g., "click" and "drag") and events supplied to a touch panel with a finger or the like used as a pointer (e.g., "tap", "drag", or "swipe").

For example, the position of a slide bar pointed by a pointer, the swipe speed, and the drag speed can be used as parameters assigned to an instruction associated with the predetermined event.

For example, positional data sensed by the input portion 240 is compared to the set threshold, and the compared results can be used for the event. Alternatively, data sensed by the sensor portion 250 is compared to the set threshold, and the compared results can be used for the event.

Specifically, a crown that can be pushed in a housing, a pressure sensor in contact with the crown or the like, or the like can be used as the sensor portion 250 (see FIG. 16B).

For example, a photoelectric conversion element provided in a housing can be used in the sensor portion 250 (see FIG. 16C).

<<Instruction Associated with Predetermined Event>>

For example, the termination instruction can be associated with a predetermined event.

For example, "page-turning instruction" for switching displayed image data from one to another can be associated with a predetermined event. Note that a parameter for determining the page-turning speed or the like when the "page-turning instruction" is executed can be supplied using the predetermined event.

For example, "scroll instruction" for moving the display position of part of image data and displaying another part continuing from that part can be associated with a predetermined event. Note that a parameter for determining the moving speed of the display position or the like when the "scroll instruction" is executed can be supplied using the predetermined event.

For example, an instruction for generating image data can be associated with a predetermined event. Note that a parameter for determining the brightness of a generated image may be obtained by the input portion 240 or the sensor portion 250. Specifically, the ambient luminance may be sensed to be used for the parameter.

For example, an instruction or the like for acquiring data distributed via a push service using the communication portion 290 can be associated with a predetermined event.

Note that positional data sensed by the sensor portion 250 may be used for the determination of the presence or absence of a qualification for acquiring data. Specifically, it may be determined that there is a qualification for acquiring data when the user is in a predetermined class room, school, conference room, office, or building. For example, educational materials can be fed from a classroom of a school, a university, or the like and displayed, so that the data processing device 200 can be used as a schoolbook or the like (see FIG. 16C). Alternatively, materials distributed from a conference room in, for example, a company can be received and displayed.

Note that this embodiment can be combined with any of the other embodiments in this specification as appropriate.

Embodiment 6

In this embodiment, a semiconductor device (memory device) that can retain stored data even when not powered and that has an unlimited number of write cycles, and a CPU including the semiconductor device are described. The CPU described in this embodiment can be used for the data processing device described in Embodiment 1, for example.

<Memory Device>

Figure 19A:
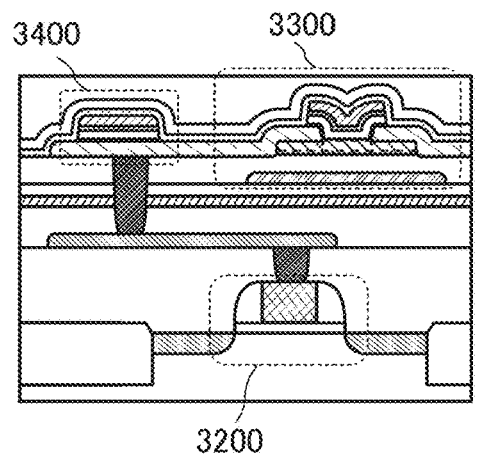
FIGS. 19A to 19C are a cross-sectional view and circuit diagrams illustrating structures of a semiconductor device of one embodiment.
Figure 19B:
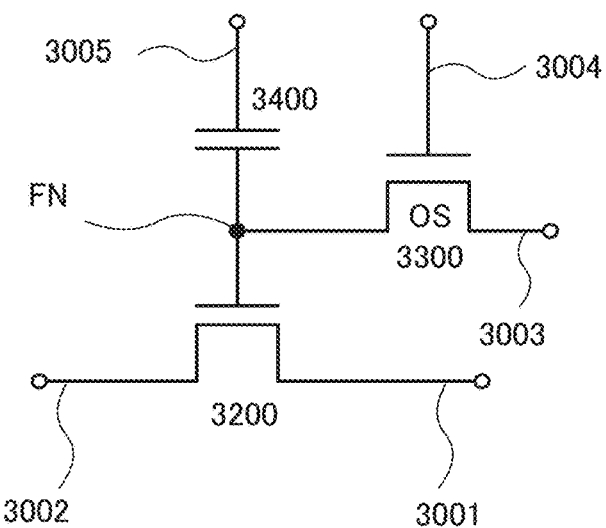
Figure 19C:
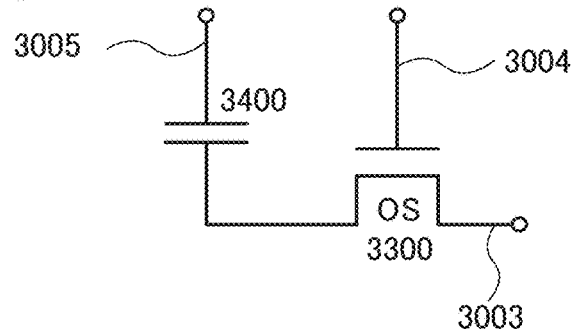

An example of a semiconductor device (memory device) that can retain stored data even when not powered and that has an unlimited number of write cycles is shown in FIGS. 19A to 19C. Note that FIG. 19B is a circuit diagram of the structure in FIG. 19A.

The semiconductor device illustrated in FIGS. 19A and 19B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. On the other hand, a transistor including an oxide semiconductor has a low off-state current.

The transistor 3300 is a transistor in which a channel is formed in a semiconductor layer including an oxide semiconductor. Since the off-state current of the transistor 3300 is small, stored data can be retained for a long period. In other words, power consumption can be sufficiently reduced because a semiconductor memory device in which refresh operation is unnecessary or the frequency of refresh operation is extremely low can be provided.

In FIG. 19B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 19A has a feature that the potential of the gate electrode of the transistor 3200 can be retained, and thus enables writing, retaining, and reading of data as follows.

Writing and retaining of data are described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate of the transistor 3200 (writing). Here, one of two kinds of charges providing different potential levels (hereinafter referred to as a low-level charge and a high-level charge) is supplied. After that, the potential of the fourth wiring 3004 is set to a potential at which the transistor 3300 is turned off, so that the transistor 3300 is turned off. Thus, the charge supplied to the gate of the transistor 3200 is held (retaining).

Since the off-state current of the transistor 3300 is extremely small, the charge of the gate of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 that is needed to turn on the transistor 3200. Thus, the potential of the fifth wiring 3005 is set to a potential $V_0$ that is between $V_{th\_H}$ and $V_{th\_L}$, whereby charge supplied to the gate of the transistor 3200 can be determined. For example, in the case where the high-level charge is supplied to the gate electrode of the transistor 3200 in writing and the potential of the fifth wiring 3005 is $V_0$ ($>V_{th\_H}$), the transistor 3200 is turned on. In the case where the low-level charge is supplied to the gate electrode of the transistor 3200 in writing, even when the potential of the fifth wiring 3005 is $V_0$ ($<V_{th\_L}$), the transistor 3200 remains off. Thus, the data retained in the gate electrode of the transistor 3200 can be read by determining the potential of the second wiring 3002.

Note that in the case where memory cells are arrayed, it is necessary that only data of a designated memory cell(s) can be read. For example, the fifth wiring 3005 of memory cells from which data is not read may be supplied with a potential at which the transistor 3200 is turned off regardless of the potential supplied to the gate electrode, that is, a potential lower than $V_{th\_H}$, whereby only data of a designated memory cell(s) can be read. Alternatively, the fifth wiring 3005 of the memory cells from which data is not read may be supplied with a potential at which the transistor 3200 is turned on regardless of the potential supplied to the gate electrode, that is, a potential higher than $V_{th\_L}$, whereby only data of a designated memory cell(s) can be read.

The semiconductor device illustrated in FIG. 19C is different from the semiconductor device illustrated in FIG. 19A in that the transistor 3200 is not provided. Also in this case, writing and retaining of data can be performed in a manner similar to the above.

Next, reading of data of the semiconductor device illustrated in FIG. 19C is described. When the transistor 3300 is turned on, the third wiring 3003 that is in a floating state and the capacitor 3400 are electrically connected to each other, and the charge is redistributed between the third wiring 3003 and the capacitor 3400. As a result, the potential of the third wiring 3003 is changed. The amount of change in the potential of the third wiring 3003 varies depending on the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, $C_B$ is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the bit line BL in the case of retaining the potential $V_1$ ($=(C_B \times V_{B0} + C \times V_1)/(C_B + C)$) is higher than the potential of the bit line BL in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor including the first semiconductor material may be used for a driver circuit for driving a memory cell, and a transistor including the second semiconductor material may be stacked over the driver circuit as the transistor 3300.

When including a transistor in which a channel formation region is formed using an oxide semiconductor and which has an extremely small off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

The above memory device can also be used in an LSI such as a digital signal processor (DSP), a custom LSI, or a programmable logic device (PLD) and a radio frequency identification (RF-ID) tag, in addition to a central processing unit (CPU), for example.

<CPU>

Figure 20:
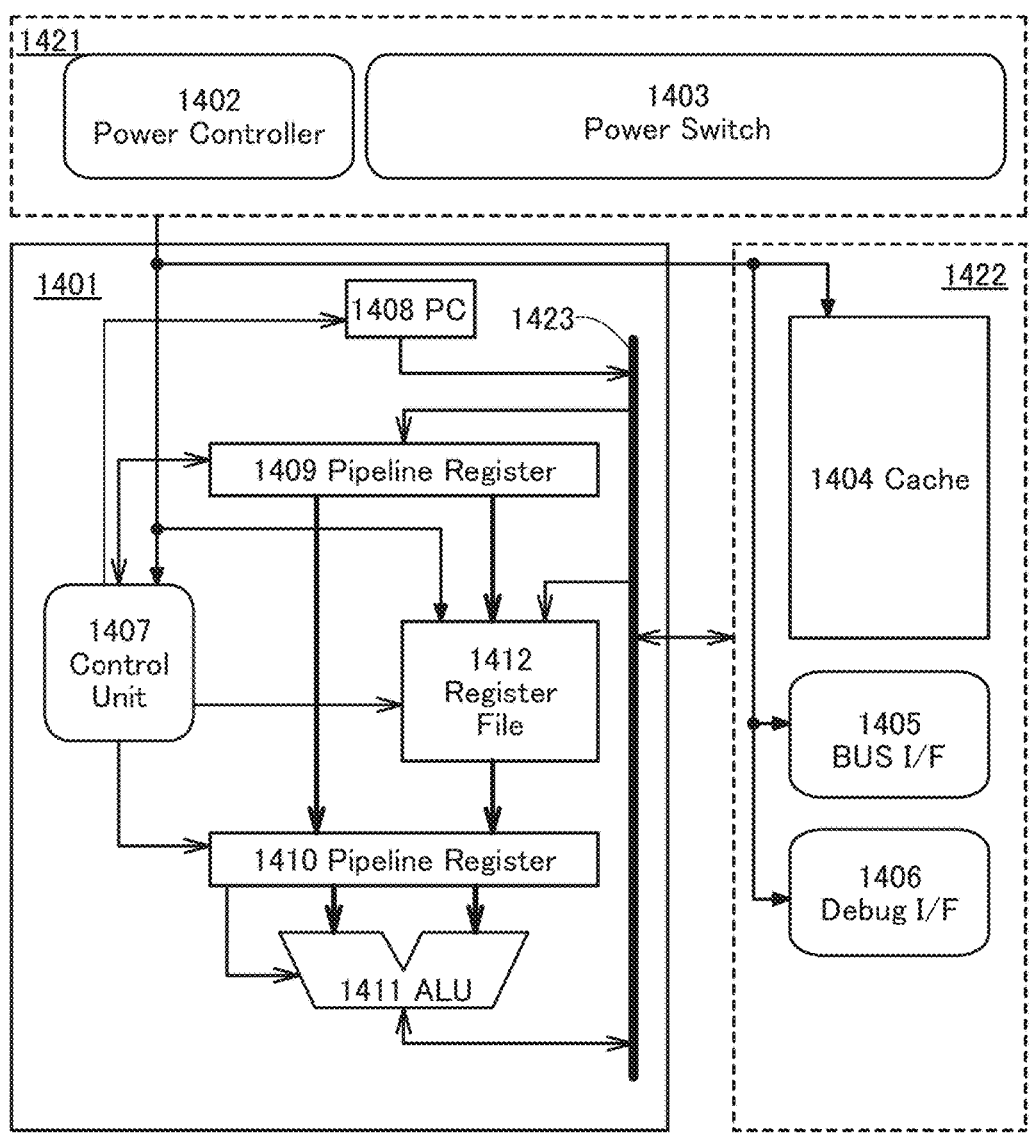
FIG. 20 is a block diagram illustrating the structure of a CPU of one embodiment.

A semiconductor device 1400 shown in FIG. 20 includes a CPU core 1401, a power management unit 1421, and a peripheral circuit 1422. The power management unit 1421 includes a power controller 1402 and a power switch 1403. The peripheral circuit 1422 includes a cache 1404 including cache memory, a bus interface (BUS I/F) 1405, and a debug interface (Debug I/F) 1406. The CPU core 1401 includes a data bus 1423, a control unit 1407, a PC (program counter) 1408, a pipeline register 1409, a pipeline register 1410, an ALU (arithmetic logic unit) 1411, and a register file 1412. Data is transmitted between the CPU core 1401 and the peripheral circuit 1422 such as the cache 1404 via the data bus 1423.

The semiconductor device (cell) can be used for many logic circuits typified by the power controller 1402 and the control unit 1407, particularly to all logic circuits that can be constituted using standard cells. Accordingly, the semiconductor device 1400 can be small. The semiconductor device 1400 can have reduced power consumption. The semiconductor device 1400 can have a higher operating speed. The semiconductor device 1400 can have a smaller power supply voltage variation.

When p-channel Si transistors and the transistor described in the above embodiment which includes an oxide semiconductor (preferably an oxide containing In, Ga, and Zn) in a channel formation region are used in the semiconductor device (cell) and the semiconductor device (cell) is used in the semiconductor device 1400, the semiconductor device 1400 can be small. The semiconductor device 1400 can have reduced power consumption. The semiconductor device 1400 can have a higher operating speed. In particular, by using only a p-channel transistor as the Si-transistor, manufacturing cost can be reduced.

The control unit 1407 has functions of totally controlling operations of the PC 1408, the pipeline register 1409, the pipeline register 1410, the ALU 1411, the register file 1412, the cache 1404, the bus interface 1405, the debug interface 1406, and the power controller 1402 to decode and execute instructions contained in a program such as input applications.

The ALU 1411 has a function of performing a variety of arithmetic operations such as four arithmetic operations and logic operations.

The cache 1404 has a function of temporarily storing frequently-used data. The PC 1408 is a register having a function of storing an address of an instruction to be executed next. Note that although not shown in FIG. 20, the cache 1404 is provided with a cache controller for controlling the operation of the cache memory.

The pipeline register 1409 has a function of temporarily storing instruction data.

The register file 1412 includes a plurality of registers including a general purpose register and can store data that is read from the main memory, data obtained as a result of arithmetic operations in the ALU 1411, or the like.

The pipeline register 1410 has a function of temporarily storing data used for arithmetic operations of the ALU 1411, data obtained as a result of arithmetic operations of the ALU 1411, or the like.

The bus interface 1405 has a function as a path for data between the semiconductor device 1400 and various devices outside the semiconductor device 1400. The debug interface 1406 has a function as a path of a signal for inputting an instruction to control debugging to the semiconductor device 1400.

The power switch 1403 has a function of controlling supply of a power source voltage to various circuits included in the semiconductor device 1400 other than the power controller 1402. The above various circuits belong to several different power domains. The power switch 1403 controls whether the power supply voltage is supplied to the various circuits in the same power domain. In addition, the power controller 1402 has a function of controlling the operation of the power switch 1403.

The semiconductor device 1400 having the above structure is capable of performing power gating. A description will be given of an example of the power gating operation sequence.

First, by the CPU core 1401, timing for stopping the supply of the power supply voltage is set in a register of the power controller 1402. Then, an instruction of starting power gating is sent from the CPU core 1401 to the power controller 1402. Then, various registers and the cache 1404 included in the semiconductor device 1400 start data storing. Then, the power switch 1403 stops the supply of a power supply voltage to the various circuits other than the power controller 1402 included in the semiconductor device 1400. Then, an interrupt signal is input to the power controller 1402, whereby the supply of the power supply voltage to the various circuits included in the semiconductor device 1400 is started. Note that a counter may be provided in the power controller 1402 to be used to determine the timing of starting the supply of the power supply voltage regardless of input of an interrupt signal. Next, the various registers and the cache 1404 start data recovery. Then, the instruction is resumed in the control unit 1407.

Such power gating can be performed in the whole processor or one or a plurality of logic circuits forming the processor. Furthermore, power supply can be stopped even for a short time. Consequently, power consumption can be reduced finely in terms of a space or time.

In performing power gating, data held by the CPU core 1401 or the peripheral circuit 1422 is preferably restored in a short time. In that case, the power can be turned on or off in a short time, and an effect of saving power becomes significant.

In order that the data held by the CPU core 1401 or the peripheral circuit 1422 be restored in a short time, the data is preferably restored to a flip-flop circuit itself (referred to as a flip-flop circuit capable of backup operation). Furthermore, the data is preferably restored to an SRAM cell itself (referred to as an SRAM cell capable of backup operation). The flip-flop circuit and SRAM cell which are capable of backup operation preferably include transistors including an oxide semiconductor (preferably an oxide containing In, Ga, and Zn) in a channel formation region. Consequently, the transistor has a low off-state current; thus, the flip-flop circuit and SRAM cell which are capable of backup operation can retain data for a long time without power supply. When the transistor has a high switching speed, the flip-flop circuit and SRAM cell which are capable of backup operation can save and restore data in a short time in some cases.

Figure 21:
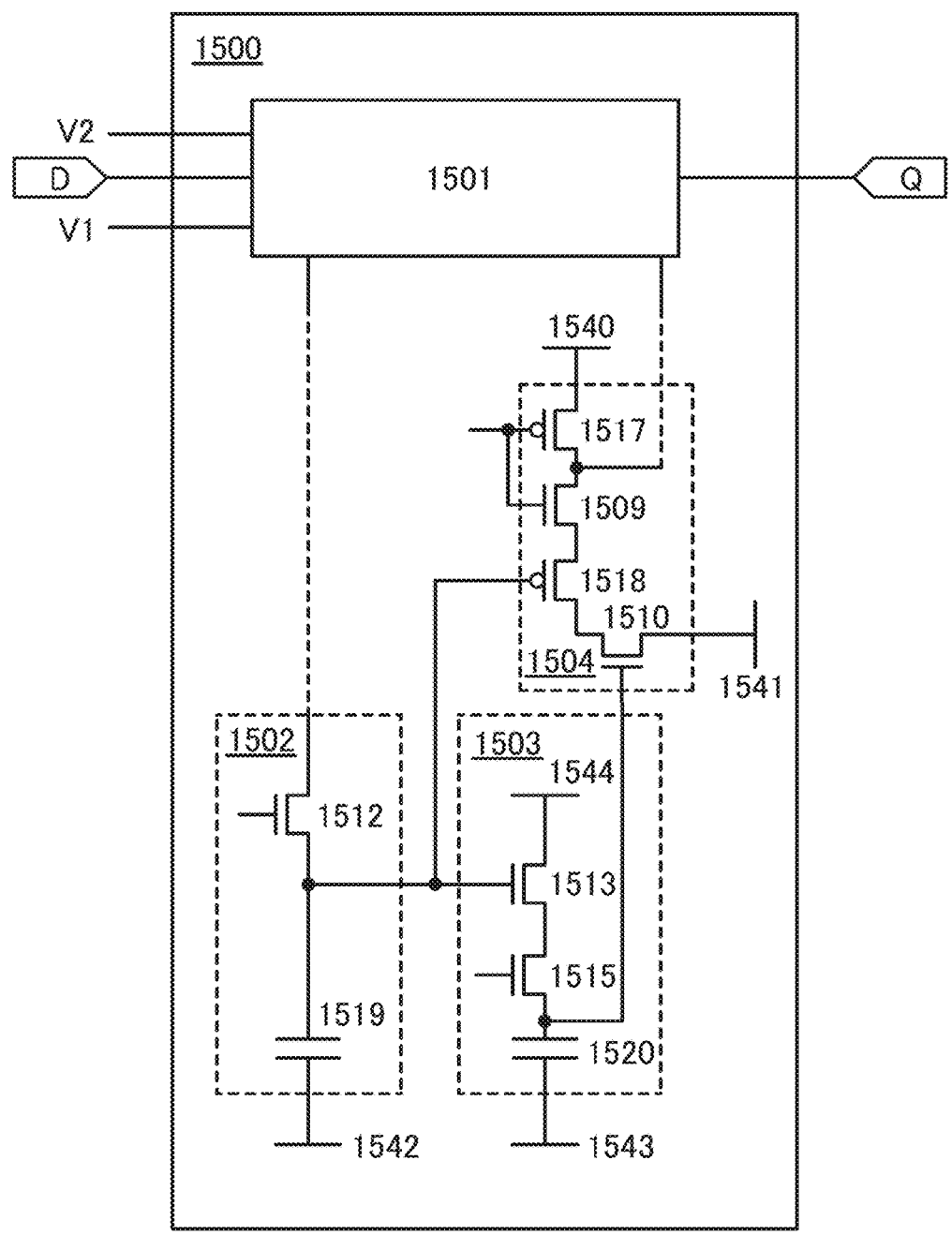
FIG. 21 is a circuit diagram illustrating a structure of a flip flop circuit of one embodiment.

An example of the flip-flop circuit capable of backup operation is described using FIG. 21.

A semiconductor device 1500 shown in FIG. 21 is an example of the flip-flop circuit capable of backup operation. The semiconductor device 1500 includes a first memory circuit 1501, a second memory circuit 1502, a third memory circuit 1503, and a read circuit 1504. As a power supply voltage, a potential difference between a potential V1 and a potential V2 is supplied to the semiconductor device 1500. One of the potential V1 and the potential V2 is at a high level, and the other is at a low level. An example of the structure of the semiconductor device 1500 when the potential V1 is at a low level and the potential V2 is at a high level will be described below.

The first memory circuit 1501 has a function of retaining data when a signal D including the data is input in a period during which the power supply voltage is supplied to the semiconductor device 1500. Furthermore, the first memory circuit 1501 outputs a signal Q including the retained data in the period during which the power supply voltage is supplied to the semiconductor device 1500. On the other hand, the first memory circuit 1501 cannot retain data in a period during which the power supply voltage is not supplied to the semiconductor device 1500. That is, the first memory circuit 1501 can be referred to as a volatile memory circuit.

The second memory circuit 1502 has a function of reading the data held in the first memory circuit 1501 to store (or restore) it. The third memory circuit 1503 has a function of reading the data held in the second memory circuit 1502 to store (or restore) it. The read circuit 1504 has a function of reading the data held in the second memory circuit 1502 or the third memory circuit 1503 to store (or return) it in (to) the first memory circuit 1501.

In particular, the third memory circuit 1503 has a function of reading the data held in the second memory circuit 1502 to store (or restore) it even in the period during which the power supply voltage is not supplied to the semiconductor device 1500.

As shown in FIG. 21, the second memory circuit 1502 includes a transistor 1512 and a capacitor 1519. The third memory circuit 1503 includes a transistor 1513, a transistor 1515, and a capacitor 1520. The read circuit 1504 includes a transistor 1510, a transistor 1518, a transistor 1509, and a transistor 1517.

The transistor 1512 has a function of charging and discharging the capacitor 1519 in accordance with data held in the first memory circuit 1501. The transistor 1512 is desirably capable of charging and discharging the capacitor 1519 at a high speed in accordance with data held in the first memory circuit 1501. Specifically, the transistor 1512 desirably contains crystalline silicon (preferably polycrystalline silicon, further preferably single crystal silicon) in a channel formation region.

The conduction state or the non-conduction state of the transistor 1513 is determined in accordance with the charge held in the capacitor 1519. The transistor 1515 has a function of charging and discharging the capacitor 1520 in accordance with the potential of a wiring 1544 when the transistor 1513 is in a conduction state. It is desirable that the off-state current of the transistor 1515 be extremely low. Specifically, the transistor 1515 desirably contains an oxide semiconductor (preferably an oxide containing In, Ga, and Zn) in a channel formation region.

Specific connection relations between the elements are described. One of a source and a drain of the transistor 1512 is connected to the first memory circuit 1501. The other of the source and the drain of the transistor 1512 is connected to one electrode of the capacitor 1519, a gate of the transistor 1513, and a gate of the transistor 1518. The other electrode of the capacitor 1519 is connected to the wiring 1542. One of a source and a drain of the transistor 1513 is connected to the wiring 1544. The other of the source and the drain of the transistor 1513 is connected to one of a source and a drain of the transistor 1515. The other of the source and the drain of the transistor 1515 is connected to one electrode of the capacitor 1520 and a gate electrode of the transistor 1510. The other electrode of the capacitor 1520 is connected to the wiring 1543. One of a source and a drain of the transistor 1510 is connected to a wiring 1541. The other of the source and the drain of the transistor 1510 is connected to one of a source and a drain of the transistor 1518. The other of the source and the drain of the transistor 1518 is connected to one of a source electrode and a drain electrode of the transistor 1509. The other of the source and the drain of the transistor 1509 is connected to one of a source and a drain of the transistor 1517 and the first memory circuit 1501. The other of the source and the drain of the transistor 1517 is connected to a wiring 1540. Furthermore, although a gate of the transistor 1509 is connected to a gate of the transistor 1517 in FIG. 21, the gate of the transistor 1509 is not necessarily connected to the gate of the transistor 1517.

The transistor described in the above embodiment as an example can be applied to the transistor 1515. Because of the low off-state current of the transistor 1515, the semiconductor device 1500 can retain data for a long time without power supply. The favorable switching characteristics of the transistor 1515 allow the semiconductor device 1500 to perform high-speed backup and recovery.

At least part of this embodiment can be implemented in combination with any of the other embodiments and the other examples described in this specification as appropriate.

Embodiment 7

In this embodiment, electronic devices each of which includes the data processing device of one embodiment of the present invention will be described with reference to FIGS. 22A to 22H.

FIGS. 22A to 22G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 22A:
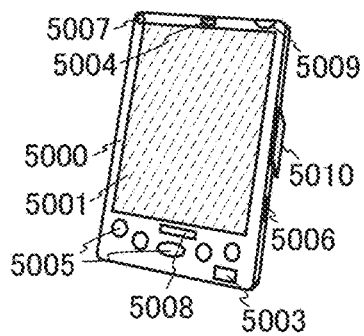
FIGS. 22A to 22H illustrate structures of electronic devices of one embodiment.
Figure 22B:
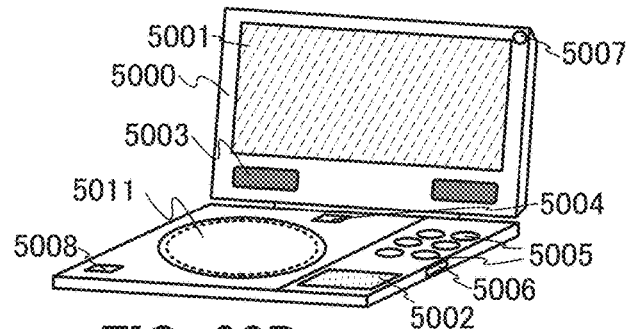
Figure 22C:
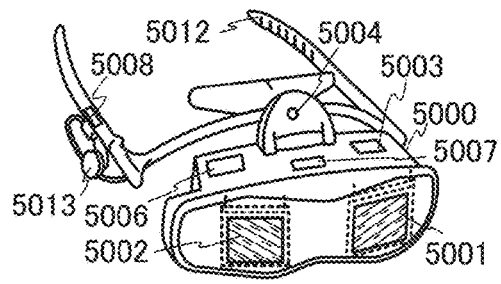
Figure 22D:
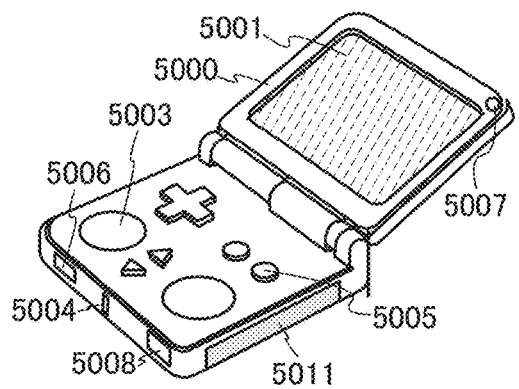
Figure 22E:
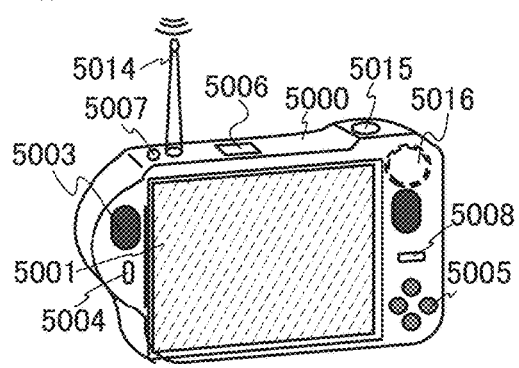
Figure 22F:
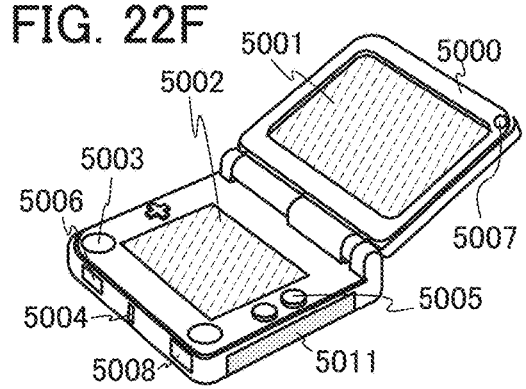
Figure 22G:
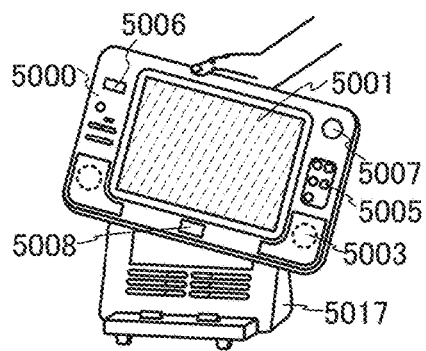

FIG. 22A illustrates a mobile computer that can include a switch 5009, an infrared port 5010, and the like in addition to the above components. FIG. 22B illustrates a portable image reproducing device (e.g., a DVD reproducing device) provided with a recording medium, and the portable image reproducing device can include a second display portion 5002, a recording medium reading portion 5011, and the like in addition to the above components. FIG. 22C illustrates a goggle-type display that can include the second display portion 5002, a support portion 5012, an earphone 5013, and the like in addition to the above components. FIG. 22D illustrates a portable game console that can include the recording medium reading portion 5011 and the like in addition to the above components. FIG. 22E illustrates a digital camera with a television reception function, and the digital camera can include an antenna 5014, a shutter button 5015, an image receiving portion 5016, and the like in addition to the above components. FIG. 22F illustrates a portable game console that can include the second display portion 5002, the recording medium reading portion 5011, and the like in addition to the above components. FIG. 22G illustrates a portable television receiver that can include a charger 5017 capable of transmitting and receiving signals, and the like in addition to the above components.

The electronic devices in FIGS. 22A to 22G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 22A to 22G are not limited thereto, and the electronic devices can have a variety of functions.

Figure 22H:
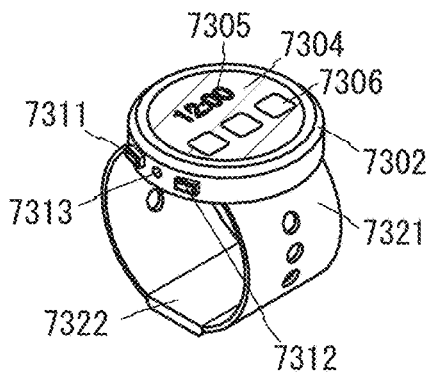

FIG. 22H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 22H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

EXAMPLE

In this example, a structure and evaluation results of a fabricated display panel of one embodiment of the present invention are described with reference to FIGS. 23A to 23C, FIGS. 24A and 24B, and FIG. 25.

Figure 23A:
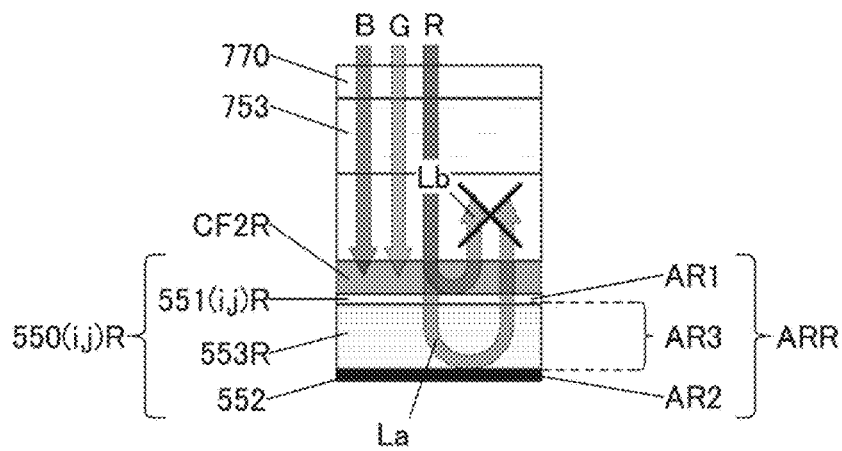
FIGS. 23A to 23C show the structure and the effects of a display panel of Example.
Figure 23B:
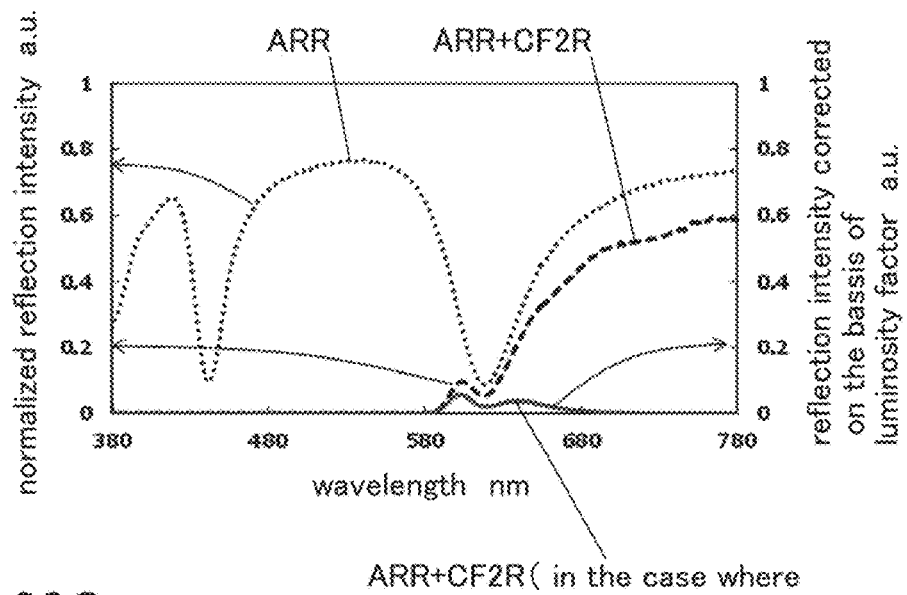
Figure 23C:
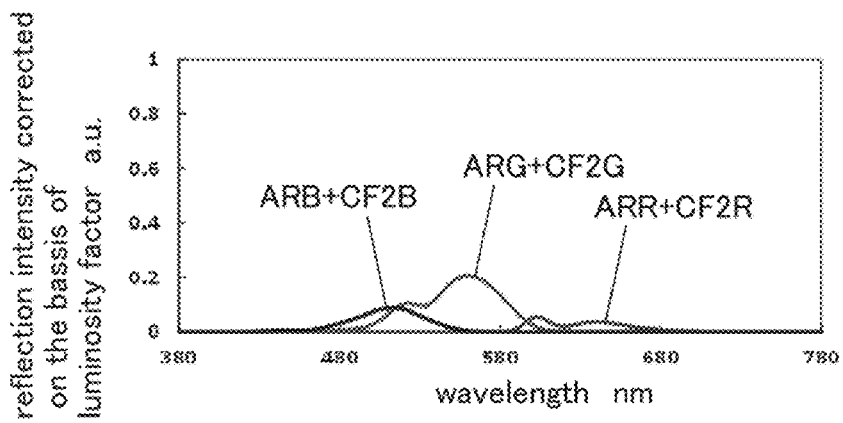

FIGS. 23A to 23C illustrate the structure and the effects of the display panel of one embodiment of the present invention. FIG. 23A is a schematic view illustrating an anti-reflection structure. FIGS. 23B and 23C show the effects of the anti-reflection structure.

Figure 24A:
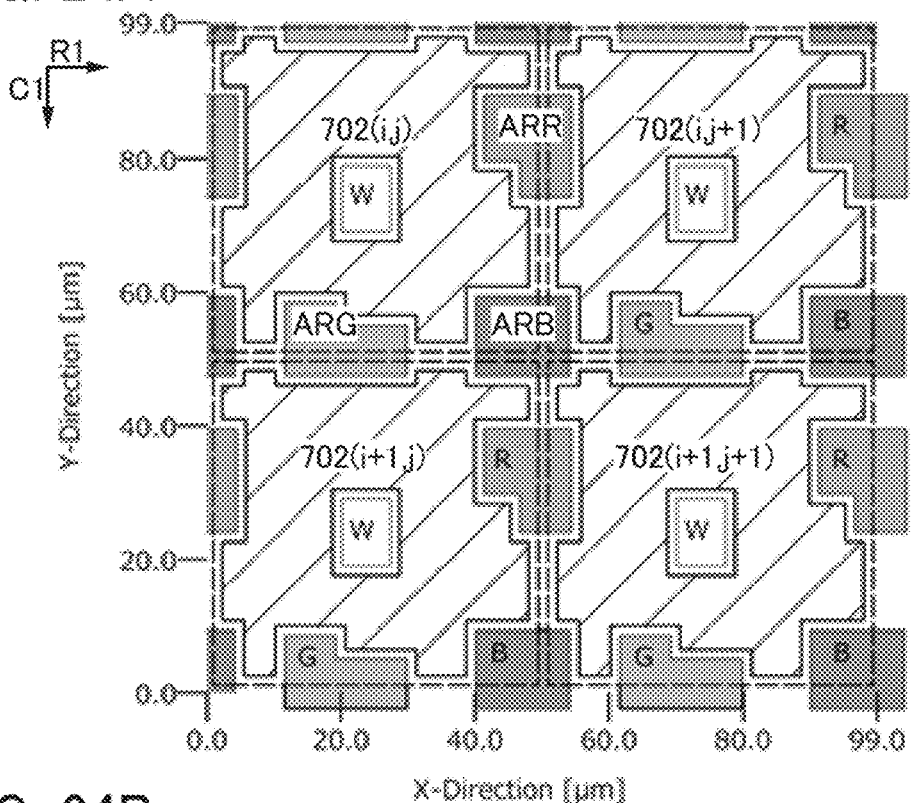
FIGS. 24A and 24B illustrate the structure and the effects of a display panel of Example.
Figure 24B:
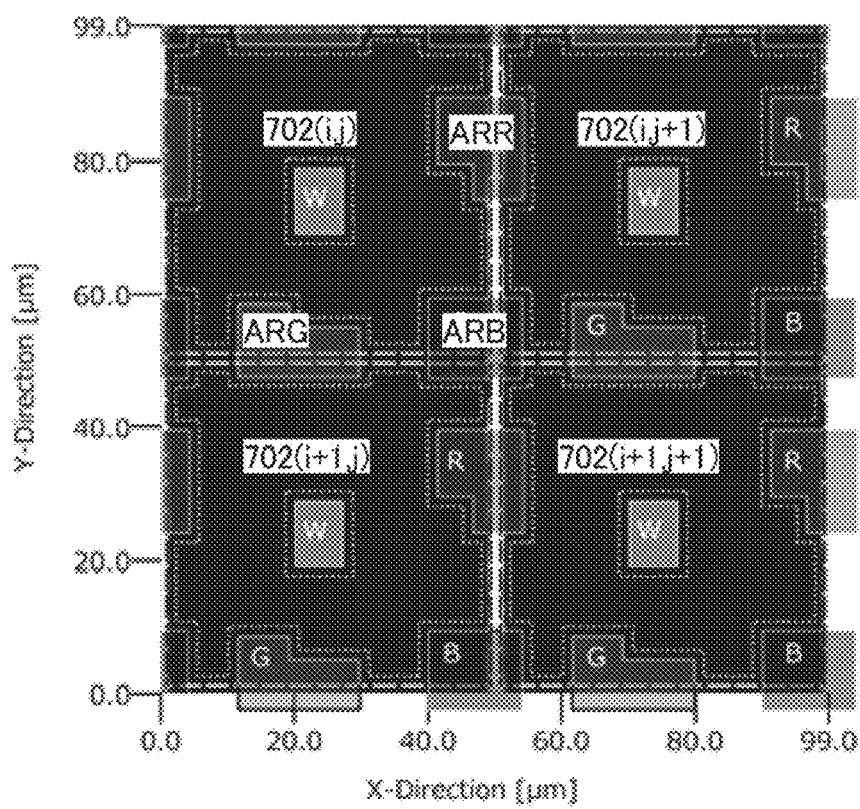

FIGS. 24A and 24B illustrate the structure and the effects of the display panel of one embodiment of the present invention. FIG. 24A is a schematic view illustrating an anti-reflection structure. FIG. 24B illustrates effects of the anti-reflection structure.

Figure 25:
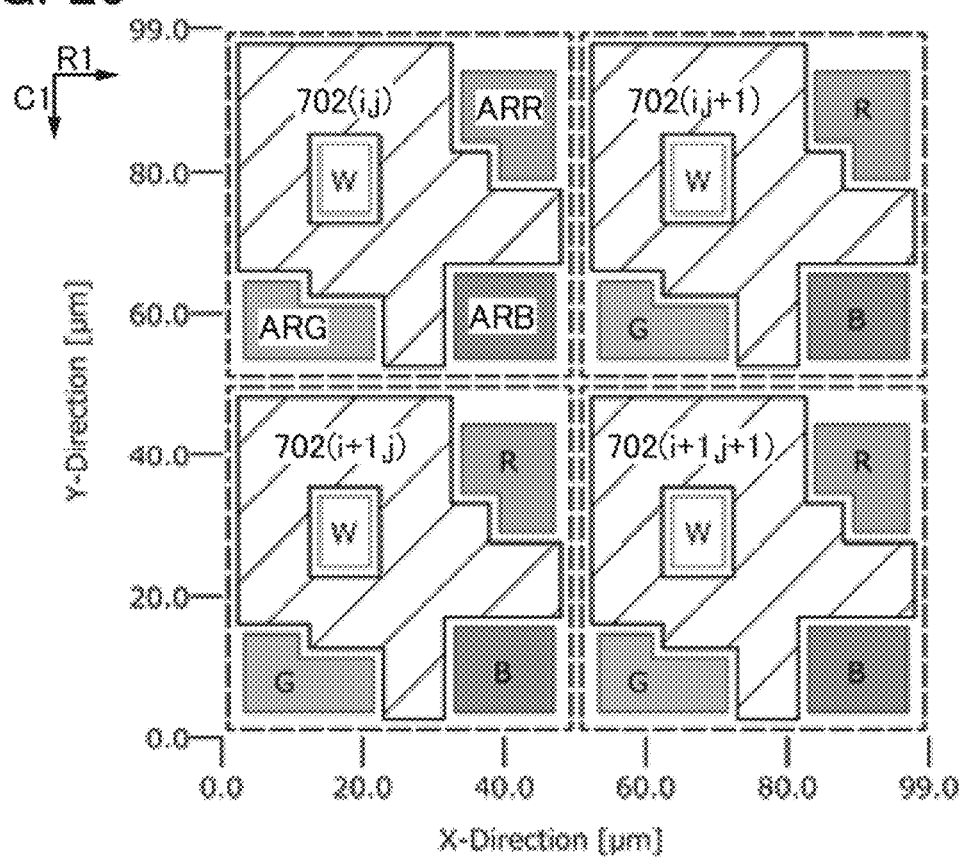
FIG. 25 illustrates the structure and the effects of a display panel of Example.

FIG. 25 illustrates the structure and the effect of the display panel of one embodiment of the present invention. FIG. 25 schematically illustrates the arrangement of an anti-reflection structure which is different from that of FIG. 24A.

Structure Example 1

The anti-reflection structure ARR includes the transflective film AR1, the reflective film AR2, and the optical adjustment film AR3 (see FIG. 23A). The reflective film AR2 includes a region overlapping with the transflective film AR1. The optical adjustment film AR3 includes a region positioned between the transflective film AR1 and the reflective film AR2.

The layer 553R containing a light-emitting material is used as the optical adjustment film AR3. The transflective film AR1 is used as the third electrode 551($i$, $j$)R. The reflective film AR2 is used as the fourth electrode 552. Accordingly, the anti-reflection structure ARR can be used for the second display element 550($i$, $j$)R having a microcavity structure.

The coloring film CF2R includes a region positioned between the anti-reflection structure ARR and the layer 753 containing a liquid crystal material and has a function of absorbing visible light with a wavelength shorter than approximately 600 nm.

Structure Example 2

A display panel described in Structure example 2 of this example includes pixels 702($i$, $j$) to 702($i$+1, $j$+1) (see FIG. 24A). The display panel includes the anti-reflection structure ARR, the anti-reflection structure ARG, and the anti-reflection structure ARB.

The pixels 702($i$, $j$) and 702($i$, $j$+1) are arranged in a row direction R1, and the pixels 702($i$+1, $j$) and 702($i$+1, $j$+1) are arranged in the row direction R1.

The anti-reflection structure ARR is provided between the pixels 702($i$, $j$) and 702($i$, $j$+1) and between the pixels 702($i$+1, $j$) and 702($i$+1, $j$+1).

The pixels 702($i$, $j$) and 702($i$+1, $j$) are arranged in a column direction C1, and the pixels 702($i$, $j$+1) and 702($i$+1, $j$+1) are arranged in the column direction C1.

The pixel 702($i$, $j$) includes the pixel circuit 530($i$, $j$) and the first display element 750($i$, $j$). The pixel 702($i$, $j$+1) includes a pixel circuit 530($i$, $j$+1) and the first display element 750($i$, $j$+1). The pixel 702($i$+1, $j$) includes the pixel circuit 530($i$+1, $j$) and the first display element 750($i$+1, $j$). The pixel 702($i$+1, $j$+1) includes a pixel circuit 530($i$+1, $j$+1) and a first display element 750($i$+1, $j$+1).

Note that a reflective liquid crystal display element is used as each of the first display elements 750($i$, $j$) to 750($i$+1, $j$+1).

The pixel circuits 530($i$, $j$) and 530($i$+1, $j$) are electrically connected to the signal line S1($j$) which is not shown. The signal line S1(*j*) has a function of supplying an image signal to the first display elements 750(*i, j*) and 750(*i*+1, *j*).

The pixel circuits 530(*i, j*+1) and 530(*i*+1, *j*+1) are electrically connected to the signal line S1(*j*+1) which is not shown. The signal line S1(*j*+1) has a function of supplying an image signal to the first display elements 750(*i, j*+1) and 750(*i*+1, *j*+1).

Structure Example 3

A display panel described in Structure example 3 of this example is different from the display panel described in Structure example 2 with reference to FIGS. 24A and 24B in that the anti-reflection structure ARR between the first display element 750(*i, j*) and the first display element 750(*i, j*+1) is not provided.

<<Evaluation Results 1>>

The effect of anti-reflection structure ARR in reducing reflectance was observed (see FIG. 23B). For example, the effect of reducing normalized reflection intensity of part of visible light which enters through the layer 753 containing a liquid crystal material, specifically, the effect of reducing normalized reflection intensity of light with wavelengths in the vicinity of 440 nm and in the vicinity of 620 nm, was observed.

In addition, the effect of reducing the reflectance of visible light with a wavelength shorter than 600 nm was observed when both the anti-reflection structure ARR and the coloring film CF2R were used. Note that in the case where luminosity factor of a human was considered, normalized reflection intensity of visible light with wavelengths ranging from 600 nm to 680 nm was made less than or equal to approximately 0.05. The visible light in the other wavelength regions was not reflected.

When the coloring film CF2G that transmits green light was used, the normalized reflection intensity of visible light with wavelengths of approximately 480 nm to 630 nm was made less than or equal to approximately 0.2 (see FIG. 23C). In addition, reflection of visible light in the other wavelength regions was prevented.

When the coloring film CF2B that transmits blue light was used, the normalized reflection intensity of visible light with wavelengths of approximately 460 nm to 560 nm was made less than or equal to approximately 0.1. In addition, reflection of visible light in the other wavelength regions was prevented.

<<Evaluation Results 2>>

The first display element 750(*i, j*+1) was driven using an image signal having a polarity different from that of an image signal that was used in the first display element 750(*i, j*). Specifically, in the first display element 750(*i, j*), a potential which was higher than that of the second electrode 752 was used as an image signal for displaying black. In the first display element 750(*i, j*+1), a potential which was lower than that of the second electrode 752 was used as an image signal for displaying black. In other words, black was displayed by what is called a source line inversion driving.

Thus, a region in which the alignment of the liquid crystal material was disordered was formed between the first display elements 750(*i, j*) and 750(*i, j*+1) (see FIG. 24B). As a result, light that passed through the layer 753 containing a liquid crystal material was reflected between the pixels 702(*i, j*) and 702(*i, j*+1). However, the anti-reflection structure ARR was provided between the first display elements 750(*i, j*) and 750(*i, j*+1), reflection of light that passed through the layer 753 containing a liquid crystal material in the region was reduced.

Note that the first display element 750(*i, j*+1) was driven using an image signal having the same polarity as that of an image signal that was used in the first display element 750(*i, j*). Thus, a region in which the alignment of the liquid crystal material was disordered was not formed between the first display elements 750(*i, j*) and 750(*i, j*+1).

<<Evaluation Results 3>>

The aperture ratio of the first display element 750(*i, j*) described in Structure example 3 was 55.5% (see FIG. 25). The aperture ratio of the first display element 750(*i, j*) described in Structure example 2 was 65.9% (see FIGS. 24A and 24B).

The anti-reflection structure ARR functioning as the second display element was provided in a region between the pixels 702(*i, j*) and 702(*i, j*+1). Thus, the region is effectively used and the aperture ratio of the first display element can be increased.

EXPLANATION OF REFERENCE

ACF1: conductive material, ACF2: conductive material, AF1: alignment film, AF2: alignment film, ARR: anti-reflection structure, ARG: anti-reflection structure, ARB: anti-reflection structure, AR1: transflective film, AR2: reflective film, AR3: optical adjustment film, ANO: wiring, BR(g, h): conductive film, CSCOM: wiring, C11: capacitor, C21R: capacitor, C21G: capacitor, C21B: capacitor, C21W: capacitor, C22R: capacitor, C22G: capacitor, C22B: capacitor, C22W: capacitor, CF2: coloring film, CF2B: coloring film, CF2G: coloring film, CF2R: coloring film, CP: conductive material, C(g): electrode, CL(g): control line, M(h): electrode, ML(h): sensing signal line, FPC1: flexible printed circuit, FPC2: flexible printed circuit, G1: scan line, G2: scan line, G3: scan line, GD: driver circuit, GDA: driver circuit, GDB: driver circuit, DC: sensor circuit, OSC: oscillator circuit, KB1: structure body, M: transistor, MD: transistor, MR: transistor, MG: transistor, MB: transistor, MW: transistor, TR: transistor, P1: positional data, P2: sensing data, S1: signal line, S2: signal line, S3: signal line, SD: driver circuit, SD1: driver circuit, SD2: driver circuit, SS: control data, SW1: switch, SW2: switch, SW2R: switch, SW2G: switch, SW2B: switch, SW2W: switch, V1: image data, V11: data, V12: data, VBG: background data, VCOM1: wiring, VCOM2: wiring, 102: insulating film, 104: conductive film, 106: insulating film, 108: semiconductor film, 108*a*: semiconductor film, 108*b*: semiconductor film, 108*c*: semiconductor film, 112*a*: conductive film, 112A: conductive film, 112*b*: conductive film, 112B: conductive film, 114: insulating film, 116: insulating film, 118: insulating film, 122: opening, 124: conductive film, 200: data processing device, 210: arithmetic device, 211: arithmetic portion, 212: storage portion, 214: transmission path, 215: input/output interface, 220: input/output device, 230: display portion, 230B: display portion, 231: display region, 239: selection circuit, 240: input portion, 250: sensor portion, 290: communication portion, 501A: insulating film, 501C: insulating film, 504: conductive film, 505: bonding layer, 506: insulating film, 508: semiconductor film, 511B: conductive film, 511C: conductive film, 512A: conductive film, 512B: conductive film, 516: insulating film, 518: insulating film, 519B: terminal, 519C: terminal, 520: functional layer, 521: insulating film, 522: connection portion, 524: conductive film, 528: insulating film, 530: pixel circuit, 550: display element, 551: electrode, 552: electrode, 553R: layer containing a light-emitting material, 553G: layer containing a light-emitting material, 553B: layer containing a light-emitting material, 553W: layer containing a light-emitting material, 570: substrate, 591A: opening, 591B: opening, 591C: opening, 592A: opening, 592B: opening, 592C: opening, 700: display panel, 700TP1: input/output panel, 702: pixel, 705: sealing material, 706: insulating film, 709: bonding layer, 710: substrate, 719: terminal, 720: functional layer, 750: display element, 751($i, j$): electrode, 751($i, j$)R: region, 751($i, j$)T: region, 752: electrode, 753: layer containing a liquid crystal material, 753A: region, 753B: region, 753C: region, 754A: intermediate film, 754B: intermediate film, 754C: intermediate film, 770: substrate, 770D: functional film, 770P: functional film, 775($g, h$): sensing element, 1400: semiconductor device, 1401: CPU core, 1402: power controller, 1403: power switch, 1404: cache, 1405: bus interface, 1406: debug interface, 1407: control unit, 1408: PC, 1409: pipeline register, 1410: pipeline register, 1411: ALU, 1412: register file, 1421: power management unit, 1422: peripheral circuit, 1423: data bus, 1500: semiconductor device, 1501: memory circuit, 1502: memory circuit, 1503: memory circuit, 1504: read circuit, 1509: transistor, 1510: transistor, 1512: transistor, 1513: transistor, 1515: transistor, 1517: transistor, 1518: transistor, 1519: capacitor, 1520: capacitor, 1540: wiring, 1541: wiring, 1542: wiring, 1543: wiring, 1544: wiring, 3001: wiring, 3002: wiring, 3003: wiring, 3004: wiring, 3005: wiring, 3200: transistor, 3300: transistor, 3400: capacitor, 5000: housing, 5001: display portion, 5002: display portion, 5003: speaker, 5004: LED lamp, 5005: operation keys, 5006: connection terminal, 5007: sensor, 5008: microphone, 5009: switch, 5010: infrared port, 5011: medium reading portion, 5012: support portion, 5013: earphone, 5014: antenna, 5015: shutter button, 5016: receiving portion, 5017: charger, 7302: housing, 7304: display panel, 7305: icon, 7306: icon, 7311: operation button, 7312: operation button, 7313: connection terminal, 7321: band, and 7322: clasp.

This application is based on Japanese Patent Application serial no. 2016-067704 filed with Japan Patent Office on Mar. 30, 2016, the entire contents of which are hereby incorporated by reference.

The invention claimed is:
1. A display panel comprising:
   a first layer containing a liquid crystal material;
   a first pixel;
   a second pixel; and
   a first anti-reflection structure,
   wherein the first layer comprises a first region, a second region, and a third region,
   wherein the third region comprises a region positioned between the first region and the second region,
   wherein the first pixel comprises the first region,
   wherein the second pixel comprises the second region,
   wherein the first anti-reflection structure comprises a region overlapping with the third region,
   wherein the first pixel comprises a first display element, a second display element, a third display element, a fourth display element, and a fifth display element,
   wherein the second display element comprises a third electrode, a fourth electrode, and a second layer containing a light-emitting material,
   wherein the third electrode comprises a transflective film,
   wherein the fourth electrode comprises a reflective film,
   wherein the third display element is positioned so that display using the third display element can be seen in a region in which display using the first display element can be seen,
   wherein the fourth display element is positioned so that display using the fourth display element can be seen in a region in which display using the first display element can be seen,
   wherein the fifth display element is positioned so that display using the fifth display element can be seen in a region in which display using the first display element can be seen,
   wherein each of colors displayed by the second display element, the third display element, the fourth display element and the fifth display element are different from each other,
   wherein the first display element is configured to display white, and
   wherein each of the second display element, the third display element, the fourth display element and the fifth display element is configured to display blue, green, red, or white.

2. The display panel according to claim 1, wherein the second display element is positioned so that display using the second display element can be seen in a region in which display using the first display element can be seen.

3. The display panel according to claim 1, wherein the second display element is configured to display a color different from a color displayed by the first display element.

4. The display panel according to claim 1, further comprising:
   a first conductive film;
   a second conductive film;
   a second insulating film; and
   a pixel circuit,
   wherein the first display element comprises a first electrode and a second electrode,
   wherein the first electrode is positioned so that an electric field for controlling an alignment of the liquid crystal material contained in the first region is generated between the first electrode and the second electrode,
   wherein the first conductive film is electrically connected to the first electrode,
   wherein the second conductive film comprises a region overlapping with the first conductive film,
   wherein the second insulating film comprises a region positioned between the first conductive film and the second conductive film,
   wherein the second insulating film comprises an opening,
   wherein the second conductive film is electrically connected to the first conductive film in the opening,
   wherein the pixel circuit is electrically connected to the second conductive film,
   wherein the third electrode is electrically connected to the pixel circuit, and
   wherein the second display element is configured to emit light toward the second insulating film.

5. The display panel according to claim 1, further comprising:
   an optical adjustment film in the first anti-reflection structure,
   wherein the optical adjustment film comprises the second layer.

6. The display panel according to claim 1, further comprising a second anti-reflection structure, a third anti-reflection structure, and a fourth anti-reflection structure,
   wherein the second display element comprises the first anti-reflection structure,
   wherein the third display element comprises the second anti-reflection structure, wherein the fourth display element comprises the third anti-reflection structure, and wherein the fifth display element comprises the fourth anti-reflection structure.

* * * * *